US012760587B2

(12) United States Patent
Ohrstrom

(10) Patent No.: US 12,760,587 B2
(45) Date of Patent: Oct. 13, 2026

(54) FRAMEWORK ASSEMBLY WITH SILL CONFIGURATION INCLUDING A SHOULDER

(71) Applicant: VISION EXTRUSIONS GROUP LIMITED, Woodbridge (CA)

(72) Inventor: Rolf Ohrstrom, Woodbridge (CA)

(73) Assignee: VISION EXTRUSIONS GROUP LIMITED, Woodbridge (CA)

( * ) Notice: Subject to any disclaimer, the term of this patent is extended or adjusted under 35 U.S.C. 154(b) by 933 days.

(21) Appl. No.: 17/887,269

(22) Filed: Aug. 12, 2022

(65) Prior Publication Data

US 2023/0046177 A1 Feb. 16, 2023

Related U.S. Application Data

(60) Provisional application No. 63/233,017, filed on Aug. 13, 2021.

(51) Int. Cl.
*E06B 3/46* (2006.01)
*E06B 1/70* (2006.01)

(52) U.S. Cl.
CPC ............ *E06B 3/4618* (2013.01); *E06B 1/702* (2013.01)

(58) Field of Classification Search
CPC .......... E06B 3/4618; E06B 3/22; E06B 3/469; E06B 1/70; E06B 1/702
See application file for complete search history.

(56) References Cited

U.S. PATENT DOCUMENTS 3,859,754 A * 1/1975 Budich ................. E06B 3/4609 49/504
5,341,600 A * 8/1994 Heppner ............... E06B 3/4618 49/408
5,638,641 A * 6/1997 Joffe ......................... E06B 1/70 49/467

(Continued)

OTHER PUBLICATIONS

PH Tech Website Screen Capture—http://www.phtech.ca/en/buying-guide/patio-doors/what-must-i-look-for-smooth-sliding-patio-door.html, Feb. 13, 2020.

(Continued)

*Primary Examiner* — Jessica L Laux
(74) *Attorney, Agent, or Firm* — Ruggiero McAllister & McMahon LLC

(57) ABSTRACT

Disclosed herein is a sill configuration of a framework assembly. The sill configuration includes a shoulder, defining a plug supporting surface. The sill configuration is configured for co-operation with the movable sash configuration and the fixed sash configuration so that while a movable sash configuration and a fixed sash configuration are mounted to the sill configuration: (i) the movable sash configuration is slidable, relative to the sill configuration, and (ii) the movable sash configuration, the fixed sash configuration, and the sill configuration are co-operatively disposed so that a space is defined between the movable sash configuration, the fixed sash configuration, and the sill configuration, and (iii) the plug supporting surface of the shoulder is configured for supporting a plug for disposition within the space. While the framework assembly is mounted within the opening of the building construction, the plug-supporting surface is elevated relative to the base.

18 Claims, 42 Drawing Sheets

(56) References Cited

U.S. PATENT DOCUMENTS

| | | | | |
|---|---|---|---|---|
| 7,637,058 | B2 * | 12/2009 | Lai | E06B 7/14<br>49/408 |
| 8,230,646 | B2 * | 7/2012 | McDaniel | E06B 1/70<br>49/467 |
| 8,683,747 | B2 * | 4/2014 | Kim | E06B 7/14<br>49/504 |

OTHER PUBLICATIONS

Screen Capture—https://www.lapcoinc.com/medias/iw/1024x0/PORTE-PATIO-7800-PVC-COIN-JPG.jpg.

* cited by examiner

FRAMEWORK ASSEMBLY WITH SILL CONFIGURATION INCLUDING A SHOULDER

CROSS REFERENCE TO RELATED APPLICATION

This application claims priority to U.S. Provisional Application No. 63/233,017 filed on Aug. 13, 2021, which is hereby incorporated herein by reference in its entirety.

FIELD

The present disclosure relates to a sill configuration of a framework assembly, in particular, to a sill configuration including a shoulder to offset a dust plug from a surface of the sill base on which debris may accumulate.

BACKGROUND

Example framework assemblies include patio door assemblies and window assemblies. A framework assembly may be installed within an opening of a building construction of a building to provide, for example, line of sight, air flow, and access between the inside and the outside of the building.

Framework assemblies typically include a fixed sash and a movable sash. While the fixed sash and the movable sash are supported by a sill of a framework of the framework assembly, a space is defined between the sill, the fixed sash, and the movable sash. The space is defined while the framework assembly is disposed in a closed configuration and also while the framework assembly is disposed in an open configuration. Fluid communication across the framework assembly is effectible via the space. Such fluid communication across the framework assembly is undesirable, particularly while the framework assembly is disposed in the closed configuration, as debris, such as the elements (e.g. rain or snow), dirt, bugs, and the like, can ingress through the space, from the outside of the building to the inside of the building. To interfere with the ingress of debris through the space, a plug is inserted into the space. Unfortunately, existing sills are configured such that the plug that is inserted into the space is supported by a surface of the sill on which debris can accumulate. Accordingly, the plug can be exposed to the accumulated debris, which damages the plug and reduces its performance over time.

SUMMARY

In one aspect, there is provided a sill configuration of a framework assembly, the framework assembly including a movable sash configuration and a fixed sash configuration and configured for mounting within an opening of a building construction, the bottom of the opening being defined by a base of the building construction, the sill configuration comprising: a shoulder, defining a plug-supporting surface; wherein: the sill configuration is configured for co-operation with the movable sash configuration and the fixed sash configuration such that: the movable sash configuration and the fixed sash configuration are mountable to the sill configuration; while the movable sash configuration and the fixed sash configuration are mounted to the sill configuration: (i) the movable sash configuration is slidable, relative to the sill configuration, and (ii) the movable sash configuration, the fixed sash configuration, and the sill configuration are co-operatively disposed such that a space is defined between the movable sash configuration, the fixed sash configuration, and the sill configuration, and (iii) the plug supporting surface of the shoulder is configured for supporting a plug for disposition within the space; and while the framework assembly is mounted within the opening of the building construction, the plug-supporting surface is elevated relative to the base.

In another aspect, there is provided a framework assembly configured for mounting within an opening of a building construction, the bottom of the opening being defined by a base of the building construction, comprising: a movable sash configuration; a fixed sash configuration; a plug configuration, the plug configuration comprising at least one plug; a sill, comprising: a shoulder defining a plug-supporting surface; wherein: the sill configuration, the movable sash configuration, the fixed sash configuration, and the plug configuration are co-operatively configured such that: the movable sash configuration and the fixed sash configuration are mounted to the sill configuration; while the movable sash configuration and the fixed sash configuration are mounted to the sill configuration: (i) the movable sash configuration is slidable, relative to the sill configuration, and (ii) the movable sash configuration, the fixed sash configuration, and the sill configuration are co-operatively disposed such that a space is defined between the movable sash configuration, the fixed sash configuration, and the sill configuration, (iii) the plug configuration is supported by the plug supporting surface of the shoulder such that the plug configuration is disposed in the space; and while the framework assembly is mounted within the opening of the building construction, the plug-supporting surface is elevated relative to the base.

In another aspect, there is provided a kit for a framework assembly configured for mounting within an opening of a building construction, a bottom portion of the opening being defined by a base of the building construction, comprising: a movable sash configuration; a fixed sash configuration; a sill configuration, comprising: a shoulder, defining a plug-supporting surface; wherein: the sill configuration is configured for co-operation with the movable sash configuration and the fixed sash configuration such that: the movable sash configuration and the fixed sash configuration are mountable to the sill configuration; while the movable sash configuration and the fixed sash configuration are mounted to the sill configuration: (i) the movable sash configuration is slidable, relative to the sill configuration, and (ii) the movable sash configuration, the fixed sash configuration, and the sill configuration are co-operatively disposed such that a space is defined between the movable sash configuration, the fixed sash configuration, and the sill configuration, and (iii) the plug supporting surface of the shoulder is configured for supporting a plug for disposition within the space; and while the framework assembly is mounted within the opening of the building construction, the plug-supporting surface is elevated relative to the base.

Other aspects will be apparent from the description and drawings provided herein.

BRIEF DESCRIPTION OF DRAWINGS

In the figures, which illustrate example embodiments.

DETAILED DESCRIPTION

Figure 1:
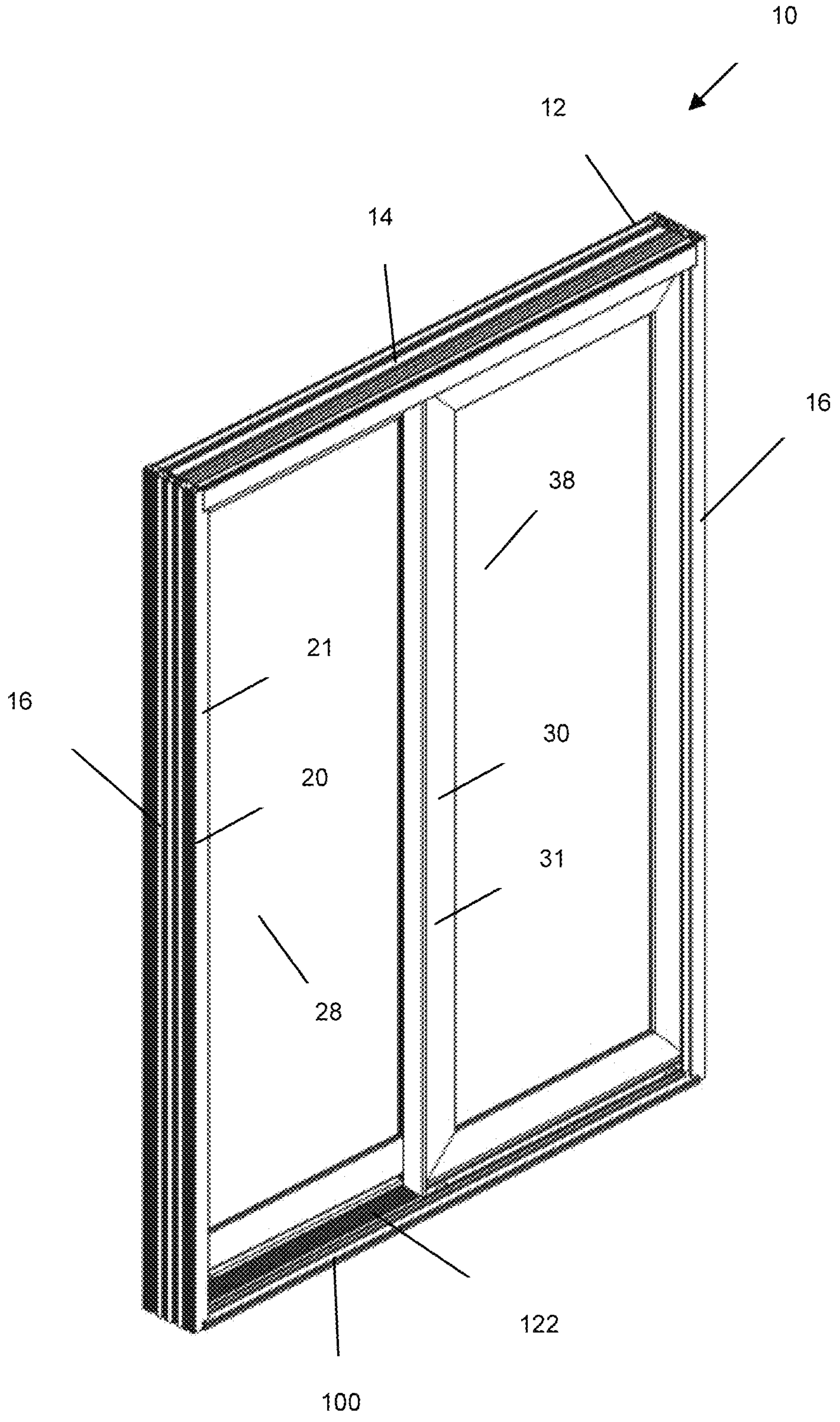
FIG. 1 is a perspective view of an embodiment of a framework assembly in a closed configuration.
Figure 2:
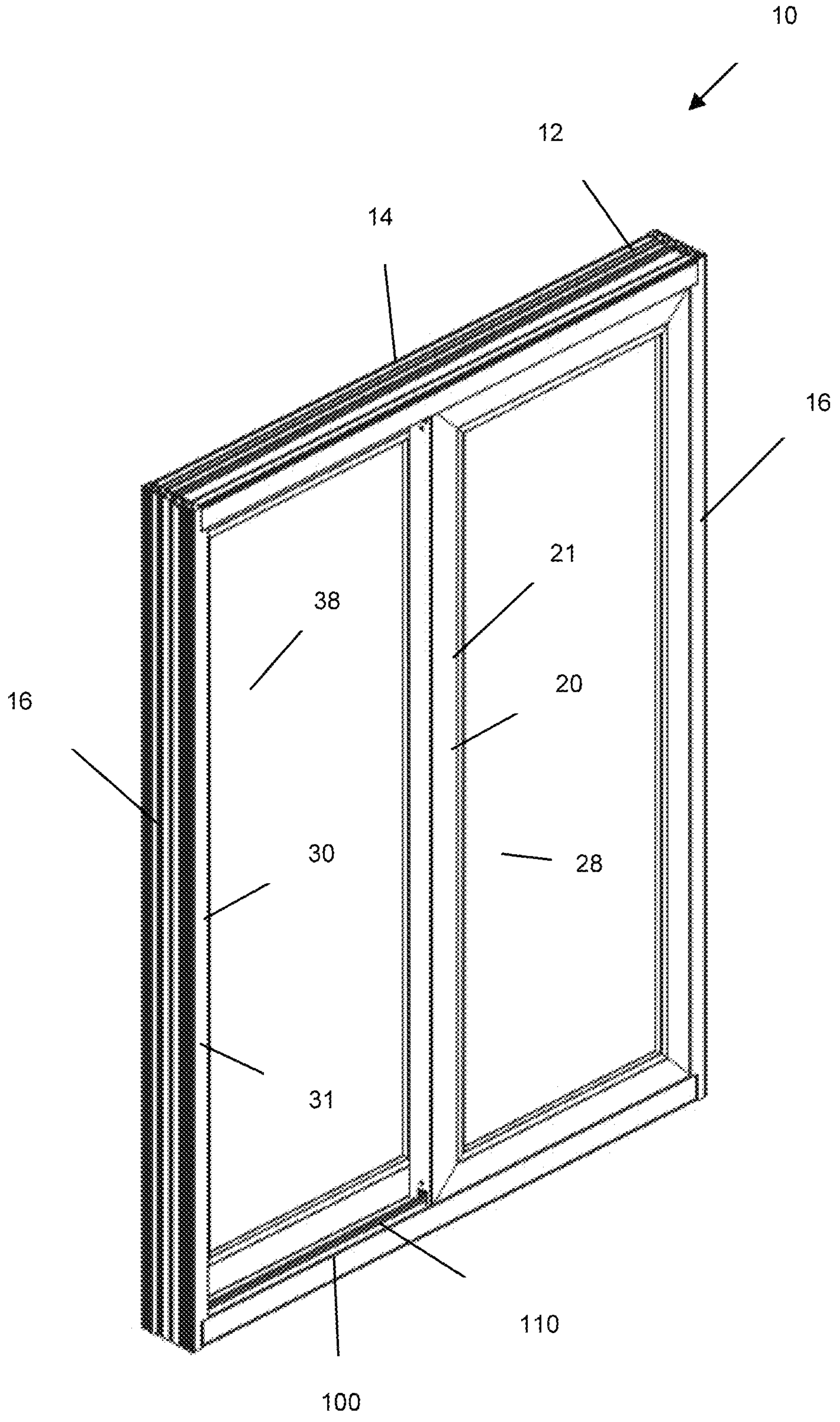
FIG. 2 is another perspective of the framework assembly of FIG. 1 in the closed configuration.
Figure 3:
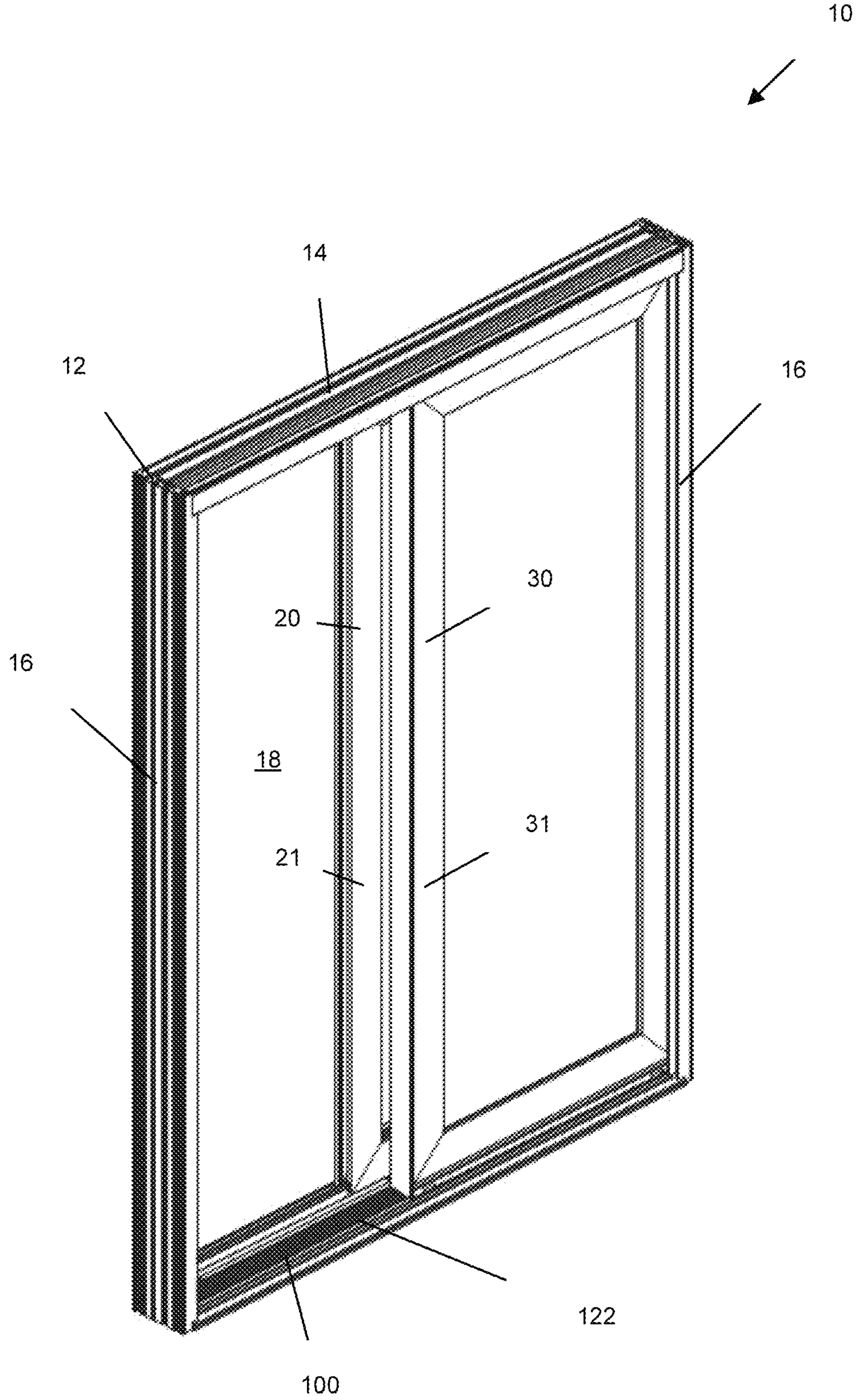
FIG. 3 is a perspective view of the framework assembly of FIG. 1 in an open configuration.
Figure 4:
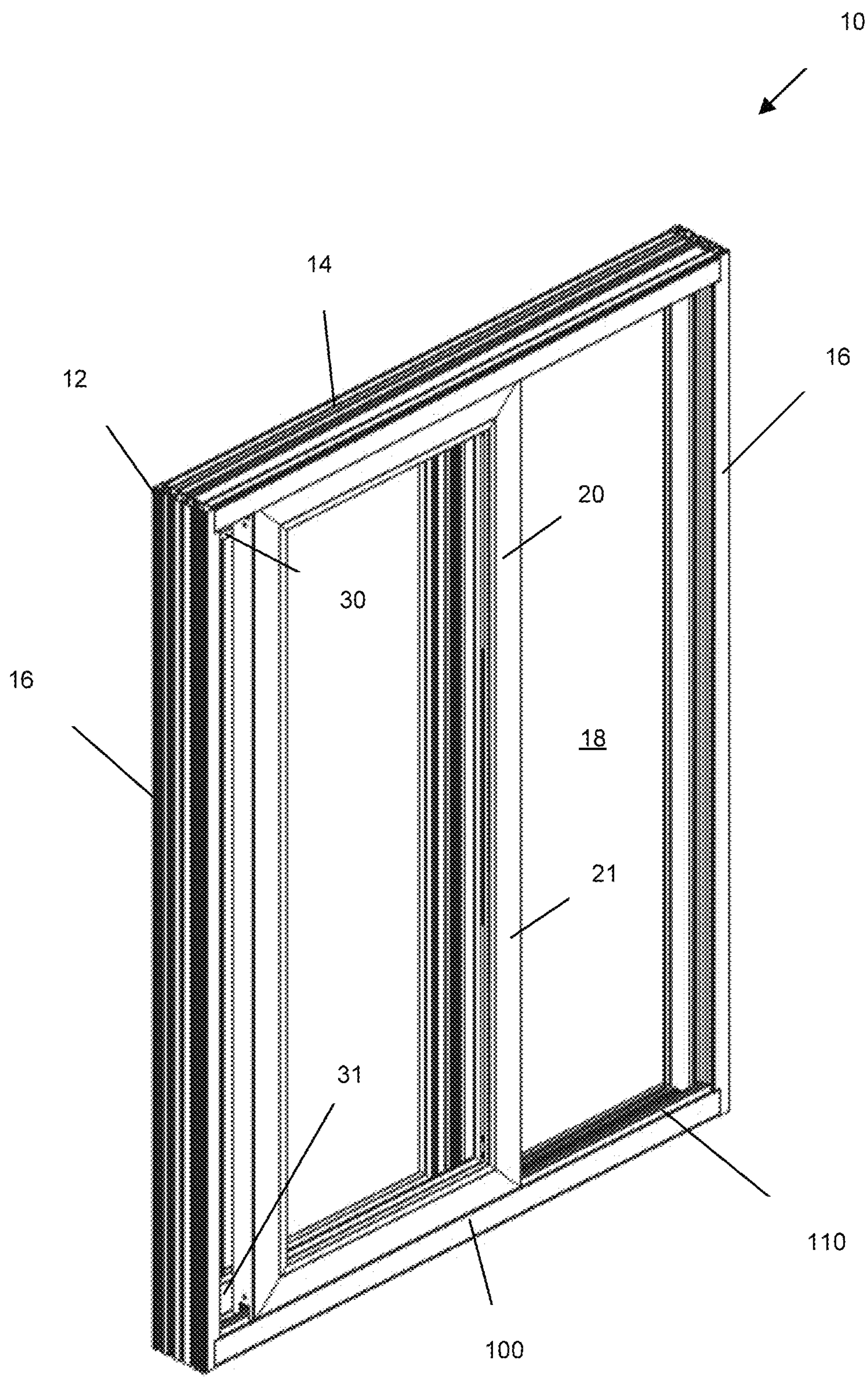
FIG. 4 is a perspective view of the framework assembly of FIG. 1 in the open configuration.

FIG. 1 to FIG. 4, and FIG. 11 to FIG. 17 depict an example embodiment of a framework assembly 10. The framework assembly 10 includes a framework 12, a movable sash configuration 20, and a fixed sash configuration 30. The framework 12 of the framework assembly includes a header 14, a sill configuration 100, and two jambs 16 extending between the header 14 and the sill configuration 100. The movable sash configuration 20 and the fixed sash configuration 30 are received in the framework 12. In some embodiments, for example, the movable sash configuration 20 and the fixed sash configuration 30 are mountable to the sill configuration 100, such that the movable sash configuration 20 and the fixed sash configuration 30 are supportable by the sill configuration 100. While the movable sash configuration 20 is mounted to the sill configuration 100, the movable sash configuration 20 is displaceable, for example, slidable, relative to the sill configuration 100. While the movable sash configuration 20 and the fixed sash configuration 30 are mounted to the sill configuration 100, the movable sash configuration 20 is displaceable, for example, slidable, relative to the fixed sash configuration 30 and the sill configuration 100. The assembly 10 is configurable in different configurations, including an open position and a closed configuration. In the open position, as depicted in FIG. 3 and FIG. 4, an opening 18 is defined between the movable sash configuration 20 and the framework 12. In some embodiments, for example, while the assembly 10 is configured in the open configuration, the opening 18 is fully open. In the closed configuration, as depicted in FIG. 1 and FIG. 2, the opening 18 between the movable sash configuration 20 and the framework 12 is closed. In some embodiments, for example, the assembly 10 can be mounted within an opening of a building construction of a building, for example, such that the assembly functions as a door. The bottom of the opening is defined by a base of the building construction, for example, the foundation, the floor, the ground, brickwork, building materials, and the like. In some embodiments, for example, while the assembly 10 is mounted within the opening of the building, the assembly 10 is supported on a horizontal surface. While the assembly 10 is mounted within the opening of the building construction and functioning as a door, and is configured in some of the different configurations, including the open position, the opening 18 is sufficiently large such that a person can walk through the opening 18, for example, to walk from inside the building to outside the building, or to walk from outside the building to inside the building. While the assembly 10 is mounted within the opening of the building construction and functioning as a door, and is configured in some of the different configurations, including the open position, fluid communication is established between the inside and the outside of the building via the opening 18. While the assembly 10 is mounted within the opening of the building construction and functioning as a door, and is configured in some of the different configurations, including the closed configuration, a person is prevented from walking through the opening 18. The assembly 10 is transitionable between the different configurations, including the open configuration and the closed configuration, via displacement of the movable sash configuration 20 relative to the sill configuration 100.

Figure 21:
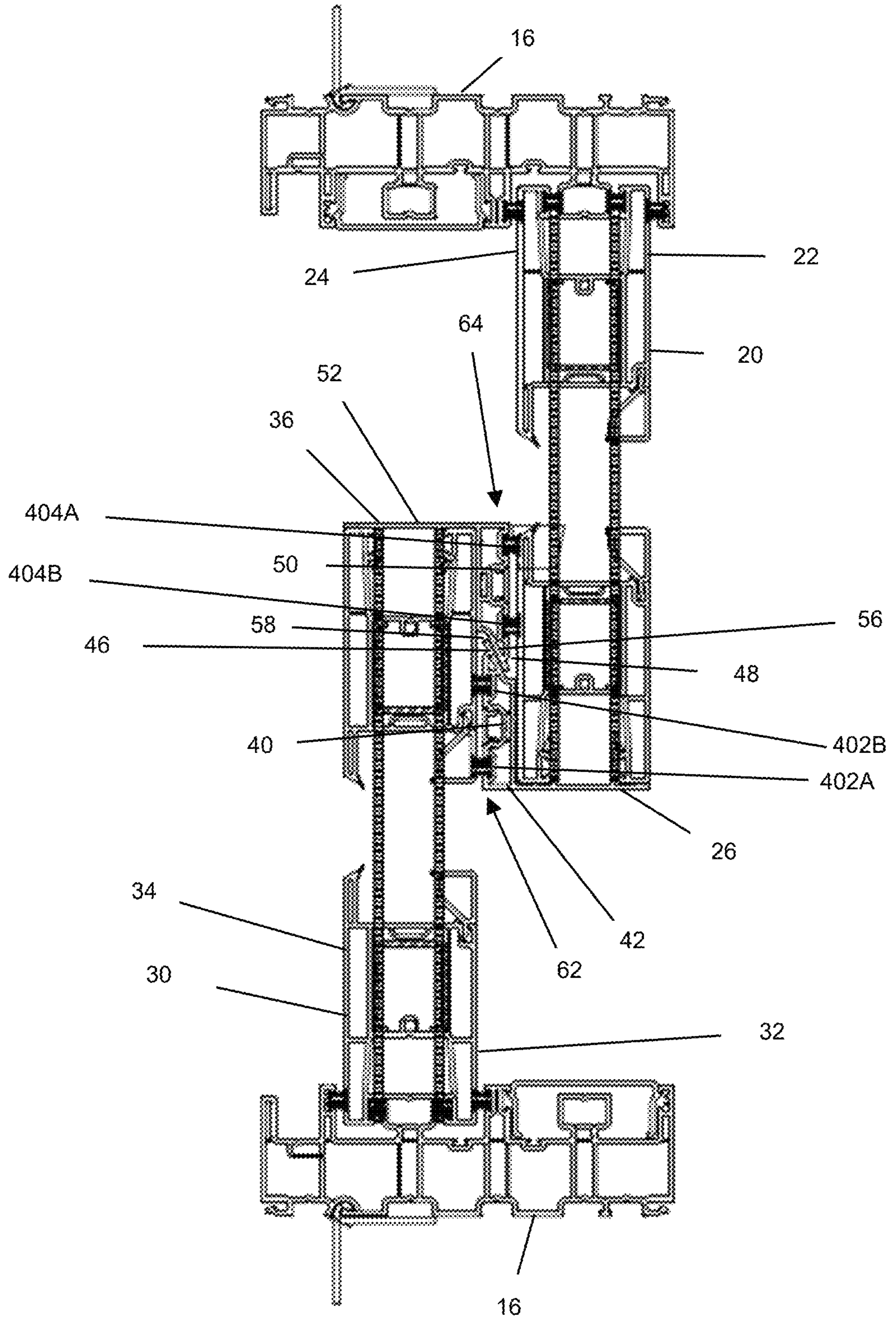
FIG. 21 is a cross-sectional view of the framework assembly of FIG. 15 along line 16-16 shown in FIG. 15.

In some embodiments, for example, the movable sash configuration 20 includes a movable sash 21. In some embodiments, for example, as depicted in FIG. 21, the movable sash 21 includes a first side defining a first surface 22, a second side disposed on an opposite side of the movable sash 21 relative to the first side 22 defining a second surface 24, and a side surface 26 extending between the first surface 22 and the second surface 24. While the framework assembly 10 is mounted within the opening of the building construction, the first surface 22 is configured to face the inside of the building, and the second surface 24 is configured to face the outside of the building. As depicted in FIG. 1, the movable sash 21 is configured to support one or more glass panels 28, through which line of sight through the movable sash 21 is provided.

In some embodiments, for example, the fixed sash configuration 20 includes a fixed sash 31. As depicted in FIG. 21, the fixed sash 31 includes a first side defining a first surface 32, a second side disposed on an opposite side of the fixed sash 31 relative to the first side 32 defining a second surface 34, and a side surface 36 extending between the first surface 32 and the second surface 34. While the framework assembly 10 is within the opening of the building construction, the first surface 32 is configured to face the inside of the building, and the second surface 34 is configured to face the outside of the building. As depicted in FIG. 1, the fixed sash 31 is configured to support one or more glass panels 38, through which line of sight through the movable sash 31 is provided.

As depicted in FIG. 1 to FIG. 4, while the movable sash configuration 20 and the fixed sash configuration 30 are received in the framework 12, the movable sash configuration 20 and the fixed sash configuration 30 are disposed in offset relationship, such that the movable sash configuration 20 is displaceable relative to the fixed sash configuration 30 while the movable sash configuration 20 and the fixed sash configuration 30 are received in the framework 12.

In some embodiments, for example, as depicted in FIG. 6 to FIG. 10, FIG. 18, and FIG. 20 to FIG. 21, the movable sash configuration 20 includes an interior interlock 40, and the fixed sash configuration 30 includes an exterior interlock 50.

Figure 18:
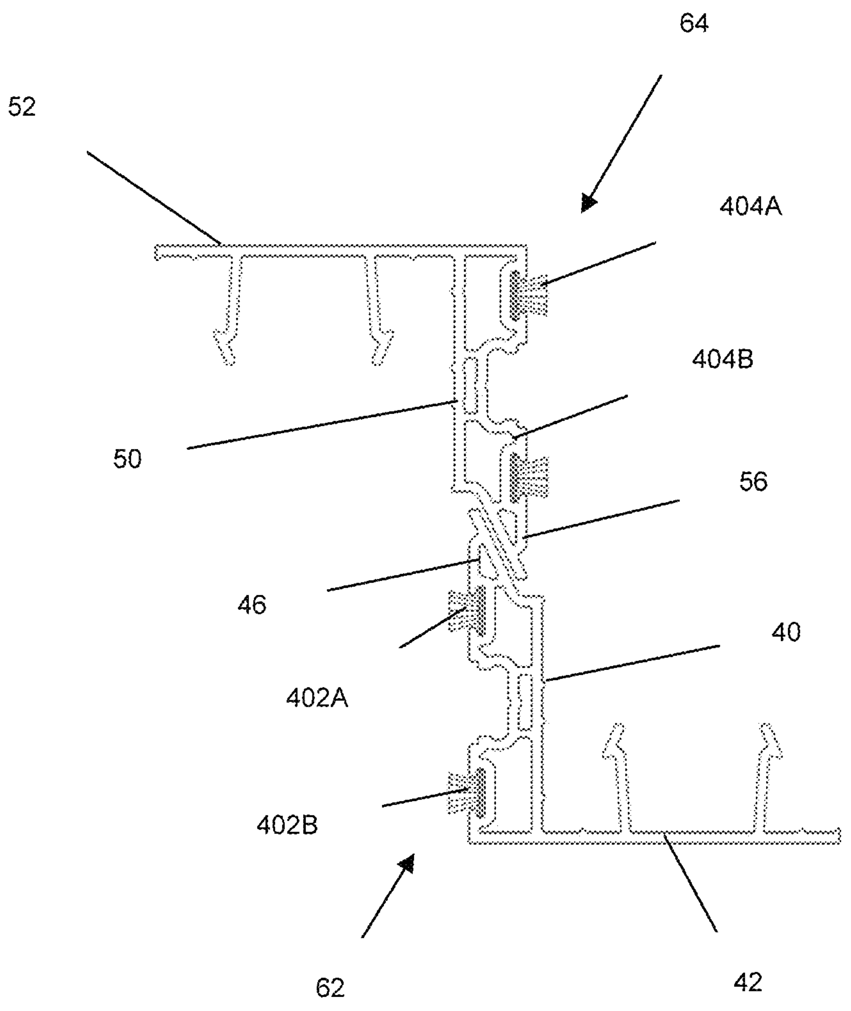
FIG. 18 is a cross-sectional view of the interior interlock and the exterior interlock of the framework assembly of FIG. 17, along line 18-18 shown in FIG. 17.
Figure 20:
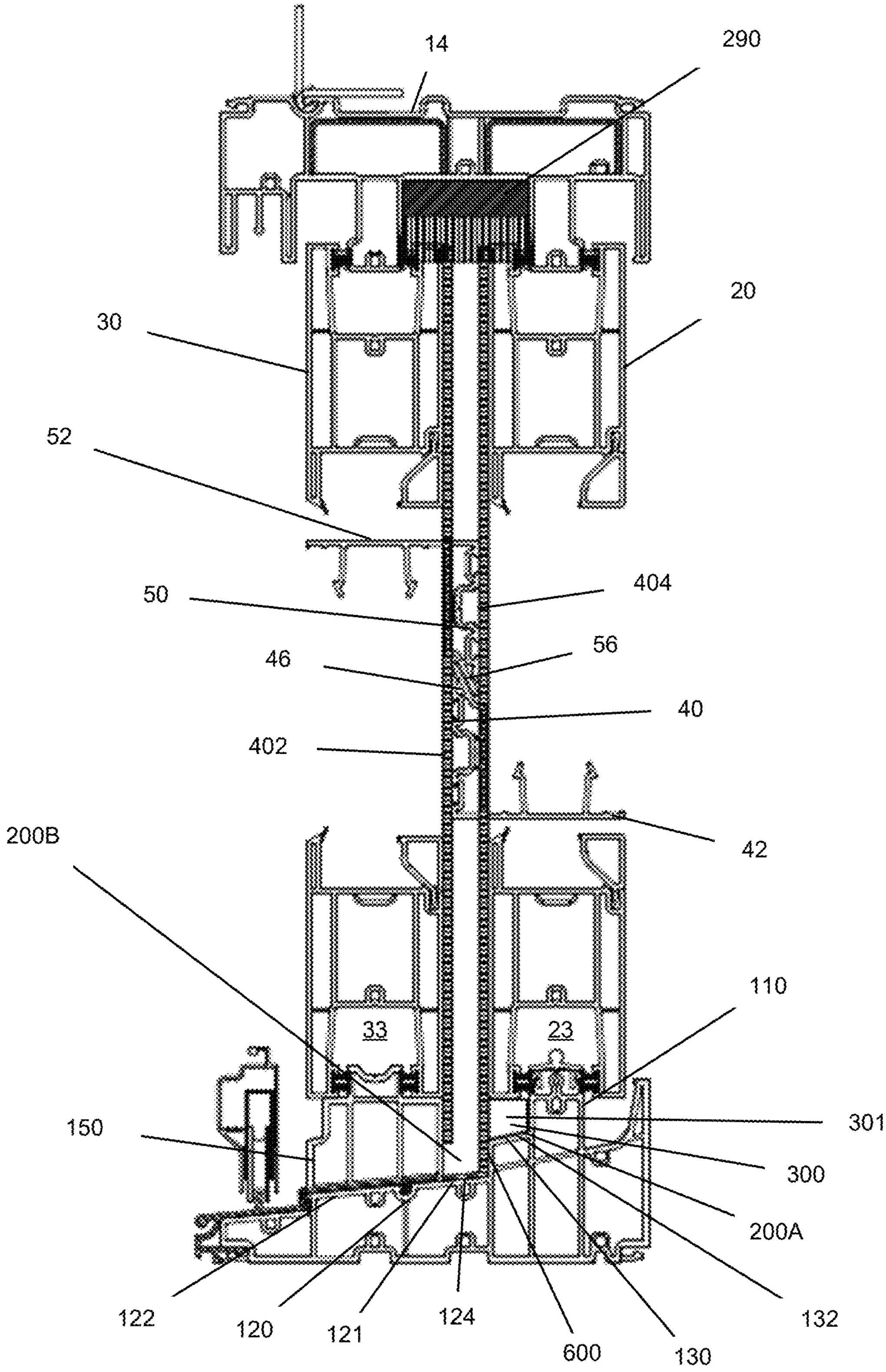
FIG. 20 is a schematic of the framework assembly, overlaying the cross-sectional view of the interior interlock and the exterior interlock of FIG. 18 and the cross-sectional view of the header, sill configuration, fixed sash configuration, and movable sash configuration of FIG. 19.

In some embodiments, for example, the interior interlock 40 includes an interior interlock cover 42, as depicted in FIG. 18 and FIG. 20. In some embodiments, for example, the interior interlock 40 is configured to connect to the movable sash 21, for example, to the side surface 26 of the movable sash 21. In some embodiments, for example, the interior interlock 40 is configured to connect to the movable sash 21 by snap fit connection. In some embodiments, for example, the interior interlock 40 is configured to connect to the movable sash 21 by interference fit or friction fit. While the interior interlock 40 is connected to the movable sash 21, the interior interlock cover 42 covers at least a portion of the side surface 26 of the movable sash 21. In some embodiments, for example, while the interior interlock 40 is connected to the movable sash 21, the interior interlock cover 42 covers the entirety of the side surface 26 of the movable sash 21.

In some embodiments, for example, the exterior interlock 50 includes an exterior interlock cover 52. In some embodiments, for example, the exterior interlock 50 is configured to connect to the fixed sash 31, for example, to the side surface 36 of the fixed sash 31. In some embodiments, for example, the exterior interlock 50 is configured to connect to the fixed sash 31 by snap fit connection. In some embodiments, for example, the exterior interlock 50 is configured to connect to the fixed sash 31 by interference fit or friction fit. While the exterior interlock 50 is connected to the fixed sash 31, the exterior interlock cover 52 covers at least a portion of the side surface 36 of the fixed sash 31. In some embodiments, for example, while the exterior interlock 50 is connected to the fixed sash 31, the exterior interlock cover 52 covers the entirety of the side surface 36 of the fixed sash 31.

As depicted, in some embodiments, for example, the interior interlock 40 and the movable sash 21 are separate parts such that the movable sash configuration 20 is a movable sash configuration assembly, wherein the interior interlock 40 and the movable sash 21 are connectible together, for example, by snap fit, and the exterior interlock 50 and the fixed sash 31 are separate parts such that the fixed sash configuration 30 is a fixed sash configuration assembly, wherein the exterior interlock 50 and the fixed sash 31 are connectible together, for example, by snap fit. In some embodiments, for example, the interior interlock 40 and the movable sash 21 are of unitary one piece construction. In some embodiments, for example, the exterior interlock 50 and the fixed sash 31 are of unitary one piece construction.

As depicted in FIG. 18, FIG. 20, and FIG. 21, in some embodiments, for example, the interior interlock 40 includes an interior interlock retaining counterpart 46. The interior interlock retaining counterpart 46 includes an angled surface. While the interior interlock 40 and the movable sash 21 are connected, the angled surface of the retaining counterpart 46 and the second surface 24 are co-operatively configured to define a receiving space 48 for receiving at least a portion of the exterior interlock retaining counterpart 56.

As depicted in FIG. 18, FIG. 20, and FIG. 21, in some embodiments, for example, the exterior interlock 50 includes an exterior interlock retaining counterpart 56. The exterior interlock retaining counterpart 56 includes an angled surface. While the exterior interlock 50 and the fixed sash 31 are connected, the angled surface of the retaining counterpart 56 and the first surface 32 are co-operatively configured to define a receiving space 58 for receiving at least a portion of the interior interlock retaining counterpart 46.

In some embodiments, for example, while the framework assembly 10 is disposed in the closed configuration, the interior interlock 40 and the exterior interlock 50 are co-operatively configured such that at least a portion of the interior interlock retaining counterpart 46 is disposed in the receiving space 58, and at least a portion of the exterior interlock retaining counterpart 56 is disposed in the receiving space 48, with effect that the interior interlock 40 and the exterior interlock 50 become disposed in an interlocking relationship, as depicted in FIG. 18, FIG. 20, and FIG. 21. As depicted, while the interior interlock 40 and the exterior interlock 50 become disposed in an interlocking relationship, the angled surface of the interior interlock retaining counterpart 46 and the angled surface of the exterior interlock retaining counterpart 56 are disposed in opposing relationship.

In some embodiments, for example, while the framework assembly 10 is disposed in the closed configuration and the interior lock 40 and the exterior lock 50 are disposed in the interlocking relationship, the interlocking of the interior interlock 40 and the exterior interlock 50 is with effect that displacement of one of the movable sash configuration 20 and the fixed sash configuration 30, relative to the other of the movable sash configuration 20 and the fixed sash configuration 30, is resisted.

In some embodiments, for example, while the framework assembly 10 is disposed in the closed configuration, and the interior lock 40 and the exterior lock 50 are disposed in the interlocking relationship, the interlocking of the interior interlock 40 and the exterior interlock 50 is with effect that the disposition of the movable sash configuration 20 and the fixed sash configuration 30 in the offset relationship is maintained.

In some embodiments, for example, while the framework assembly 10 is disposed in the closed configuration, and the interior lock 40 and the exterior lock 50 are disposed in the interlocking relationship, the interlocking of the interior interlock 40 and the exterior interlock 50 is with effect to interfere with fluid flow, for example, air, wind, rain, or snow, between the interior lock 40 and the exterior lock 50.

In some embodiments, for example, while the framework assembly 10 is disposed in the closed configuration, and the interior lock 40 and the exterior lock 50 are disposed in the interlocking relationship, the interlocking of the interior interlock 40 and the exterior interlock 50 is with effect that insertion of a tool, for example, a screw driver, between the interior interlock 40 and the exterior interlock 50, with effect that entry through the framework assembly 10 is forced, is resisted In some embodiments, for example, while the framework assembly 10 is disposed in the closed configuration, the sill configuration 100, the movable sash configuration 20, and the fixed sash configuration 30 are co-operatively configured such that a space, extending in a vertical direction, is defined between the movable sash 21 and the fixed sash 31. In some embodiments, for example, the space is defined between a portion of the second surface 24 of the movable sash 21 and a portion first surface 32 of the fixed sash that are disposed in opposing relationship while the framework assembly 10 is disposed in the closed configuration.

In some embodiments, for example, as depicted in FIG. 21, the movable sash configuration 20 includes a sealing configuration 62, and the fixed sash configuration 30 includes a sealing configuration 64. Each one of the sealing configuration 62 and the sealing configuration 64, independently, is configured to be disposed within the vertically extending space defined between the movable sash 21 and the fixed sash 31 while the framework assembly 10 is disposed in the closed configuration.

In some embodiments, for example, the sealing configuration 62 of the movable sash configuration 20 effects sealing of the vertically extending space defined between the movable sash 21 and the fixed sash 31 while the framework assembly 10 is disposed in the closed configuration, the sealing of the space is with effect that the sealing interferes with fluid flow, for example, air flow, rain, or snow, between the movable sash 21 and the fixed sash 31, while the framework assembly 10 is disposed in the closed configuration. In some embodiments, for example, the interfering is along the entire height of the movable sash 21 and the fixed sash 31. In some embodiments, for example, the interfering is between the entirety of the portion of the second surface 24 of the movable sash 21 and a portion first surface 32 of the fixed sash that are disposed in opposing relationship while the framework assembly 10 is disposed in the closed configuration.

In some embodiments, for example, the sealing configuration 62 of the movable sash configuration 20 is defined by one or more sealing members 402. In some embodiments, for example, the sealing configuration 62 is defined by one sealing member 402. As depicted in FIG. 21, in some embodiments, for example, the sealing configuration 62 is defined by two sealing members 402A and 402B. In some embodiments, for example, for each of the one or more sealing members 402, the sealing member 402 is defined by a weather strip. In some embodiments, for example, for each of the one or more sealing members 402, independently, the sealing member 402 includes a resilient sealing bead that is deformable in response to engagement with the first surface 32 for effecting the sealing of the space. In some embodiments, for example, the sealing configuration 62 is connected to the movable sash 21 of the movable sash configuration 20. In some embodiments, for example, the connection of the sealing configuration 62 to the movable sash 21 is effected by connection of the sealing configuration 62 to the interior interlock 40 that is connected to the movable sash 21, as depicted in FIG. 20 and FIG. 21. In some embodiments, for example, for each of the one or more sealing members 402, independently, the sealing member 402 includes a t-connector, and a t-slot is defined by the interior interlock 40 that is configured to slidably receive the t-connector of the sealing member 402 for effecting connection of the sealing member 402 to the interior interlock 40.

In some embodiments, for example, while the sealing configuration 62 is connected to the movable sash 21, each of the one or more sealing members 402 extends in a direction along an axis that is parallel to the central longitudinal axis of the movable sash 21. In some embodiments, for example, while the sealing configuration 62 is connected to the movable sash 21, each of the one or more sealing members 402 extends continuously between the top end and the bottom end of the movable sash 21. In some embodiments, for example, while the framework assembly 10 is mounted within the opening of the building construction, and the sealing configuration 62 is connected to the movable sash 21, each one of the one or more sealing members 402, independently, extends in a vertical direction.

In some embodiments, for example, the sealing configuration 64 of the fixed sash configuration 30 effects sealing of the vertically extending space defined between the movable sash 21 and the fixed sash 31 while the framework assembly 10 is disposed in the closed configuration, the sealing of the space is with effect that the sealing interferes with fluid flow, for example, air flow, rain, or snow, between the movable sash 21 and the fixed sash 31, while the framework assembly 10 is disposed in the closed configuration. In some embodiments, for example, the interfering is along the entire height of the movable sash 21 and the fixed sash 31. In some embodiments, for example, the interfering is between the entirety of the portion of the second surface 24 of the movable sash 21 and a portion first surface 32 of the fixed sash that are disposed in opposing relationship while the framework assembly 10 is disposed in the closed configuration.

In some embodiments, for example, the sealing configuration 64 of the fixed sash configuration 30 is defined by one or more sealing members 404. In some embodiments, for example, the sealing configuration 64 is defined by one sealing member 404. As depicted in FIG. 21, in some embodiments, for example, the sealing configuration 64 includes two sealing members 404A and 404B. In some embodiments, for example, for each of the one or more sealing members 404, the sealing member 404 is defined by a weather strip. In some embodiments, for example, for each of the one or more sealing members 404, independently, the sealing member 404 includes a resilient sealing bead that is deformable in response to engagement with the second surface 24 for effecting the sealing of the space. In some embodiments, for example, the sealing configuration 64 is connected to the fixed sash 31 of the fixed sash configuration 30. In some embodiments, for example, the connection of the sealing configuration 64 to the fixed sash 31 is effected by connection of the sealing configuration 64 to the exterior interlock 50 that is connected to the fixed sash 31, as depicted in FIG. 20 and FIG. 21. In some embodiments, for example, for each of the one or more sealing members 404, independently, the sealing member 404 includes a t-connector, and a t-slot is defined by the exterior interlock 50 that is configured to slidably receive the t-connector of the sealing member 404 for effecting connection of the sealing member 402 to the exterior interlock 50.

In some embodiments, for example, while the sealing configuration 64 is connected to the fixed sash 31, each of the one or more sealing members 404 extends in a direction along an axis that is parallel to the central longitudinal axis of the fixed sash 31. In some embodiments, for example, while the sealing configuration 64 is connected to the movable sash 21, each of the one or more sealing members 404 extends continuously between the top end and the bottom end of the fixed sash 31. In some embodiments, for example, while the framework assembly 10 is mounted within the opening of the building construction, and the sealing configuration 64 is connected to the fixed sash 31, each one of the one or more sealing members 404, independently, extends in a vertical direction.

Figure 19:
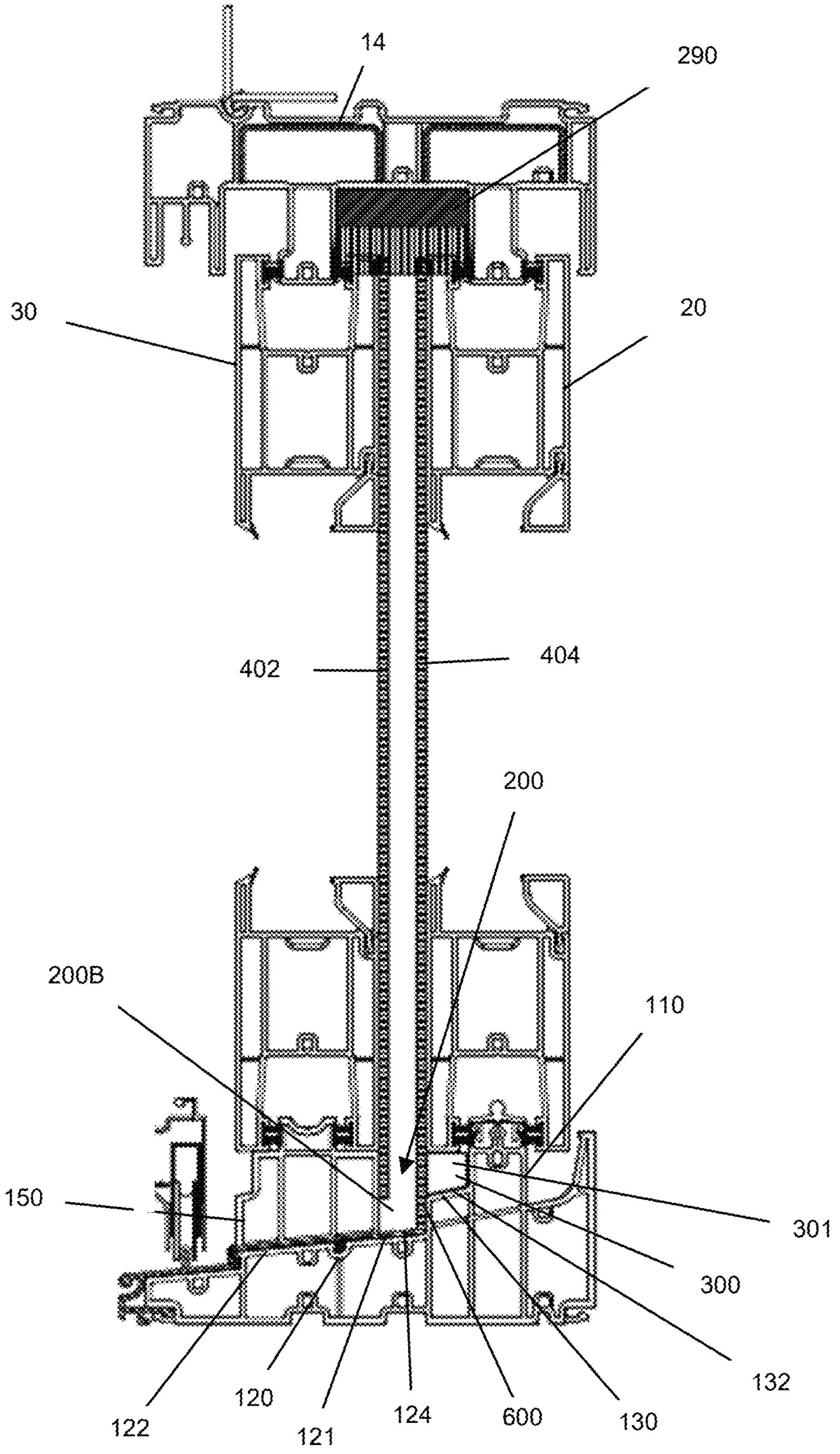
FIG. 19 is a cross-sectional view depicting the header, sill configuration, top and bottom end of the fixed sash configuration, and top and bottom end of the movable sash configuration, of the framework assembly of FIG. 17, along line 19-19 shown in FIG. 17.

In some embodiments, for example, as depicted in FIG. 19 and FIG. 20, the sealing configuration 64 extends to a fixed sash supporting surface 122. In some embodiments, for example, the extending of the sealing configuration 64 to a fixed sash supporting surface 122 is with effect that the sealing configuration 64 engages with a transitional wall surface 138 of a transitional wall member 136 and also with a sill compensator mounting surface 122.

The framework assembly 10 includes a sill configuration 100. In some embodiments, for example, the sill configuration 100 is configured for co-operation with the movable sash configuration 20 and the fixed sash configuration 30 such that the movable sash configuration 20 and the fixed sash configuration 30 are mountable to the sill configuration 100.

The sill configuration 100 includes a sill base configuration 120, wherein the sill base configuration defines a sill base 121. The sill base 121 defines a first side 102, and a second side 104 disposed on an opposite side of the sill base 121 relative to the first side 102. While the framework assembly 10 is mounted within the opening of the building construction, the first side 102 is configured to be exposed to the inside of the building, and the second side 104 is configured to be exposed to the outside of the building.

In some embodiments, for example, the sill base 121 defines a movable sash supporter 110. As depicted in FIG. 6 to FIG. 10, the movable sash supporter 110 is disposed at the first end 102 of the sill base 121.

In some embodiments, for example, the movable sash supporter 110 is configured to support the movable sash configuration 20 while the movable sash configuration 20 is mounted to the movable sash supporter 110. While the movable sash configuration 20 is supported by the movable sash supporter 110, for example, while the movable sash configuration 20 is mounted to the sill configuration 100, the movable sash configuration 20 is configured for slidable movement, relative to the sill configuration 100, such that the framework assembly 10 is transitionable between the opened configuration and the closed configuration.

In some embodiments, for example, the sill base configuration 120 includes a track 106, and the supporting of the movable sash configuration 20 by the movable sash supporter 110 is effected by supporting of one or more sash wheels of the movable sash configuration 20 by the track 106. In some embodiments, for example, each one of the one or more sash wheels of the movable sash configuration 20, independently, is disposed in a channel 23 defined by the movable sash 21. In some embodiments, for example, the track 106 and the sill base 121 are separate parts such that the sill base configuration 120 is a sill base configuration assembly, wherein the track 106 and the movable sash supporter 110 of the sill base 121 are connectible together, for example, by snap fit connection. In some embodiments, for example, sash wheels of the movable sash configuration 20 are mounted to the track 106 for movement of the movable sash configuration 20 along the track 106, such that the movement of the sash wheels along the track 106 is transmitted to the movable sash configuration 20, such that movability of the movable sash configuration 20 relative to the sill 100 is established by the mounting of the sash wheels to the track 106.

In some embodiments, for example, the track 106 and the movable sash supporter 110 are of unitary one piece construction.

In some embodiments, for example, the sill base 121 defines a sill compensator mounting surface 122 that is configured such that a sill compensator 150 is extendible from the sill compensator mounting surface 122. In some embodiments, for example, the sill compensator mounting surface 122 is inclined such that fluid disposed on the sill compensator mounting surface 122 is encouraged by gravitational forces to flow away from the movable sash supporter 110 and away from the shoulder 130. In some embodiments, for example, the sill compensator mounting surface 122 is inclined by a minimum value of at least 5 degrees. In some embodiments, for example, the sill compensator mounting surface 122 is inclined by a minimum value of at least 7.5 degrees. In some embodiments, for example, the sill compensator mounting surface 122 is inclined by a minimum value of at least 10 degrees. In some embodiments, for example, while the framework assembly 10 is mounted within the opening of the building construction, the sill compensator mounting surface 122 is inclined such that fluid disposed on the sill compensator mounting surface 122 is encouraged by gravitational forces to flow away from the inside of the building. In some embodiments, for example, while the framework assembly 10 is mounted within the opening of the building construction, the sill compensator mounting surface 122 is inclined by a minimum value of at least 5 degrees. In some embodiments, for example, while the framework assembly 10 is mounted within the opening of the building construction, the sill compensator mounting surface 122 is inclined by a minimum value of at least 7.5 degrees. In some embodiments, for example, while the framework assembly 10 is mounted within the opening of the building construction, the sill compensator mounting surface 122 is inclined by a minimum value of at least 10 degrees.

In some embodiments, for example, as depicted in FIG. 6, FIG. 8, FIG. 19, and FIG. 20, the sill base configuration 120 includes a sill compensator 150 that is extendible from the sill compensator mounting surface 122. The sill base configuration 120 and the sill compensator 150 are co-operatively configured such that, while the sill compensator 150 is extending from the sill compensator mounting surface 122, the supporting of the fixed sash configuration 30 by the sill configuration 100 is effected by supporting of the fixed sash configuration 30 by the sill compensator 150.

In some embodiments, for example, the function of the sill compensator 150 is so that the same sash can be manufactured for the movable sash 21 and the fixed sash 31. In some embodiments, for example, while the sill compensator 150 is extending from the sill compensator mounting surface 122, a level surface is defined by the sill compensator 150 to support the fixed sash configuration 30. In some embodiments, for example, while the assembly 10 is mounted within the opening of the building construction, the sill compensator 150 is connected to the sill compensator mounting surface 122, the fixed sash configuration 30 is mounted to the sill compensator 150, and the movable sash configuration 20 is mounted to the movable sash support 110, the movable sash configuration 20 and the fixed sash configuration 30 are elevated, relative to the base of the opening, by the same height, such that the movable ash assembly 20 and the fixed sash configuration 30 are level.

In some embodiments, for example, the sill compensator 150 and the sill base 121 are separate parts such that the sill base configuration 120 is a sill base configuration assembly, wherein the sill compensator 150 and the sill base 121 are connectible together, for example, by snap fit connection. In some embodiments, for example, the sill compensator 150 and the sill base 121 are of unitary one piece construction.

Figure 6:
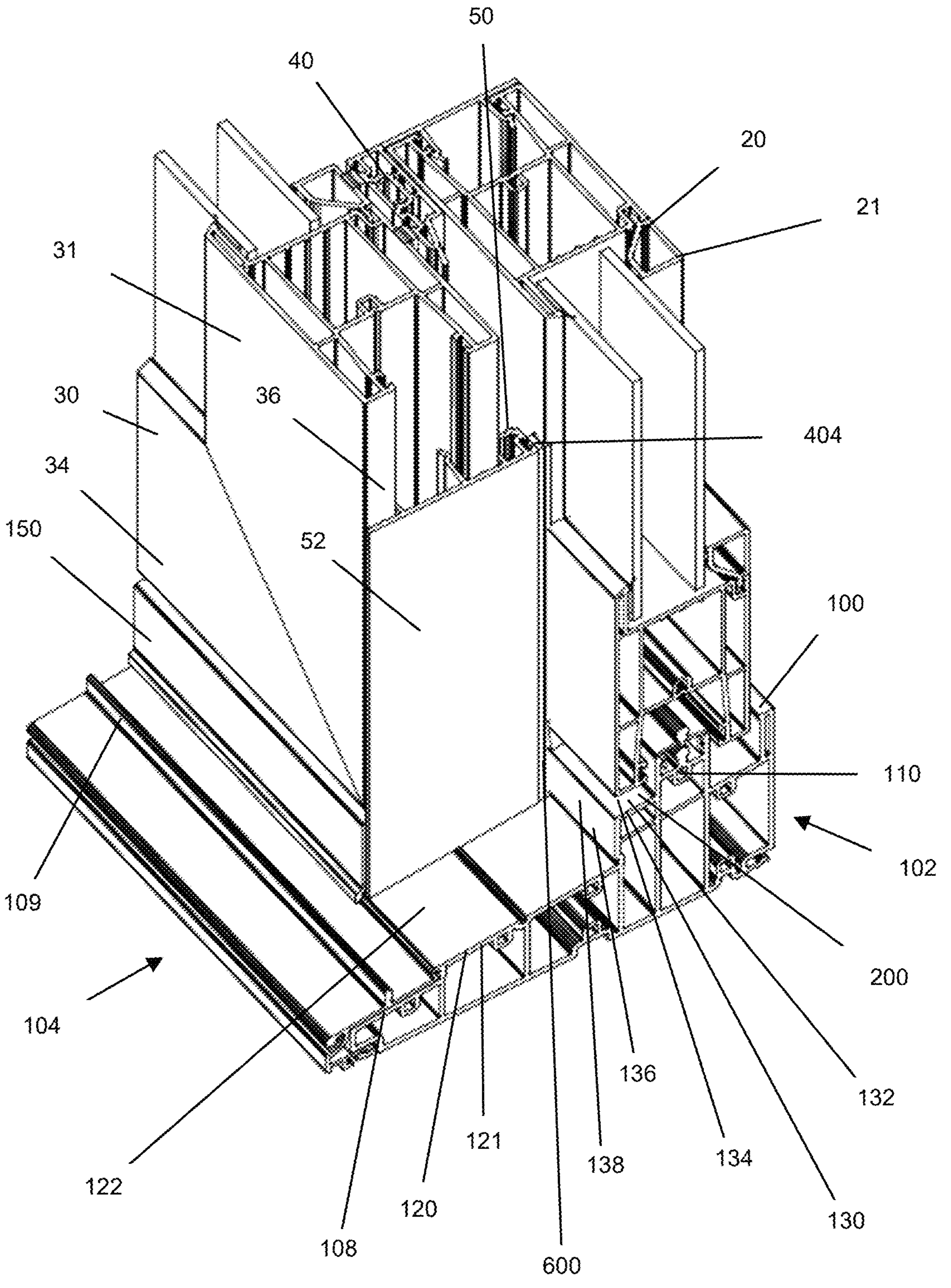
FIG. 6 is a perspective view of another embodiment of a framework assembly that substantially corresponds to the framework assembly of FIG. 1 except the movable sash configuration of the framework assembly of FIG. 6 is displaced in an opposite direction relative to the movable sash configuration of the framework assembly of FIG. 1 for configuring the framework assembly of FIG. 6 in the open configuration and the closed configuration.

In some embodiments, for example, the sill base 121 defines includes a screen supporter 108 to support a screen door. As depicted in FIG. 6, the screen supporter 108 is disposed towards the second side of the 104 of the sill base 121, relative to the sill compensator mounting surface 122. While the screen door is supported by the screen supporter 108, the screen door is configured for slidable movement, relative to the sill configuration 100.

In some embodiments, for example, the sill base configuration 120 includes a track 109, and the supporting of the screen door by the screen supporter 108 is effected by supporting of one or more wheels of the screen door by the track 109. In some embodiments, for example, the track 109 and the sill base 121 are separate parts such that the sill base configuration 120 is a sill base configuration assembly, wherein the track 109 and the screen supporter 108 of the sill base 121 are connectible together, for example, by snap fit connection. In some embodiments, for example, wheels of the screen are mounted to the track 109 for movement of the screen door along the track 109, such that the movement of the wheels along the track 109 is transmitted to the screen door, such that movability of the screen door relative to the sill configuration 100 is established by the mounting of the wheels to the track 109.

In some embodiments, for example, the track 109 and the movable sash supporter 110 are of unitary one piece construction.

In some embodiments, for example, the sill configuration 100, the movable sash configuration 20, and the fixed sash configuration 30 co-operatively configured such that while the movable sash configuration 20 and the fixed sash configuration 30 are mounted to the sill configuration 100, the movable sash configuration 20, the fixed sash configuration 30, and the sill configuration 100 are co-operatively disposed such that a space 200 is defined between the movable sash configuration, the fixed sash configuration, and the sill configuration, as depicted in FIG. 6 to FIG. 8, FIG. 19, and FIG. 20. In some embodiments, for example, the space 200 includes space defined below the movable sash 21. In some embodiments, for example, the space 200 is defined exclusively below the movable sash 21. In some embodiments, for example, the space 200 is defined below the movable sash 21 between the movable sash configuration 20, the fixed sash configuration 30, and the sill configuration 100 due to: (i) the movable sash 21 being disposed in offset relationship, relative to the fixed sash 31, and (ii) the movable sash 21 being elevated above the sill base configuration 120 by the supporting of the movable sash configuration 20 by the movable sash supporter 110, to effect slidable movement of the movable sash configuration 20 relative to the sill configuration 100 via the mounting of the sash wheels to the track 106, for example, to effect the transition of the assembly 10 between the different configurations, for example, the open configuration or the closed configuration. Such disposition of the movable sash configuration 20 relative to the fixed sash configuration 20 and the sill base configuration 120 effects definition of the space 200 through which debris can ingress. In some embodiments, for example, the space 200 extends in a direction along an axis that is parallel to a central longitudinal axis of the sill configuration 100, for example, the sill base 121. In some embodiments, for example, fluid communication through the framework assembly 10 is effectible via the space 200.

In some embodiments, for example, while the framework assembly is mounted within the opening of the building construction, at least 50% of the cross-sectional area of the space 200 is disposed a minimum distance of at least 1 inch above the base of the opening.

In some embodiments, for example, as depicted in FIG. 6 to FIG. 10, FIG. 19, and FIG. 20, to interfere with ingress of debris through the channel 200, the sill configuration 100 includes a plug-supporting surface configuration for supporting a plug configuration 300, wherein the plug configuration 300 includes at least one plug 301. While the movable sash configuration 20 and the fixed sash configuration 30 are mounted to the sill configuration 100, the movable sash configuration 20, the fixed sash configuration 30, and the sill configuration 100 are co-operatively disposed such that a space 200 is defined between the movable sash configuration 20, the fixed sash configuration 30, and the sill configuration 100, and the supporting of the plug configuration 300, by the plug-supporting surface configuration, is a supporting of the plug configuration within the space 200. In some embodiments, for example, while the plug configuration 300 is supported by the plug-supporting surface configuration and disposed within the space 200, the plug configuration 300 is configured to interfere with ingress of debris through the space 200. In some embodiments, for example, the interfering of debris through the space 200 by the plug configuration 300 includes preventing passage of debris through the space 200.

In some embodiments, for example, while the movable sash configuration 20 and the fixed sash configuration 30 are mounted to the sill configuration 100, the space 200 and the plug configuration 300 are co-operatively configured such that the plug configuration 300 is pressed within the space 200.

In some embodiments, for example, while the movable sash configuration 20 and the fixed sash configuration 30 are mounted to the sill configuration 100, the space 200 and the plug configuration 300 are co-operatively configured such that the plug configuration 300 occupies the entirely of the space 200.

In some embodiments, for example, as depicted in FIG. 6 to FIG. 10, FIG. 19, and FIG. 20, the sill configuration 100 includes a shoulder 130 that defines a shoulder-defined plug-supporting surface 132, the plug supporting surface configuration including the shoulder-defined plug supporting surface 132. The shoulder-defined plug supporting surface 132 is configured to support the plug configuration 300. While the movable sash configuration 20 and the fixed sash configuration 30 are mounted to the sill configuration 100, the plug supporting surface 132 of the shoulder 130 is configured for supporting the plug configuration 300 for disposition within the space 200. While the movable sash configuration 20 and the fixed sash configuration 30 are mounted to the sill configuration 100, the supporting of the plug configuration 300, by the plug-supporting surface 132, is a supporting of the plug configuration 300 within the space 200. In some embodiments, for example, while the plug configuration 300 is supported by the plug-supporting surface 132 and disposed within the space 200, the plug configuration 300 is configured to interfere with ingress of debris through the space 200. In some embodiments, for example, the interfering of debris through the space 200 by the plug configuration 300 includes preventing passage of debris through the space 200.

In some embodiments, for example, the shoulder 130 is disposed between the movable sash supporter 110 and the sill compensator mounting surface 122, as depicted in FIG. 6 to FIG. 10, FIG. 19, and FIG. 20.

In some embodiments, for example, the width of the plug supporting surface 132 has a minimum value of at least ⅜ inches.

The plug-supporting surface 132 is offset, for example, elevated, relative to the sill compensator mounting surface 122 by a minimum distance of at least ⅜ inches.

In some embodiments, for example, while the framework assembly 10 is mounted within the opening of the building construction, the plug-supporting surface 132 is disposed above the base of the opening by a minimum vertical distance of at least 1 inch.

In some embodiments, for example, the plug supporting surface 132 defines a horizontal planar surface while the framework assembly 10 is mounted within the opening of the building construction.

In some embodiments, for example, the plug supporting surface 132 defines an inclined planar surface while the framework assembly 10 is mounted within the opening of the building construction, as depicted in FIG. 19 and FIG. 20, such that fluid disposed on the plug supporting surface 132 is encouraged by gravitational forces to flow off the plug supporting surface 132, towards the sill compensator mounting surface 122, and away from the inside of the building. In some embodiments, for example, while the framework assembly 10 is mounted within the opening of the building construction, the plug supporting surface 132 is inclined by a minimum value of at least 5 degrees. In some embodiments, for example, while the framework assembly 10 is mounted within the opening of the building construction, the plug supporting surface 132 is inclined by a minimum value of at least 7.5 degrees. In some embodiments, for example, while the framework assembly 10 is mounted within the opening of the building construction, the plug supporting surface 132 is inclined by a minimum value of at least 10 degrees.

In some embodiments, for example, as depicted in FIG. 6 to FIG. 10, FIG. 19, and FIG. 20, the shoulder 130 includes a plug supporting surface-defining member 134 that defines the shoulder-defined plug supporting surface 132. In some embodiments, for example, the plug supporting surface-defining member 134 extends from the movable sash supporter 110. As depicted, the plug supporting surface-defining member 134 extends from the movable sash supporter 110, for example, in a direction towards the second side 104 of the sill base 121, for example, towards the fixed sash configuration 30.

In some embodiments, for example, as depicted in FIG. 6 to FIG. 10, FIG. 19, and FIG. 20, the shoulder 130 includes a transitional wall member 136. As depicted, the transitional wall member 136 extends between the sill compensator mounting surface 122 and the plug supporting surface 132 defined by the plug supporting surface defining member 134.

In some embodiments, for example, the transitional wall member 136 defines a transitional wall surface 138. In some embodiments, for example, the transitional wall member surface 138 is disposed at an angle, relative to the sill compensator mounting surface 122, having a minimum value of at least 95 degrees.

In some embodiments, for example, while the framework assembly 10 is mounted within the opening of the building construction, the transitional wall surface 138 extends vertically from the base of the opening.

In some embodiments, for example, while the framework assembly 10 is mounted within the opening of the building construction, an acute angle defined between the transitional wall surface 138 and a vertical plane, wherein said acute angle has a maximum value of 45 degrees. In some embodiments, for example, while the framework assembly 10 is mounted within the opening of the building construction, the transitional wall member 136 extends in a direction towards the first side 102 of the sill base 121.

In some embodiments, for example, as depicted in FIG. 6 and FIG. 19, the exterior interlock cover 52 and the sealing configuration 64 extend from the top of the fixed sash 31, past the bottom of the fixed sash 31, and to the sill compensator mounting surface 122.

In some embodiments, for example, the shoulder 130 and the sill base configuration 120 are separate parts such that the sill configuration 100 is a sill configuration assembly, wherein the shoulder 130 and the sill base 121 are connectible together, for example, by snap fit. In some embodiments, for example, the shoulder 130 and the sill base 121 are of unitary one piece construction.

In some embodiments, for example, as depicted in FIG. 6 to FIG. 10, FIG. 19, and FIG. 20, the space 200 includes an upper space portion disposed above the shoulder 130, and a lower space portion disposed below the shoulder 130. In some embodiments, for example, the cross-sectional area of the upper space portion is greater than the cross-sectional area of the second space portion. In some embodiments, for example, the ratio of the cross-sectional area of the upper space portion to the cross-sectional area of the lower space portion has a minimum value of at least 1.5 to 1. In some embodiments, for example, the plug configuration is disposed in the space 200. In some embodiments, for example, a respective plug of the plug configuration 300 is disposed in each one of the upper and lower space portions, respectively.

In some embodiments, for example, as depicted in FIG. 6 to FIG. 10, FIG. 19, FIG. 19, and FIG. 20, the space 200 includes a first space portion 200A and a second space portion 200B. In some embodiments, for example, the space 200 is defined by the first space portion 200A and the second space portion 200B. As depicted, the first space portion 200A is defined above the shoulder defined plug-supporting surface 132, below the movable sash 21, and laterally of the movable sash supporter 110. In some embodiments, for example, the first space portion 200A is defined between the movable sash 21 and the plug supporting surface 132, and between the movable sash supporter 110 and the sealing configuration 64. In some embodiments, for example, the second space portion 200B is defined above a portion of the sill compensator mounting surface 122, and between the sill compensator 150 and the transitional wall member 136. In some embodiments, for example, the second space portion 200B is defined between the fixed sash 31 and the sill compensator mounting surface 122, and between the sill compensator 150 and the first space portion 200A.

In some embodiments, for example, as depicted in FIG. 6 to FIG. 10, FIG. 19, FIG. 20, and FIG. 22, while the framework assembly 10 is mounted within the opening of the building construction, at least 50% of the cross-sectional area of the space 200 is disposed above the sill compensator mounting surface 122, for example, by a minimum distance of at least ⅜ inches. In some embodiments, for example, as depicted in FIG. 6 to FIG. 10, FIG. 19, FIG. 20, and FIG. 22, while the framework assembly 10 is mounted within the opening of the building construction, at least 60% of the cross-sectional area of the space 200 is disposed above the sill compensator mounting surface 122, for example, by a minimum distance of at least ⅜ inches.

In some embodiments, for example, as depicted in FIG. 6 to FIG. 10, FIG. 19, FIG. 20, and FIG. 22, while the framework assembly 10 is mounted within the opening of the building construction, at least 50% of the cross-sectional area of the space 200 is disposed a minimum distance of at least 1 inch above the base. In some embodiments, for example, as depicted in FIG. 6 to FIG. 10, FIG. 19, FIG. 20, and FIG. 22, while the framework assembly 10 is mounted within the opening of the building construction, at least 60% of the cross-sectional area of the space 200 is disposed a minimum distance of at least 1 inch above the base.

In some embodiments, for example, the plug configuration 300 includes the plug 301 for interference with ingress of debris through the first space portion 200A. While the movable sash configuration 20 and the fixed sash configuration 30 are mounted to the sill configuration 100, the plug supporting surface 132 of the shoulder 130 is configured for supporting the plug 301 for disposition within the first space portion 200A. While the movable sash configuration 20 and the fixed sash configuration 30 are mounted to the sill configuration 100, the supporting of the plug 301, by the plug-supporting surface 132, is a supporting of the plug 301 within the first space portion 200A. In some embodiments, for example, while the plug 301 is supported by the plug-supporting surface 132 and disposed within the first space portion 200A, the plug 301 is configured to interfere with ingress of debris through the first space portion 200A. In some embodiments, for example, the interfering of debris through the first space portion 200A by the plug 301 includes preventing passage of debris through the first space portion 200A.

In some embodiments, for example, while the movable sash configuration 20 and the fixed sash configuration 30 are mounted to the sill configuration 100, the first space portion 200A and the plug 301 are co-operatively configured such that the plug 301 is pressed within the first space portion 200A, for example, between movable sash 21 and the shoulder 130.

In some embodiments, for example, while the movable sash configuration 20 and the fixed sash configuration 30 are mounted to the sill configuration 100, the first space portion 200A and the plug 301 are co-operatively configured such that the plug 301 occupies the entirely of the first space portion 200A.

In some embodiments, for example, the first space portion 200A is configured to receive a plug 301 to interfere with passage of debris between the movable sash configuration 20 and the fixed sash configuration 30, for example, through the first space portion 200A. In some embodiments, for example, while the plug 301 is disposed in the first space portion 200A, the plug 301 extends through at least a portion of the first space portion 200A. In some embodiments, for example, while the plug 301 is disposed in the first space portion 200A, the plug 301 extends through the entirety of the first space portion 200A. In some embodiments, for example, while the plug 301 is disposed in the first space portion 200A, the plug 301 is disposed below the movable sash 21. In some embodiments, for example, while the framework 10 is disposed in the closed configuration, and while the plug 301 is disposed in the first space portion 200A, the plug 301 is disposed below the movable sash 21. In some embodiments, for example, while the framework 10 is disposed in the open configuration, and while the plug 301 is disposed in the first space portion 200A the plug 301 is disposed below the movable sash 21. In some embodiments, for example, the plug 301 and the first space portion 200A have the same cross-sectional area, and the plug 301 is configured to fill at least a portion of the first space portion 200A. In some embodiments, for example, the plug 301 and the first space portion 200A have the same cross-sectional area, and the plug 301 is configured to fill at least the entirety of the first space portion 200A.

In some embodiments, for example, the plug 301 is a dust plug. The plug 301 includes an outer surface that includes a side surface 302A configured for facing the second side 104 of the sill base 121 while the plug 301 is disposed in the first space portion 200A, a side surface 302B configured for facing the first side 102 of the sill base 121 while the plug 301 is disposed in the first space portion 200A, a top surface 304, and a bottom surface 306, as depicted in FIG. 22 to FIG. 25. In some embodiments, for example, while the movable sash configuration 20 and the fixed sash configuration 30 are supported by the sill configuration 100, and the plug 301 is disposed in the first space portion 200A, the side surface 302A is facing the fixed sash configuration 30. In some embodiments, for example, while the movable sash configuration 20 and the fixed sash configuration 30 are supported by the sill configuration 100, and the plug 301 is disposed in the first space portion 200A, the side surface 302A is facing the sill compensator 150.

In some embodiments, for example, the plug 301 has a minimum width of at least 0.5 inches. In some embodiments, for example, the plug 301 has a minimum height of at least 0.5 inches. In some embodiments, for example, the plug 301 has a minimum length of at least 2 inches. In some embodiments, for example, the plug 301 has a minimum longitudinal cross-sectional area of at least 0.25 inches squared.

While the plug 301 is disposed in the first space portion 200A, the plug 301 is elevated from the sill compensator mounting surface 122. In some embodiments, for example, while the plug 301 is disposed in the first space portion 200A, the plug 301 is disposed above the sill compensator mounting surface 122 by a minimum distance of at least ⅜ inches. In some embodiments, for example, while the plug 301 is disposed in the first space portion 200A, the plug 301 is supported by the plug supporting surface 132.

Figure 5:
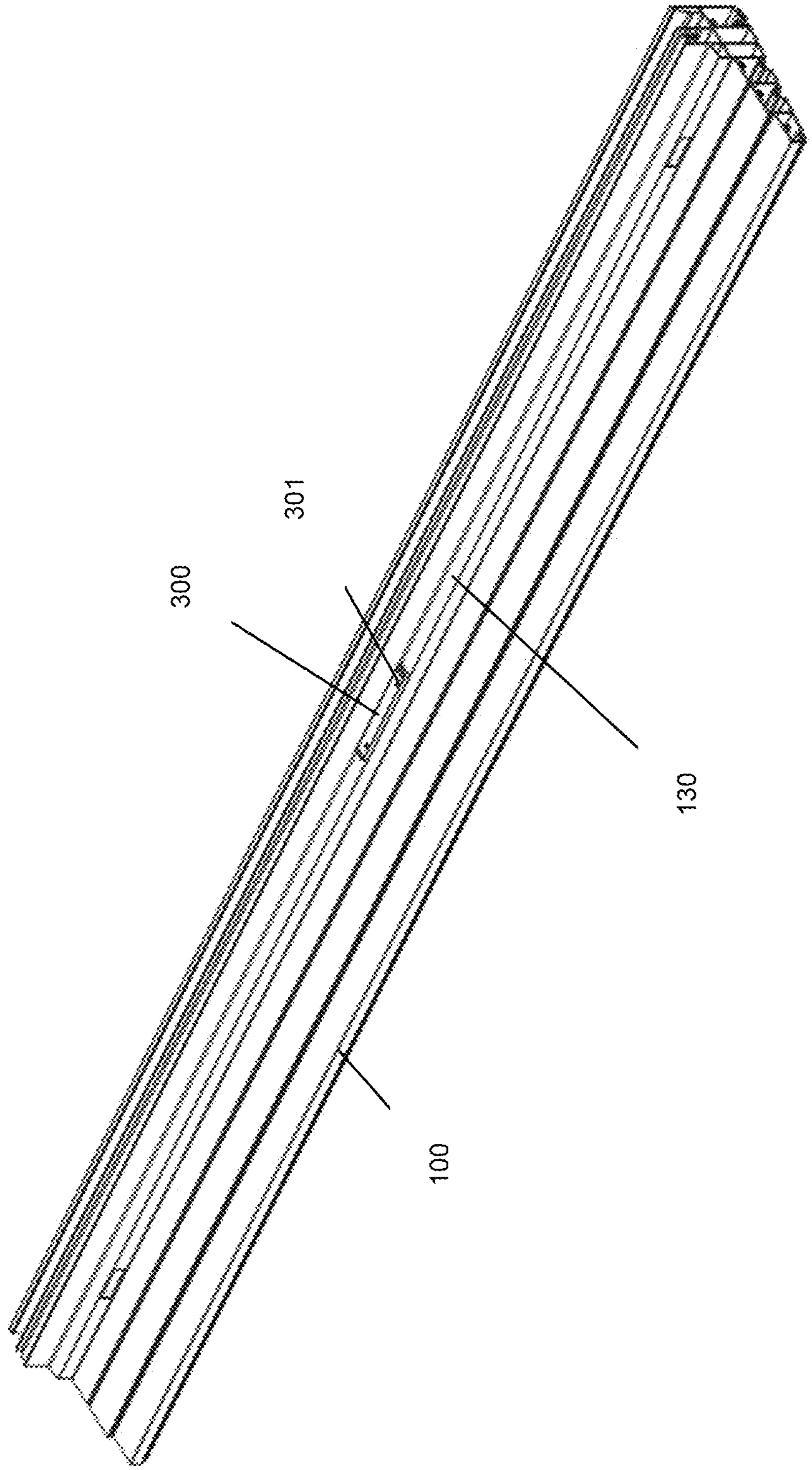
FIG. 5 is a perspective view of a sill configuration of the framework assembly of FIG. 1, with a plug configuration supported by a plug supporting surface of the sill configuration.

FIG. 5 depicts the plug 301 that is supported by the plug-supporting surface 132. In some embodiments, for example, while the assembly 10 is mounted within to the opening of the building construction, and the plug 301 is supported by the plug-supporting surface 132 and disposed in the first space portion 200A, the plug 301 is disposed above the base by a minimum vertical distance of at least 1 inch.

Figure 22:
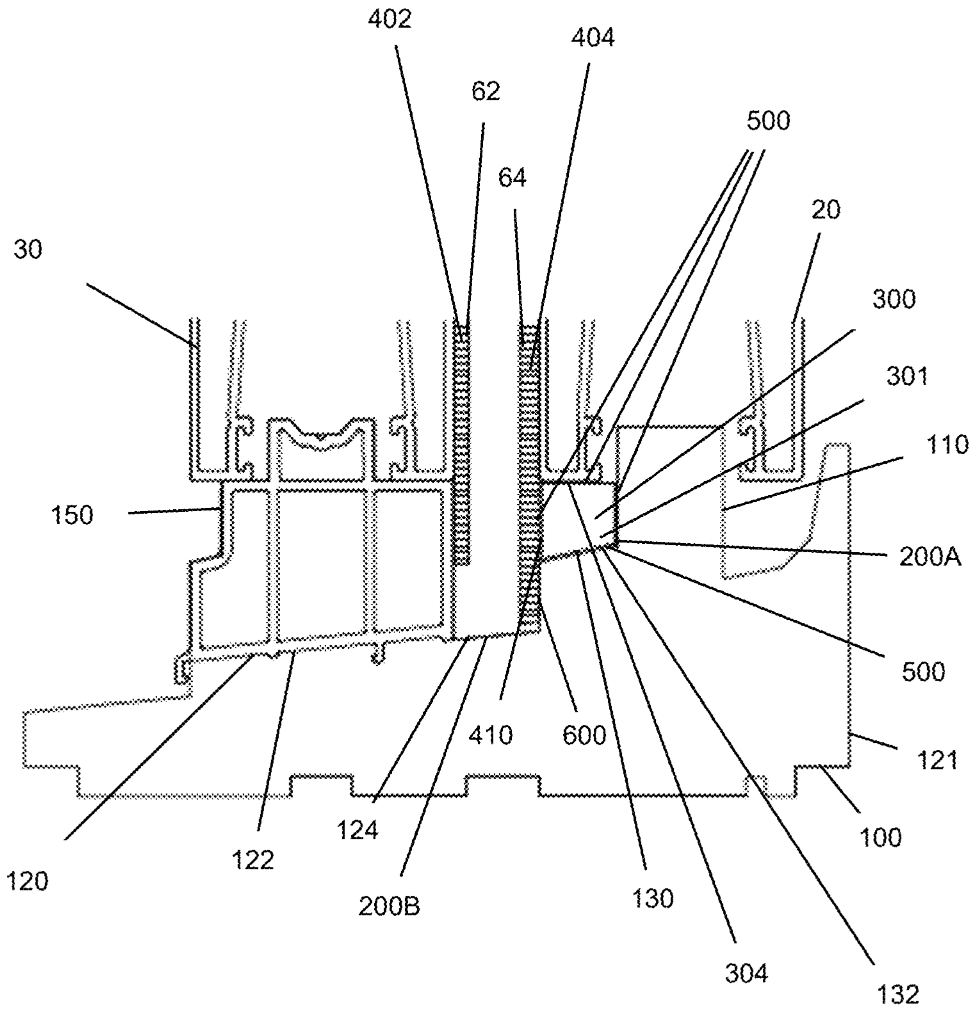
FIG. 22 is a cross-sectional view of the framework assembly of FIG. 1, depicting the sill configuration, the movable sash configuration, the fixed sash configuration, the plug configuration, the sealing configuration of the movable sash configuration, and the sealing configuration of the fixed sash configuration.
Figure 23:
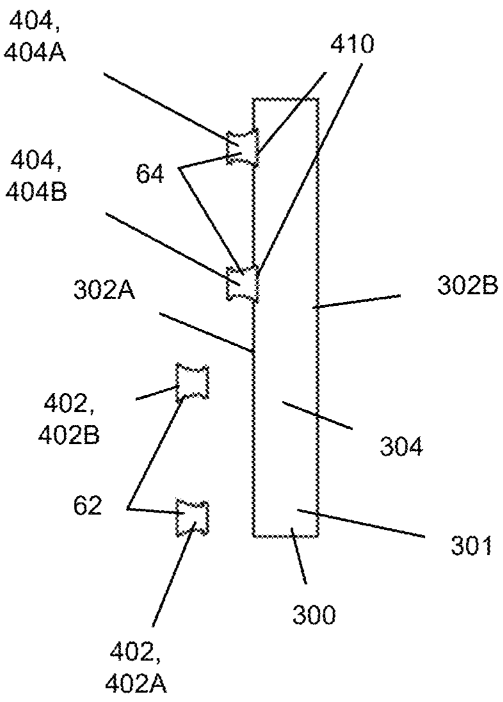
FIG. 23 is a top view of the framework assembly of FIG. 22, depicting the plug configuration, the sealing configuration of the movable sash configuration, and the sealing configuration of the fixed sash configuration.
Figure 24:
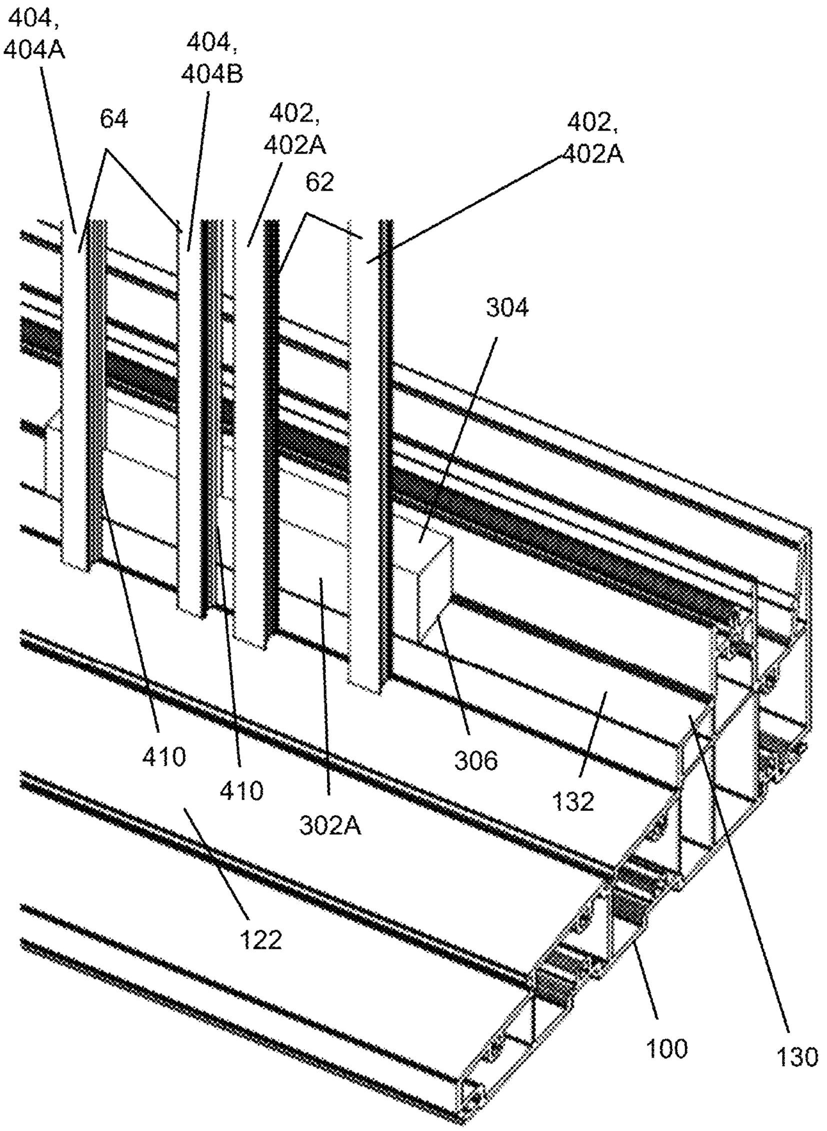
FIG. 24 is a perspective view of the framework of FIG. 22, depicting the sill configuration, the plug configuration, the sealing configuration of the movable sash configuration, and the sealing configuration of the fixed sash configuration.
Figure 25:
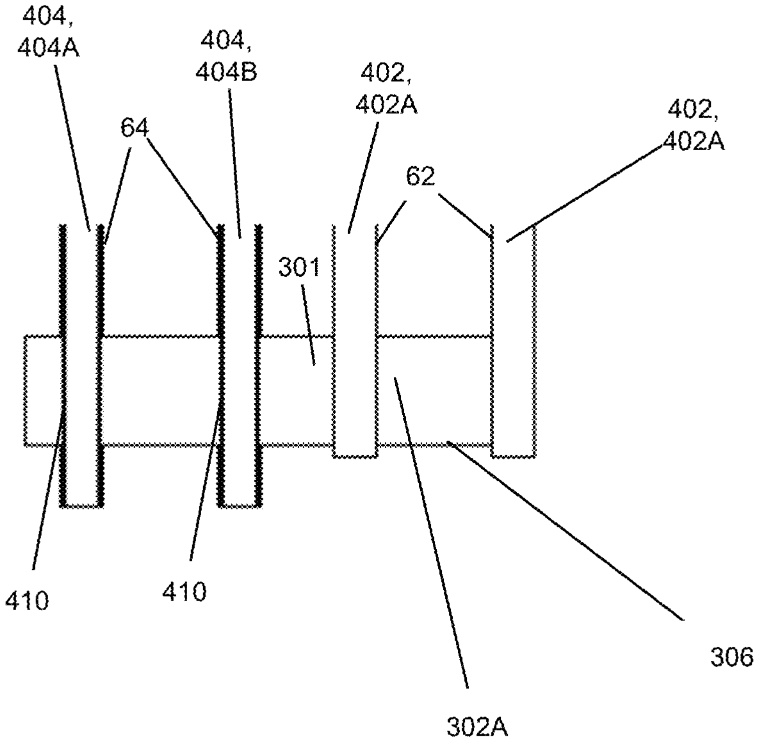
FIG. 25 is a front view of the framework assembly of FIG. 22, depicting the plug configuration, the sealing configuration of the movable sash configuration, and the sealing configuration of the fixed sash configuration.

In some embodiments, for example, as depicted in FIG. 22, while the movable sash configuration 20 and the fixed sash configuration 30 are mounted to the sill configuration 100 and the plug 301 is disposed in the first space portion 200A, the outer surface of the plug 301 engages with the plug supporting surface 132, the movable sash supporter 110, the bottom of the movable sash 21, and the sealing configuration 64 of the fixed sash configuration 30 to define a debris ingress interfering interface 500 for interfering with passage of debris between the movable sash configuration 20 and the fixed sash configuration 30, for example, through the first space portion 200A. In some embodiments, for example, the outer surface of the plug 301 includes fibres, and the fibres of the plug 301 engages with the plug supporting surface 132, the movable sash supporter 110, the bottom of the movable sash 21, and the sealing configuration 64 of the fixed sash configuration 30 to define the debris ingress interfering interface 500 for interfering with passage of debris between the movable sash configuration 20 and the fixed sash configuration 30, for example, through the first space portion 200A.

In some embodiments, for example, the plug 301 is configured to interfere with at least 50% of particles having a size of at least 2 millimeters from ingress through the first space portion 200A. In some embodiments, for example, the plug 301 is configured to interfere with at least 75% of particles having a size of at least 2 millimeters from ingress through the first space portion 200A. In some embodiments, for example, the plug 301 is configured to interfere with at least 95% of particles having a size of at least 2 millimeters from ingress through the first space portion 200A. In some embodiments, for example, the plug 301 is configured to interfere with at least 50% of particles having a size of at least 1 millimeters from ingress through the first space portion 200A. In some embodiments, for example, the plug 301 is configured to interfere with at least 75% of particles having a size of at least 1 millimeters from ingress through the first space portion 200A. In some embodiments, for example, the plug 301 is configured to interfere with at least 95% of particles having a size of at least 1 millimeters from ingress through the first space portion 200A. In some embodiments, for example, the plug 301 is configured to interfere with at least 50% of particles having a size of at least 0.5 millimeters from ingress through the first space portion 200A. In some embodiments, for example, the plug 301 is configured to interfere with at least 75% of particles having a size of at least 0.5 millimeters from ingress through the first space portion 200A. In some embodiments, for example, the plug 301 is configured to interfere with at least 95% of particles having a size of at least 0.5 millimeters from ingress through the first space portion 200A.

In some embodiments, for example, as depicted in FIG. 22 to FIG. 25, an exterior interlock assembly, including the exterior interlock 50 and the sealing configuration 64, is disposed flush relative to the plug 301. As depicted in FIG. 22 to FIG. 25, the debris ingress interfering interface 500 defined by the outer surface of the plug 301, the shoulder 130, the movable sash supporter 110, the movable sash 21, and the sealing configuration 64 includes a debris ingress interfering interface 410. The debris ingress interfering interface 410 is defined by the sealing configuration 64 and the side surface 302A of the plug 301. As depicted, the debris ingress interfering interface 410 is defined by a respective lengthwise portion of each of the one or more sealing members 404 of the sealing configuration 64 and the side surface 302A of the plug 301. In some embodiments, for example, the debris ingress interfering interface 410 is larger than a debris ingress interfering interface defined by a respective end portion of each of the sealing members 404 of the sealing configuration 64 and the top surface 304 of the plug 301, which, in some embodiments, for example, improves the interference of passage of debris between the movable sash configuration 20 and the fixed sash configuration 30, for example, the first space portion 200A. In some embodiments, for example, the debris ingress interfering interface 410 has a minimum length based on the minimum height of the plug 301. In some embodiments, for example, the debris ingress interfering interface 410 has a minimum length of at least 0.5 inches.

As depicted in FIG. 22 to FIG. 25, the portion of the plug 301 that is disposed in the first space portion 200A is offset from the sealing configuration 62 of the movable sash configuration 20, such that said portion of the plug 301 and the sealing configuration 62 do not engage to define a debris ingress interfering interface.

Figure 7:
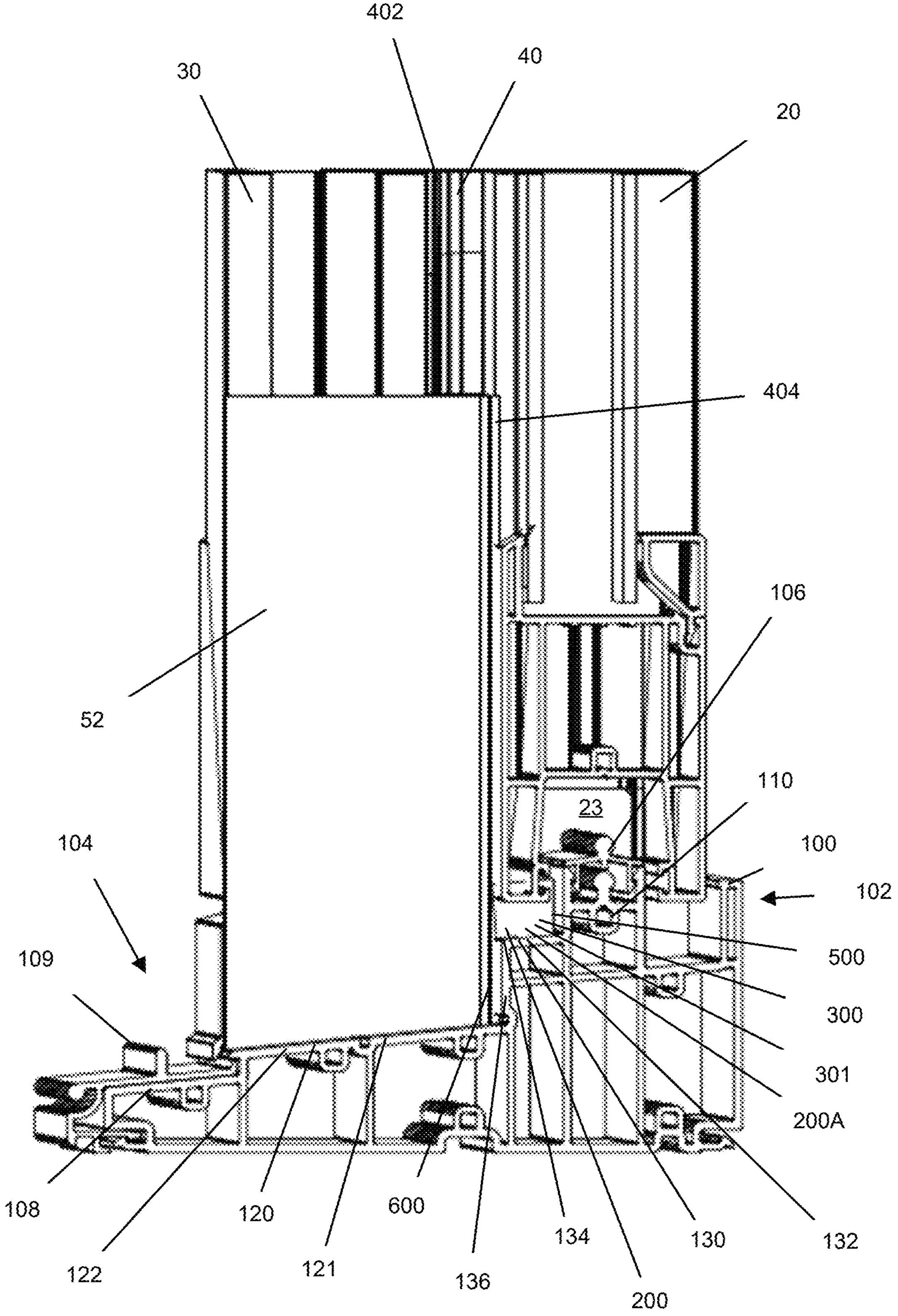
FIG. 7 is a side view of the framework assembly of FIG. 6.
Figure 9:
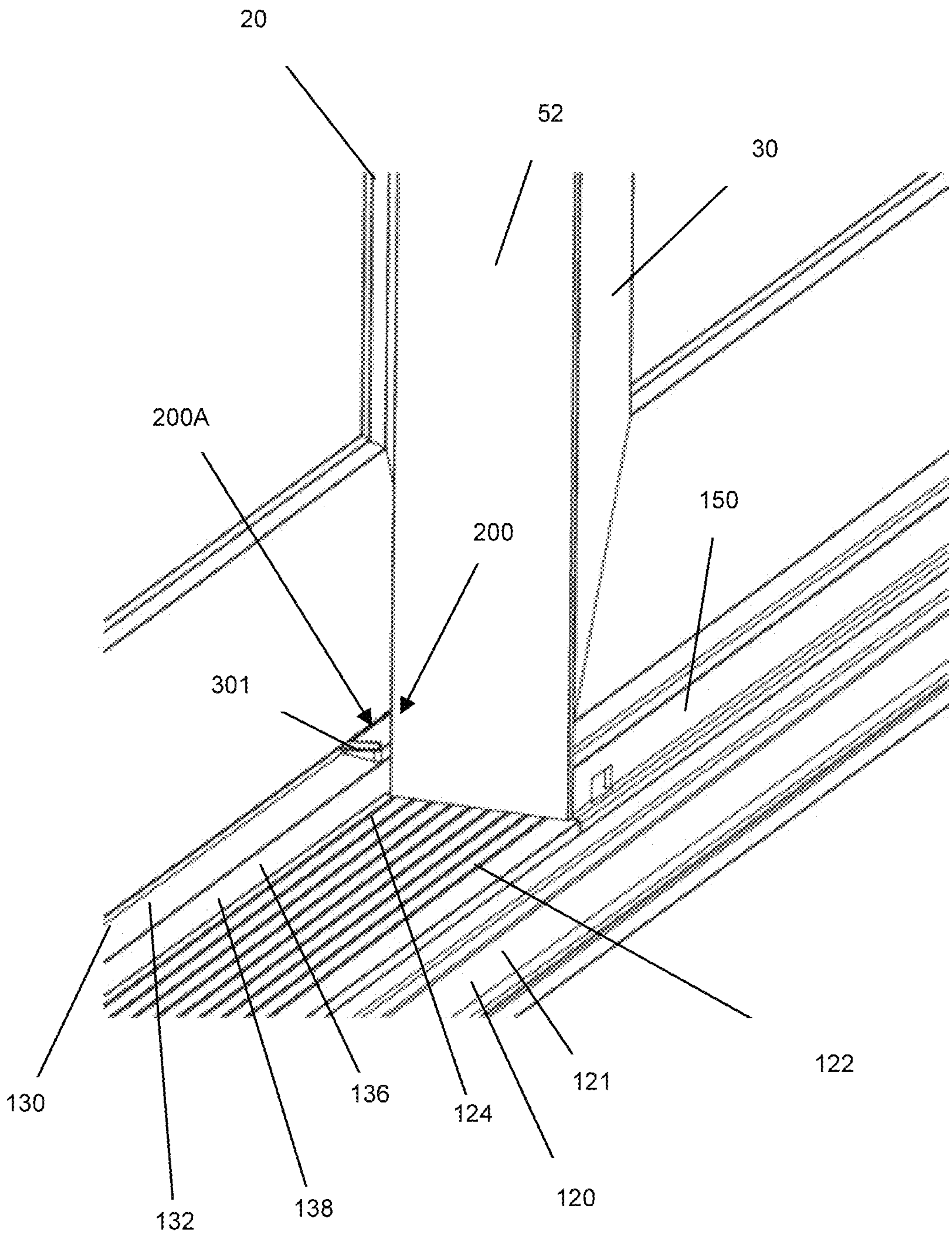
FIG. 9 is a perspective view of the framework assembly of FIG. 1.
Figure 10:
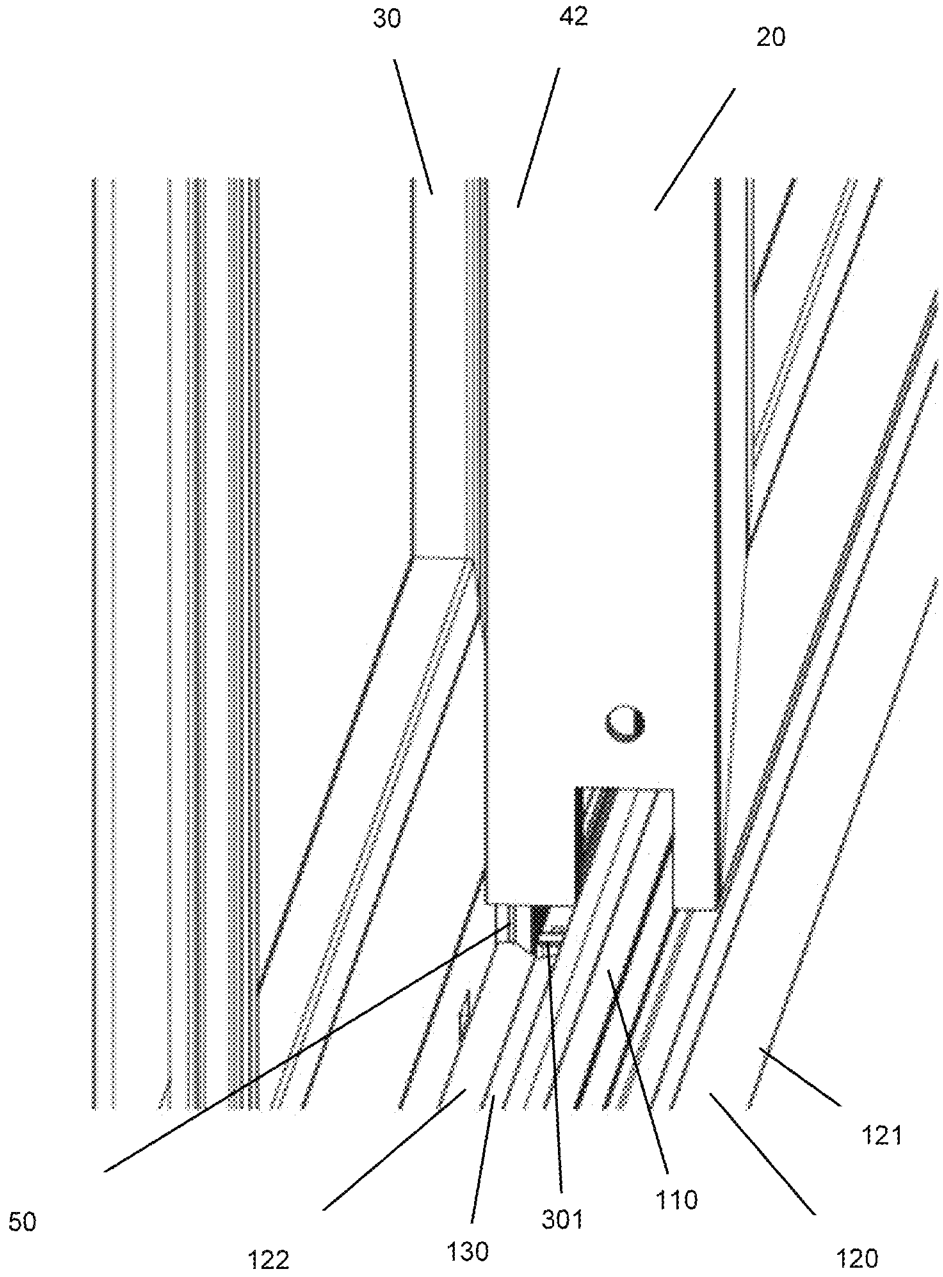
FIG. 10 is a perspective view of the framework assembly of FIG. 9.
Figure 11:
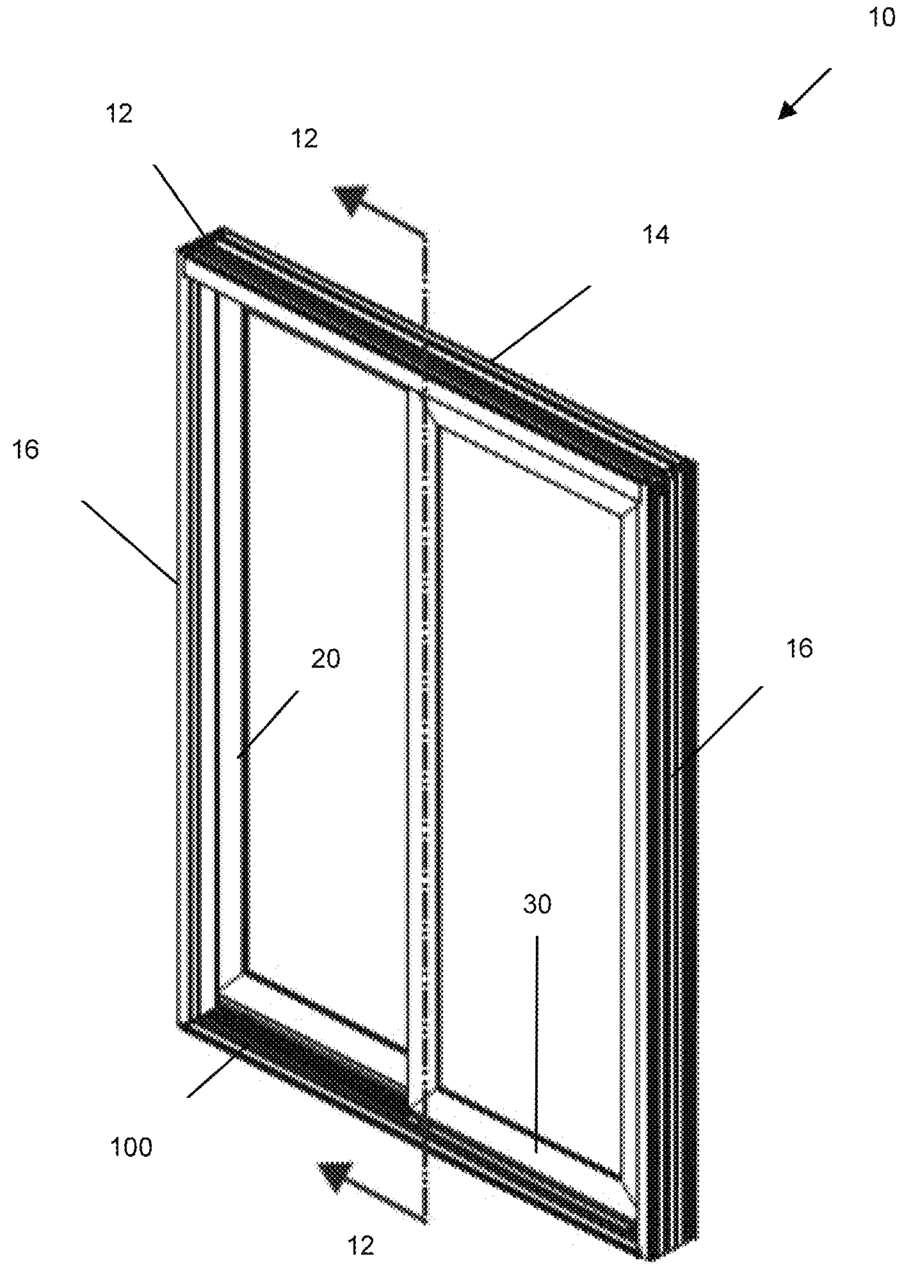
FIG. 11 is a perspective view of the framework assembly of FIG. 1.
Figure 12:
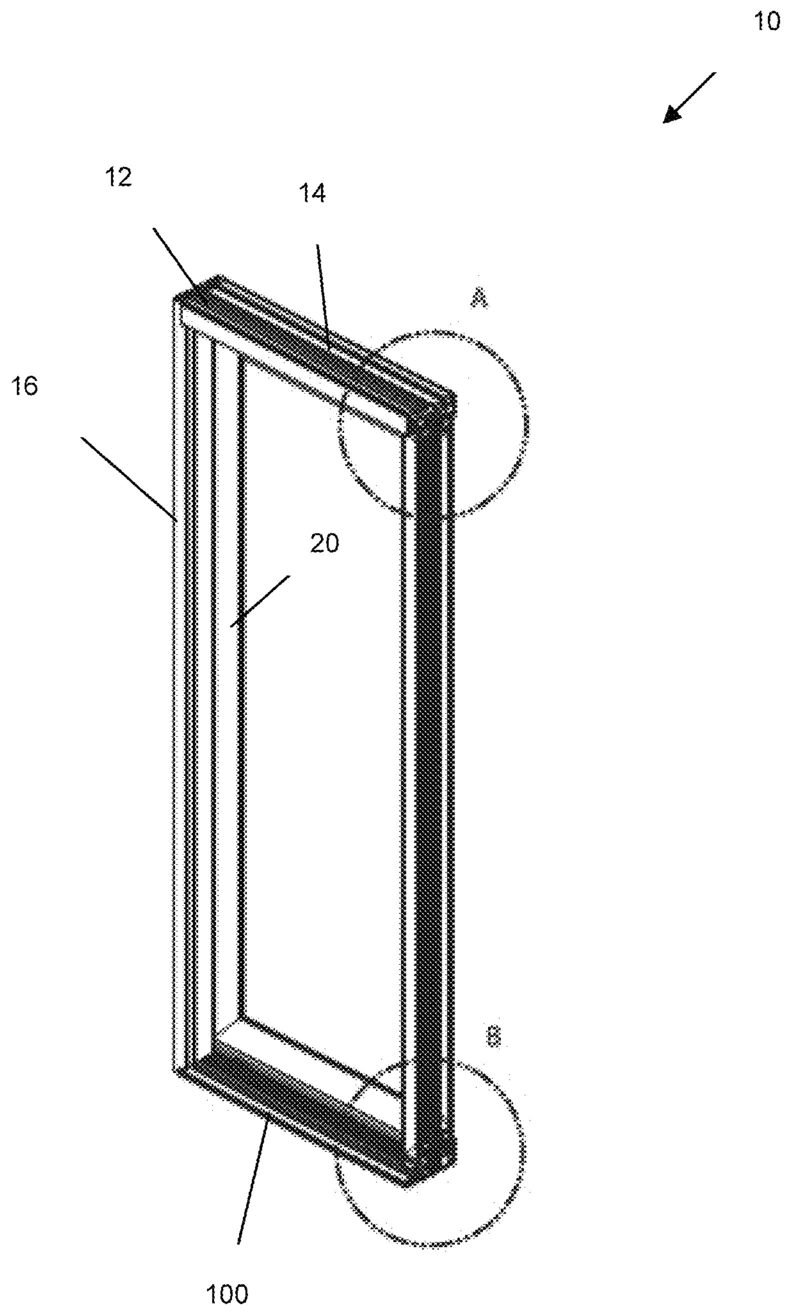
FIG. 12 is a perspective view of the framework assembly of FIG. 11, with a cutaway along line 12-12 shown in FIG. 11.

In some embodiments, for example, as depicted in FIG. 6, FIG. 7, and FIG. 9, while the movable sash configuration 20 and the fixed sash configuration 30 are supported by the sill configuration 100, the exterior interlock cover 52 occludes the second space portion 200B, and the sealing configuration 64 of the fixed sash configuration 30 extends to the sill compensator mounting surface 122, such that the sealing members 404A and 404B of the sealing configuration 64 are engaged with the transitional wall surface 138 and the sill compensator mounting surface 122. The sealing configuration 64, the side surface 302A of the plug 301, the transitional wall surface 138, and the sill compensator mounting surface 122 are co-operatively configured to define a debris ingress interfering interface 600. In some embodiments, for example, the debris ingress interfering interface 600 includes the debris ingress interfering interface 410 defined between the sealing configuration 64 and the side surface 302A of the plug 301. In some embodiments, for example, the exterior interlock cover 52 and the debris ingress interfering interface 600 are co-operatively configured to interfere with passage of debris between the movable sash configuration 20 and the fixed sash configuration 30, for example, through the second space portion 200B.

In some embodiments, for example, the plug 301 is configured such that, while the plug 301 is disposed in the first space portion 200A, at least a portion of the plug 301 is disposed in the second space portion 200B for interfering with passage of debris between the movable sash configuration 20 and the fixed sash configuration 30, for example, through the second space portion 200B. In some embodiments, for example, said portion of the plug 301 that is disposed in the second space portion 200B extends from, for example, laterally from, the portion of the plug 301 that is disposed in the first space portion 200A. In some embodiments, for example, said portion of the plug 301 that is disposed in the second space portion 200B engages with the end portion of the sealing configuration 62 of the movable sash configuration 20, the transitional wall 136, and the sill compensator 150 to define a debris ingress interfering interface for interfering with passage of debris between the movable sash configuration 20 and the fixed sash configuration 30, for example, through the second space portion 200B. In some embodiments, for example, said portion of the plug 301 that is disposed in the second space portion 200B further engages with the fixed sash 31 to define the debris ingress interfering interface for interfering with passage of debris between the movable sash configuration 20 and the fixed sash configuration 30, for example, through the second space portion 200B. In some embodiments, for example, said portion of the plug 301 that is disposed in the second space portion 200B is disposed in abutting engagement with the exterior interlock cover 52 that extends to the sill compensator mounting surface 122.

Figure 8:
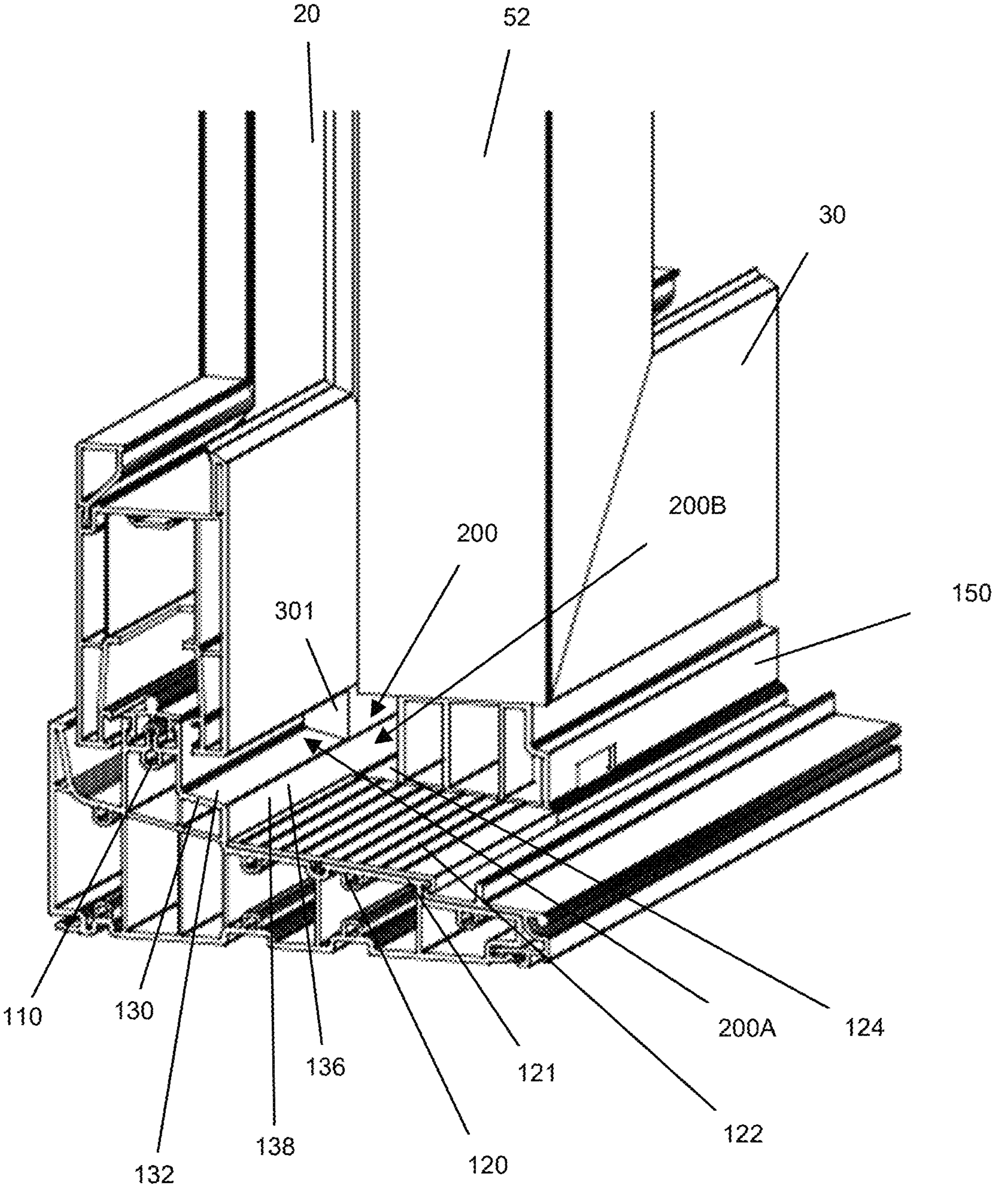
FIG. 8 is a perspective view of the framework assembly of FIG. 1.

In some embodiments, for example, said portion of the plug 301 that is disposed in the second space portion 200B further engages with the sill compensator mounting surface 122, such that at least a portion of the sill compensator mounting surface 122 is supporting said portion of the plug 301 that is disposed in the second space portion 200B, to define the debris ingress interfering interface for interfering with passage of debris between the movable sash configuration 20 and the fixed sash configuration 30, for example, through the second space portion 200B. In this respect, as depicted in FIG. 8, FIG. 19, and FIG. 20, the plug supporting surface configuration includes a plug supporting surface 124 that is defined by the sill compensator mounting surface 122, for example, the portion of the sill compensator mounting surface 122 that is supporting said portion of the plug 301 that is disposed in the second space portion 200B. As depicted, in some embodiments, for example, the plug supporting surface 124 is defined by the portion of the sill compensator mounting surface 122 that extends between the sill compensator 150 and the transitional wall member 136.

While the movable sash configuration 20 and the fixed sash configuration 30 are mounted to the sill configuration 100, the plug supporting surface 124 defined by the sill compensator mounting surface 122 is configured for supporting the portion of the plug 301 extending into the second space portion 200B for disposition within the second space portion 200B. While the movable sash configuration 20 and the fixed sash configuration 30 are mounted to the sill configuration 100, the supporting of said portion the plug 301, by the plug-supporting surface 124 is a supporting of said portion of the plug 301 within the second space portion 200B. In some embodiments, for example, while said portion of the plug 301 is supported by the plug-supporting surface 124 and disposed within the second space portion 200B, said portion of the plug 301 is configured to interfere with ingress of debris through the second space portion 200B. In some embodiments, for example, the interfering of debris through the second space portion 200B by said portion of the plug 301 includes preventing passage of debris through the second space portion 200B.

In some embodiments, for example, while the movable sash configuration 20 and the fixed sash configuration 30 are mounted to the sill configuration 100, the second space portion 200B and said portion of the plug 301 are co-operatively configured such that said portion of the plug 301 is pressed within the second space portion 200B.

In some embodiments, for example, while the movable sash configuration 20 and the fixed sash configuration 30 are mounted to the sill configuration 100, the second space portion 200B and said portion of the plug 301 are co-operatively configured such that said portion of the plug 301 occupies the entirely of the second space portion 200B.

In some embodiments, the plug configuration 300 includes a first plug 301 and a second plug 301, and the plug supporting surface configuration includes the plug supporting surface 132 and the plug supporting surface 124, wherein the plug supporting surface 132 is configured to support the first plug 301 for disposition within the first space portion 200A and the plug supporting surface 124 is configured to support the second plug 301 for disposition with the second space portion 200B.

While the movable sash configuration 20 and the fixed sash configuration 30 are mounted to the sill configuration 100, the plug supporting surface 124 of the sill compensator mounting surface 122 is configured for supporting the second plug 301 for disposition within the second space portion 200B. While the movable sash configuration 20 and the fixed sash configuration 30 are mounted to the sill configuration 100, the supporting of the second plug 301, by the plug-supporting surface 124 is a supporting of the second plug 301 within the second space portion 200B. In some embodiments, for example, while the second plug 301 is supported by the plug-supporting surface 124 and disposed within the second space portion 200B, the second plug 301 is configured to interfere with ingress of debris through the second space portion 200B. In some embodiments, for example, the interfering of debris through the second space portion 200B by the second plug 301 includes preventing passage of debris through the second space portion 200B.

In some embodiments, for example, while the movable sash configuration 20 and the fixed sash configuration 30 are mounted to the sill configuration 100, the second space portion 200B and the second plug 301 are co-operatively configured such that the second plug 301 is pressed within the second space portion 200B.

In some embodiments, for example, while the movable sash configuration 20 and the fixed sash configuration 30 are mounted to the sill configuration 100, the second space portion 200B and the second plug 301 are co-operatively configured such that the second plug 301 occupies the entirely of the second space portion 200B.

In some embodiments, for example, the second plug 301 that is disposed in the second space portion 200B engages with the end portion of the sealing configuration 62 of the movable sash configuration 20, the transitional wall 136, the fixed sill compensator 150, and the first plug 301 to define a debris ingress interfering interface for interfering with passage of debris between the movable sash configuration 20 and the fixed sash configuration 30, for example, through the second space portion 200B. In some embodiments, for example, the second plug 301 that is disposed in the second space portion 200B further engages with the fixed sash 31 to define the debris ingress interfering interface for interfering with passage of debris between the movable sash configuration 20 and the fixed sash configuration 30, for example, through the second space portion 200B. In some embodiments, for example, the second plug 301 that is disposed in the second space portion 200B is disposed in abutting engagement with the exterior interlock cover 52 that extends to the sill compensator mounting surface 122. In some embodiments, for example, the second plug 301 that is disposed in the second space portion 200B further engages with the sill compensator mounting surface 122 to define the debris ingress interfering interface for interfering with passage of debris between the movable sash configuration 20 and the fixed sash configuration 30, for example, through the second space portion 200B.

In some embodiments, for example, the second plug 301 is configured to interfere with at least 50% of particles having a size of at least 2 millimeters from ingress through the second space portion 200B. In some embodiments, for example, the second plug 301 is configured to interfere with at least 75% of particles having a size of at least 2 millimeters from ingress through the second space portion 200B. In some embodiments, for example, the second plug 301 is configured to interfere with at least 95% of particles having a size of at least 2 millimeters from ingress through the second space portion 200B. In some embodiments, for example, the second plug 301 is configured to interfere with at least 50% of particles having a size of at least 1 millimeters from ingress through the second space portion 200B. In some embodiments, for example, the second plug 301 is configured to interfere with at least 75% of particles having a size of at least 1 millimeters from ingress through the second space portion 200B. In some embodiments, for example, the second plug 301 is configured to interfere with at least 95% of particles having a size of at least 1 millimeters from ingress through the second space portion 200B. In some embodiments, for example, the second plug 301 is configured to interfere with at least 50% of particles having a size of at least 0.5 millimeters from ingress through the second space portion 200B. In some embodiments, for example, the second plug 301 is configured to interfere with at least 75% of particles having a size of at least 0.5 millimeters from ingress through the second space portion 200B. In some embodiments, for example, the second plug 301 is configured to interfere with at least 95% of particles having a size of at least 0.5 millimeters from ingress through the second space portion 200B.

In some embodiments, for example, while the first plug 301 is disposed in the first space portion 200A and the second plug 301 is disposed in the second space portion 200B, the first plug 301 and the second plug 301 are co-operatively configured for interfering with passage of debris between the movable sash configuration 20 and the fixed sash configuration 30, for example, through the space 200, the space 200 including the first space portion 200A and the second space portion 200B.

In some embodiments, for example, by elevating at least a portion of the plug configuration 300, for example, the plug 301 disposed in the first space portion 200A, from the sill compensator mounting surface 122, while the assembly 10 us mounted to the opening of the building construction, exposure of the plug configuration 300 to debris that can accumulate on the sill compensator mounting surface 122 is reduced, which reduces the damage and wear and tear to the plug configuration 300 caused by exposure of the plug configuration 300 to debris. In some embodiments, for example, while the debris is flowing on the sill compensator mounting surface 122, in a direction wards the plug supporting surface 132, the debris flows into the transitional wall member 136, thereby interfering with flow of debris from the sill compensator mounting surface 122 to the plug supporting surface 132. Such interference provides additional time for gravitational forces to encourage the debris to flow away from the shoulder 130.

In some embodiments, for example, the elevating the plug supporting surface 132 relative to the base 10, while the assembly 10 is mounted within the opening of the building construction, flow of debris from the environment, for example, from the ground or the floor, to the plug supporting surface 132, is interfered with.

In some embodiments, for example, due to the presence of the shoulder 130, and in particular, the disposition of the shoulder 130 between the movable sash supporter 110 and the sill compensator mounting surface 122, the space 200, defined by the movable sash configuration 20, the fixed sash configuration 30, and the sill configuration 100, while the movable sash configuration 20 and the fixed sash configuration 30 are supported by the sill configuration 100, has a cross-sectional area that is smaller, relative to a space 200 defined by the movable sash configuration 20, the fixed sash configuration 30, and a sill configuration, while the movable sash configuration 20 and the fixed sash configuration 30 are supported by said sill configuration, wherein said sill does not include the shoulder 130. In some embodiments, for example, the space 200, defined by the movable sash configuration 20, the fixed sash configuration 30, and the sill configuration 100, while the movable sash configuration 20 and the fixed sash configuration 30 are supported by the sill configuration 100, has a cross-sectional area that is at least 25% smaller, relative to a space 200 defined by the movable sash configuration 20, the fixed sash configuration 30, and a sill configuration, while the movable sash configuration 20 and the fixed sash configuration 30 are supported by said sill configuration, wherein said sill does not include the shoulder 130. Accordingly, there is relatively less space through which debris can flow. In addition, due to the relatively small cross-sectional area of the space 200, a relatively small plug configuration 300 can be disposed in the space 200 to interfere with passage of debris between the movable sash configuration 20 and the fixed sash configuration 30, for example, through the space 200.

Figure 13:
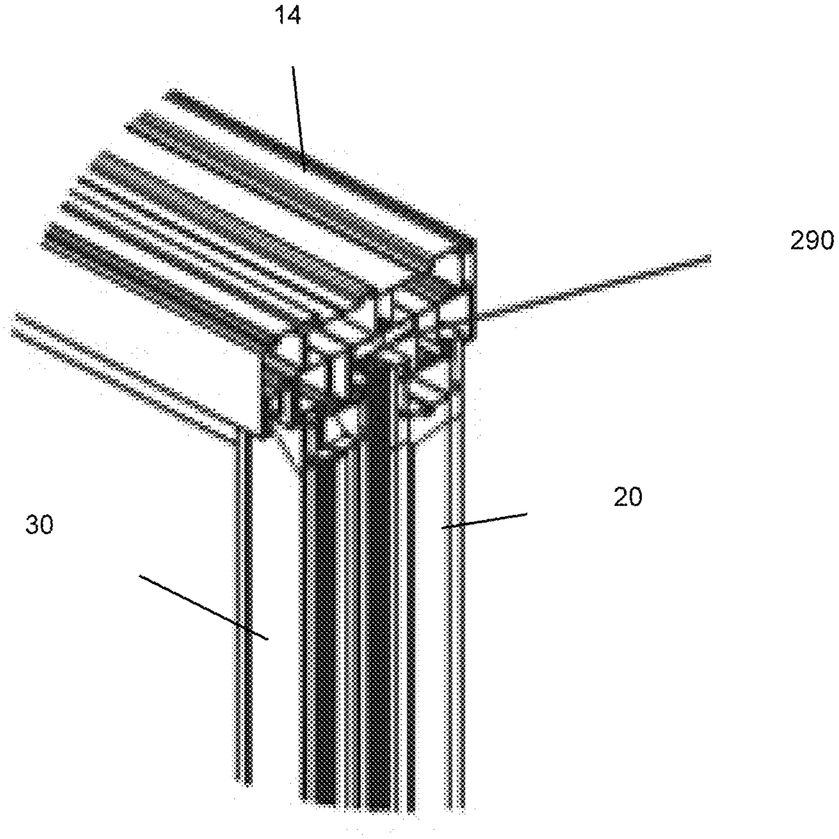
FIG. 13 is an enlarged view of the portion of the framework assembly of FIG. 12, the portion identified by window A shown in FIG. 12.
Figure 14:
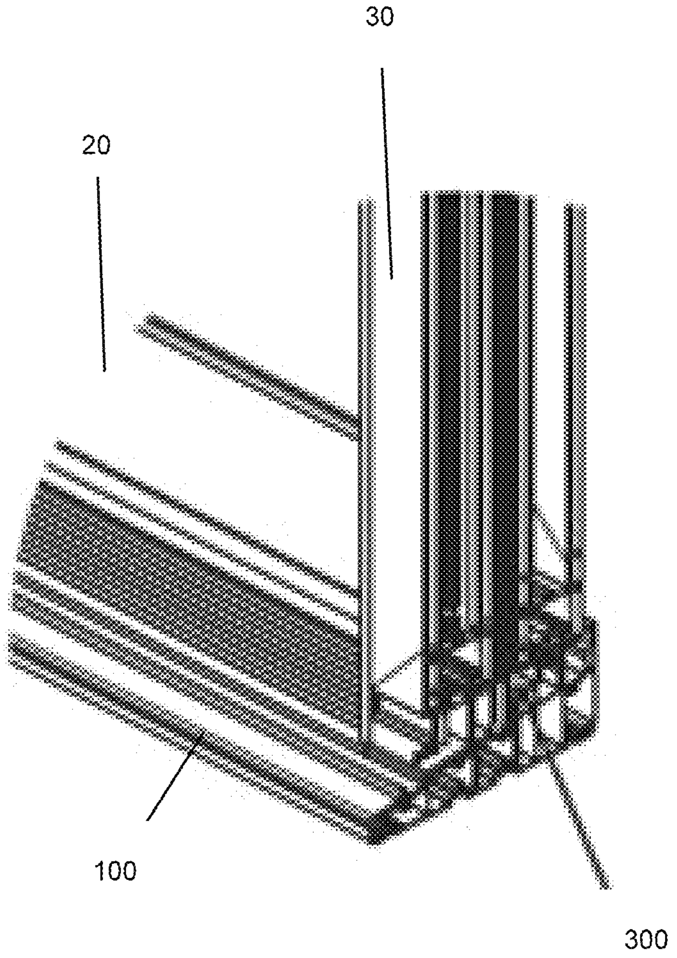
FIG. 14 is an enlarged view of the portion of the framework assembly of FIG. 12, the portion identified by window B shown in FIG. 12.
Figure 15:
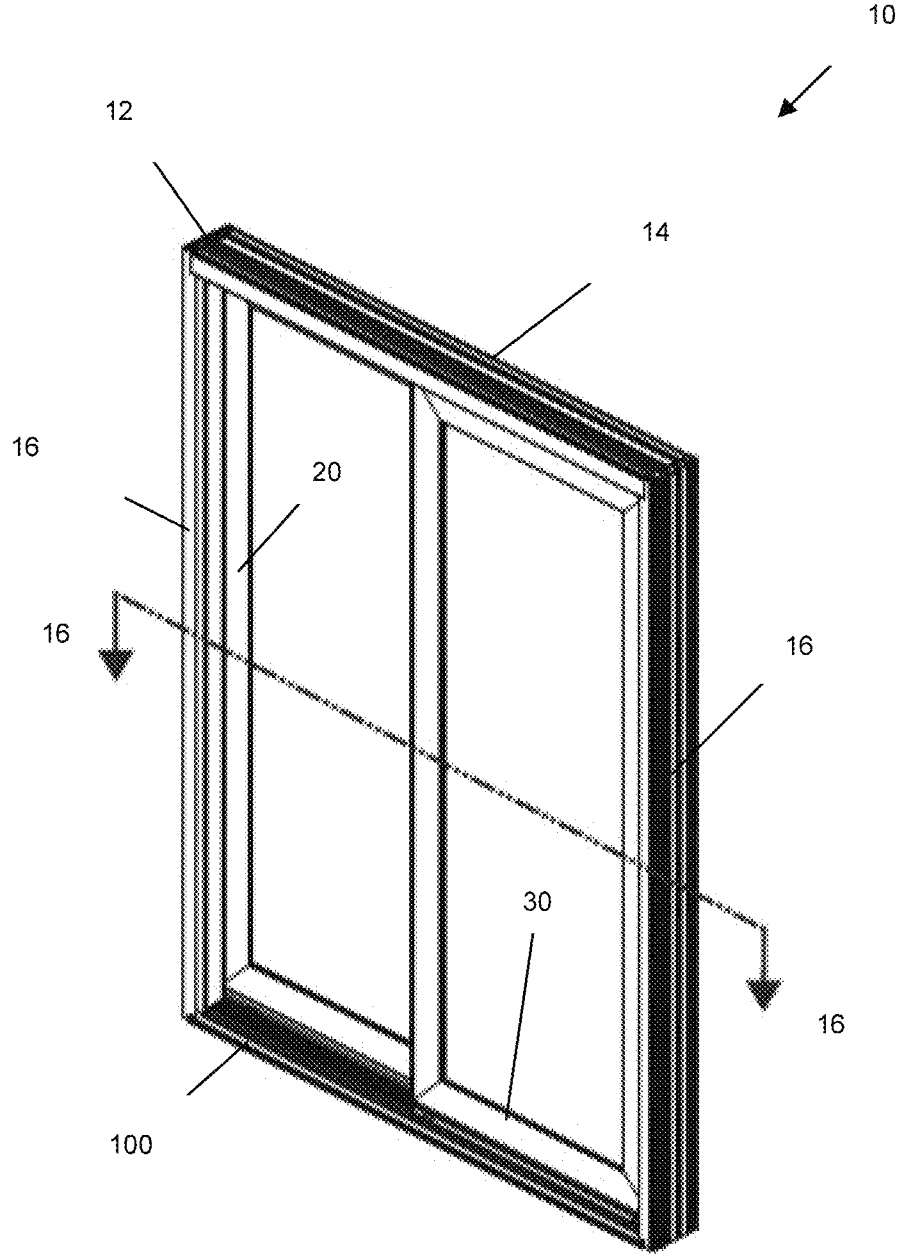
FIG. 15 is a perspective view of the framework assembly of FIG. 1.
Figure 16:
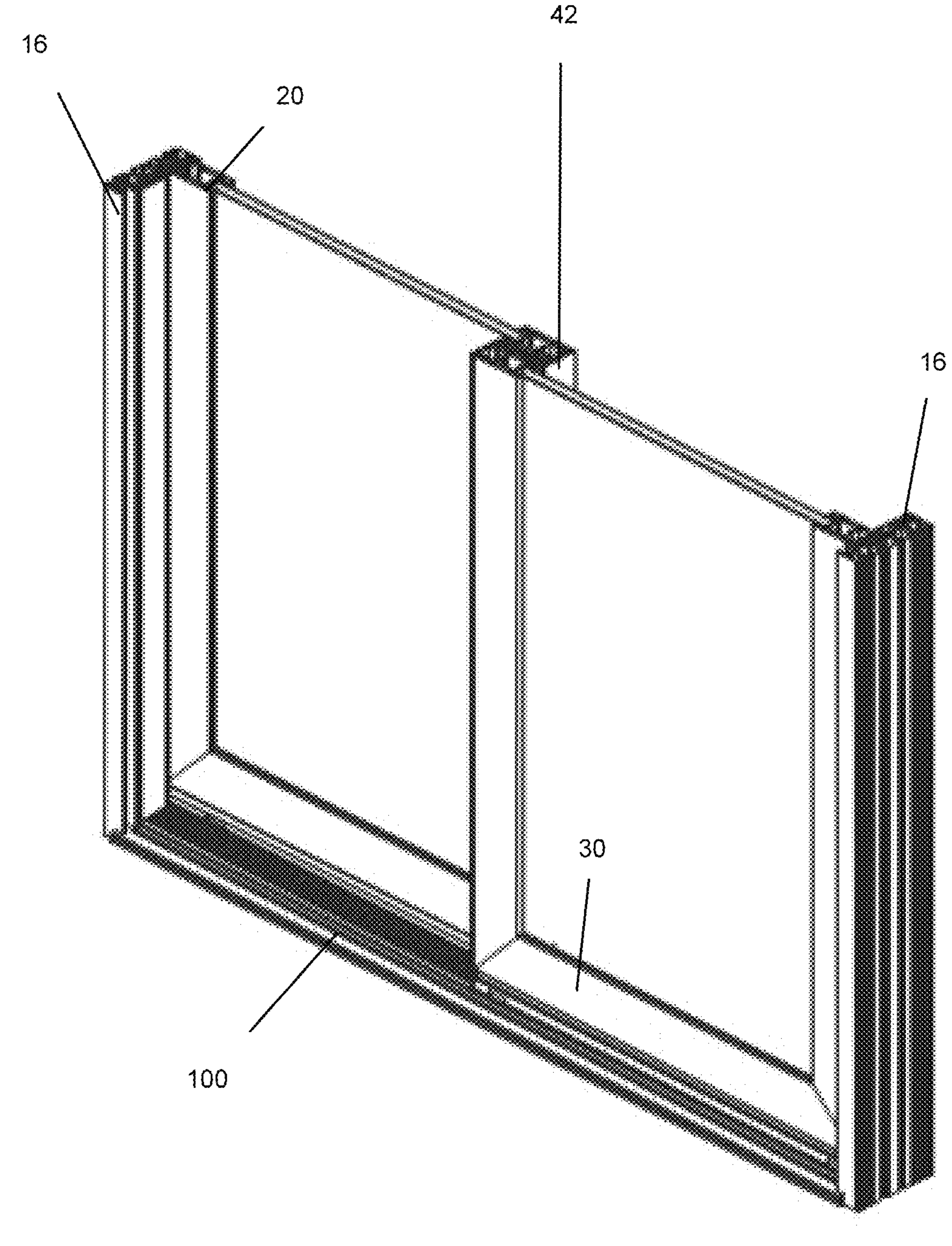
FIG. 16 is a perspective view of the framework assembly of FIG. 15, with a cutaway along line 16-16 shown in FIG. 15.
Figure 17:
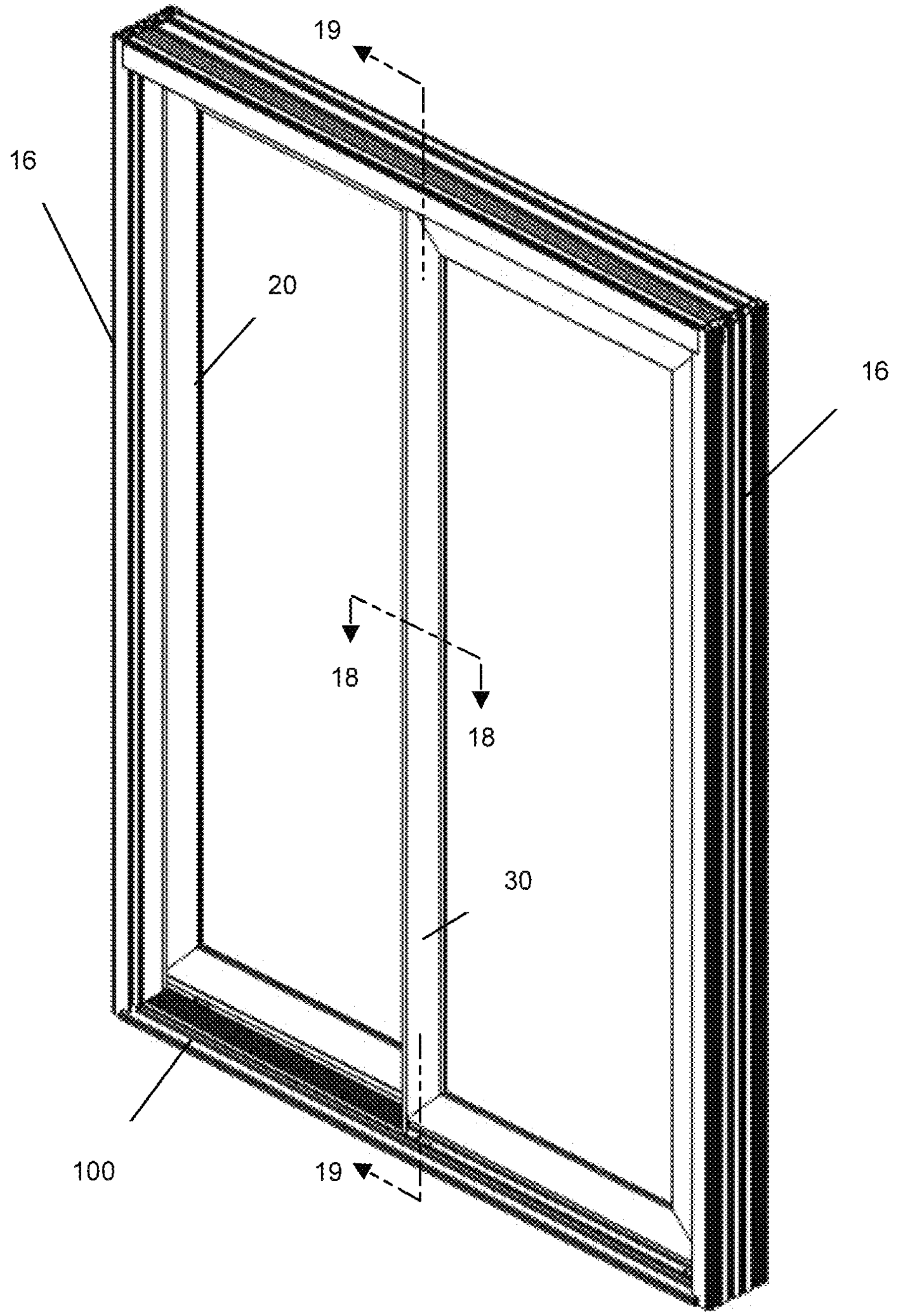
FIG. 17 is a perspective view of the framework assembly of FIG. 1.

In some embodiments, for example, as depicted in FIG. 13, FIG. 19, and FIG. 20, a space similar to the space 200 is defined between the header 14, the movable sash configuration 20 and the fixed sash configuration 30. In some embodiments, for example, a plug 290, for example, a dust plug, is disposed in said space to interfere with passage of debris between the movable sash configuration 20 and the fixed sash configuration 30, for example, through said space.

In some embodiments, for example, the sill configuration 100 is manufactured by extrusion. In some embodiments, for example, the sill configuration 100 is manufactured by pultrusion.

In some embodiments, for example, a material of construction of the sill configuration 100 includes plastic, for example, polyvinyl chloride (PVC. In some embodiments, for example, a material of construction of the sill configuration 100 includes aluminum. In some embodiments, for example, a material of construction of the sill configuration 100 includes fibre glass.

While the framework assembly 10 is assembled, as depicted in FIG. 1 to FIG. 20, the movable sash configuration 20 and the fixed sash configuration 30 are supported by the sill configuration 100 and received in the framework 12.

As depicted in FIG. 19 and FIG. 20, in some embodiments, for example, while the fixed sash configuration 30 is supported on the sill compensator 150, a portion of the sill compensator 150 is disposed in a channel 33 defined by the fixed sash 31, such that rotation of the fixed sash configuration 30, relative to the sill configuration 100, in a direction towards the first side 102 or the second side 104 of the sill base 121, is resisted.

Figure 41:
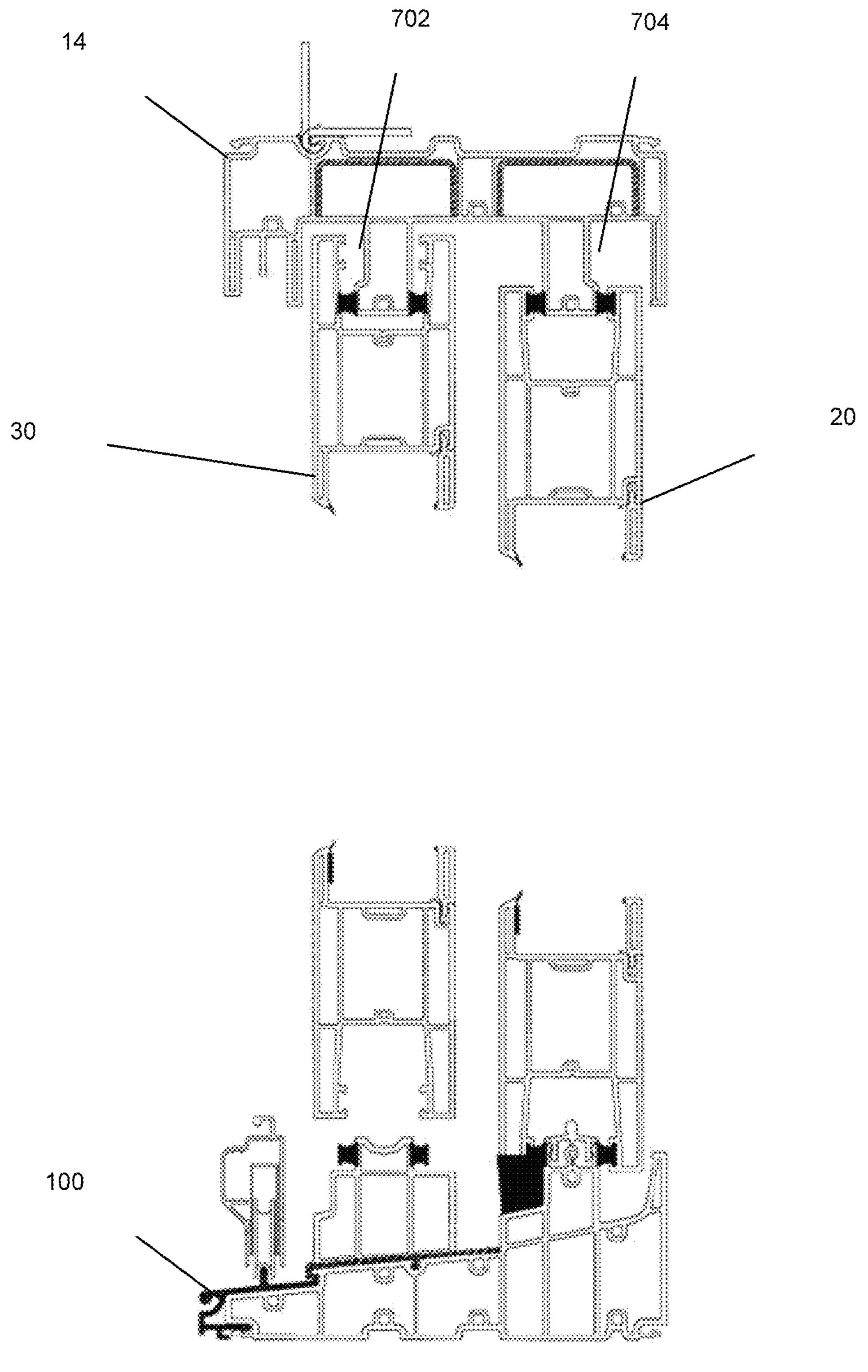
FIG. 41 is a cross-sectional view of the framework assembly of FIG. 1, with the fixed sash configuration lifted from the sill configuration.
Figure 42:
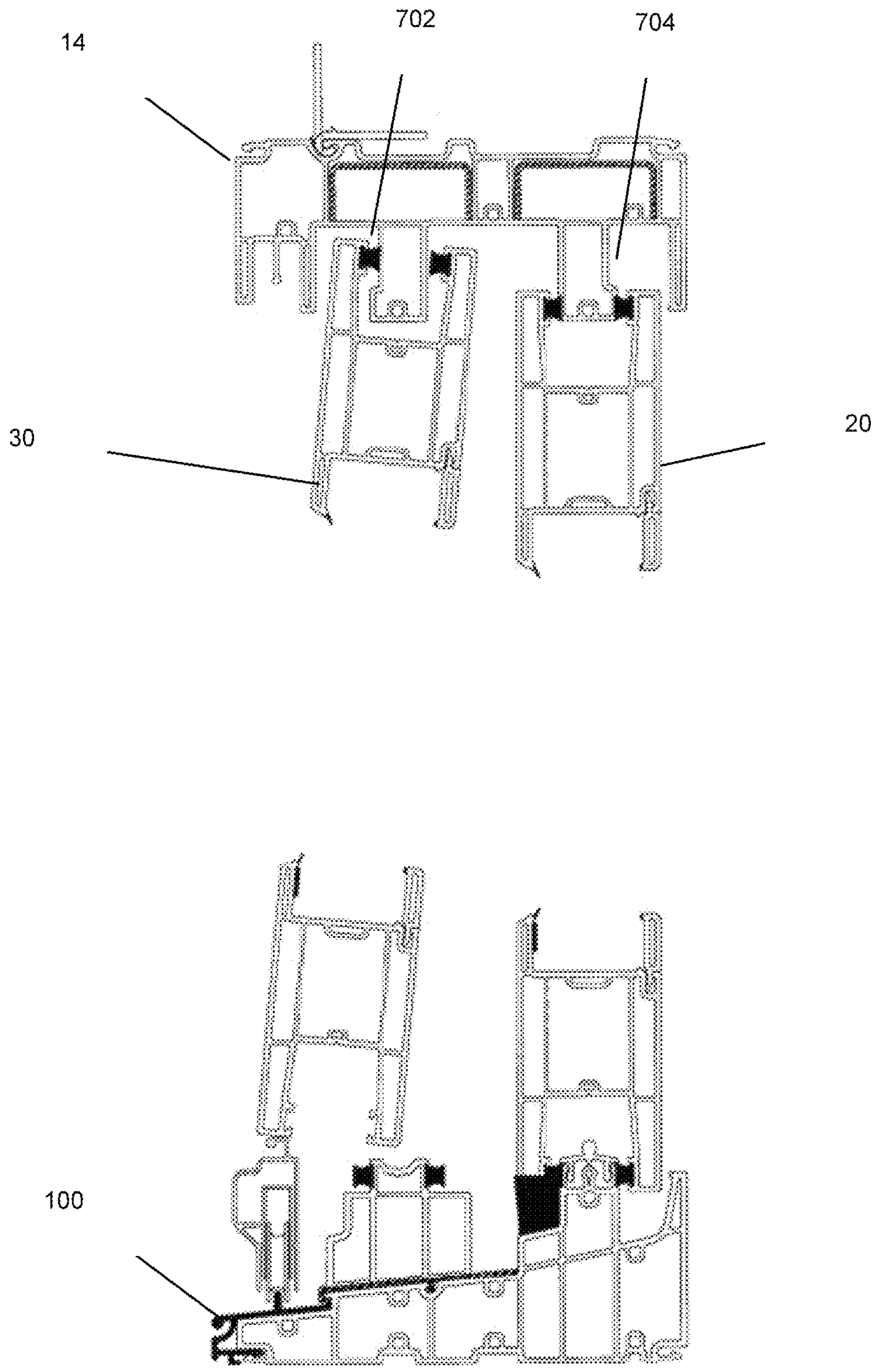
FIG. 42 is a cross-sectional view of the framework assembly of FIG. 1, with the fixed sash configuration rotated relative to the sill configuration.

As depicted in FIG. 41 and FIG. 42, to remove the fixed sash configuration 30 from the framework 12, the fixed sash configuration 30 is displaced upward, relative to the sill configuration 100, until the fixed sash configuration 30 is clear of the sill compensator 150, and then the fixed sash configuration 30 is rotated, relative to the sill configuration 100, towards the second side 104 of the sill base 121, until the fixed sash configuration 30 is clear of the sill configuration 100. At this point, with the fixed sash configuration 30 clear of the sill configuration 100, the fixed sash configuration 30 is displaced away from the framework 12. As depicted in FIG. 41 to FIG. 42, the header 14 defines a fixed sash receiving space 702 to receive a portion of the fixed sash 31 while the fixed sash configuration 30 is rotated, relative to the sill configuration 100, which allows for further rotation of the fixed sash assembly 30, relative to the sill configuration 100, thereby easing the removal of the fixed sash configuration 30 from the framework 12.

As depicted in FIG. 19 and FIG. 20, in some embodiments, for example, while the movable sash configuration 20 is supported on the movable sash supporter 110, a portion of the movable sash supporter 110 is disposed in the channel 23 defined by the movable sash 21, such that rotation of the movable sash configuration 20, relative to the sill configuration 100, in a direction towards the first side 102 or the second side 104 of the sill base 121, is resisted.

To remove the movable sash configuration 20 from the framework 12, the movable sash configuration 20 is displaced upward, relative to the sill configuration 100, until the movable sash configuration 20 is clear of the movable sash support 110, and then the movable sash configuration 20 is rotated, relative to the sill configuration 100, towards the first side 102 of the sill base 121, until the movable sash configuration 20 is clear of the sill configuration 100. At this point, with the movable sash configuration 20 clear of the sill configuration 100, the movable sash configuration 20 is displaced away from the framework 12. As depicted in FIG. 41 to FIG. 42, the header 14 defines a movable sash receiving space 704 to receive a portion of the movable sash 21 while the movable sash configuration 20 is rotated, relative to the sill configuration 100, which allows for further rotation of the movable sash configuration 20, relative to the sill configuration 100, thereby easing the removal of the movable sash configuration 20 from the framework 12.

In some embodiments, for example, as depicted in FIG. 6 to FIG. 10, FIG. 19, and FIG. 20, the shoulder 130 of the sill configuration 100 of the framework assembly 10 includes the plug supporting surface-defining member 134 that defines the plug supporting surface 132, wherein the plug supporting surface-defining member 134 extends from the movable sash supporter 110 in a direction towards the fixed sash configuration 30, but terminates before extending to the fixed sash configuration 30 or the sill compensator 150, with effect that the space 200 defined between the movable sash configuration 20, the fixed sash configuration 30, and the sill configuration 100 includes the first space portion 200A and the second space portion 200B, wherein the first space portion 200A is defined above the plug supporting surface 132, and the second space portion 200B is defined above the plug supporting surface 124.

FIG. 26 to FIG. 34 depict a framework assembly 10A that is an alternate embodiment of the framework assembly 10. The framework assembly 10A substantially corresponds to the framework assembly 10, except as depicted in FIG. 26 to FIG. 34, while the movable sash configuration 20 and the fixed sash configuration 30 are mounted to a sill configuration 100A of the assembly 10A, the space 200, defined by a space 200C, is defined entirely above the plug supporting surface 132 of a shoulder 130A. In some embodiments, for example, while the framework assembly 10A is mounted within the opening of the building construction, the entirety of the cross-sectional area of the space 200C is disposed a minimum distance of at least 1 inch above the base of the opening. In some embodiments, for example, as depicted in FIG. 26 to FIG. 34, while the framework assembly 10 is mounted within the opening of the building construction, the entirety of the cross-sectional area of the space 200C is disposed a minimum distance of at least ⅜ inches above the sill compensator mounting surface 122.

In some embodiments, for example, the sill configuration 100A, the movable sash configuration 20, and the fixed sash configuration 30 are co-operatively configured such that while the movable sash configuration 20 and the fixed sash configuration 30 are supported by the sill configuration 100A: (i) the movable sash configuration 20 is slidable, relative to the sill configuration 100A, and (ii) the movable sash configuration 20, the fixed sash configuration 30, and the sill configuration 100A are co-operatively disposed such that the space 200C is defined between the movable sash configuration 20, the fixed sash configuration 30, and the sill configuration 100A, as depicted in FIG. 26 to FIG. 34. In some embodiments, for example, the space 200C is defined below the movable sash 21 and laterally outwardly relative to the movable sash supporter 110. In some embodiments, for example, the space 200C is further defined between the movable sash 21 and the shoulder 130. In some embodiments, for example, the space 200C is further defined between the movable sash support 110 and the sill compensator 150.

Figure 26:
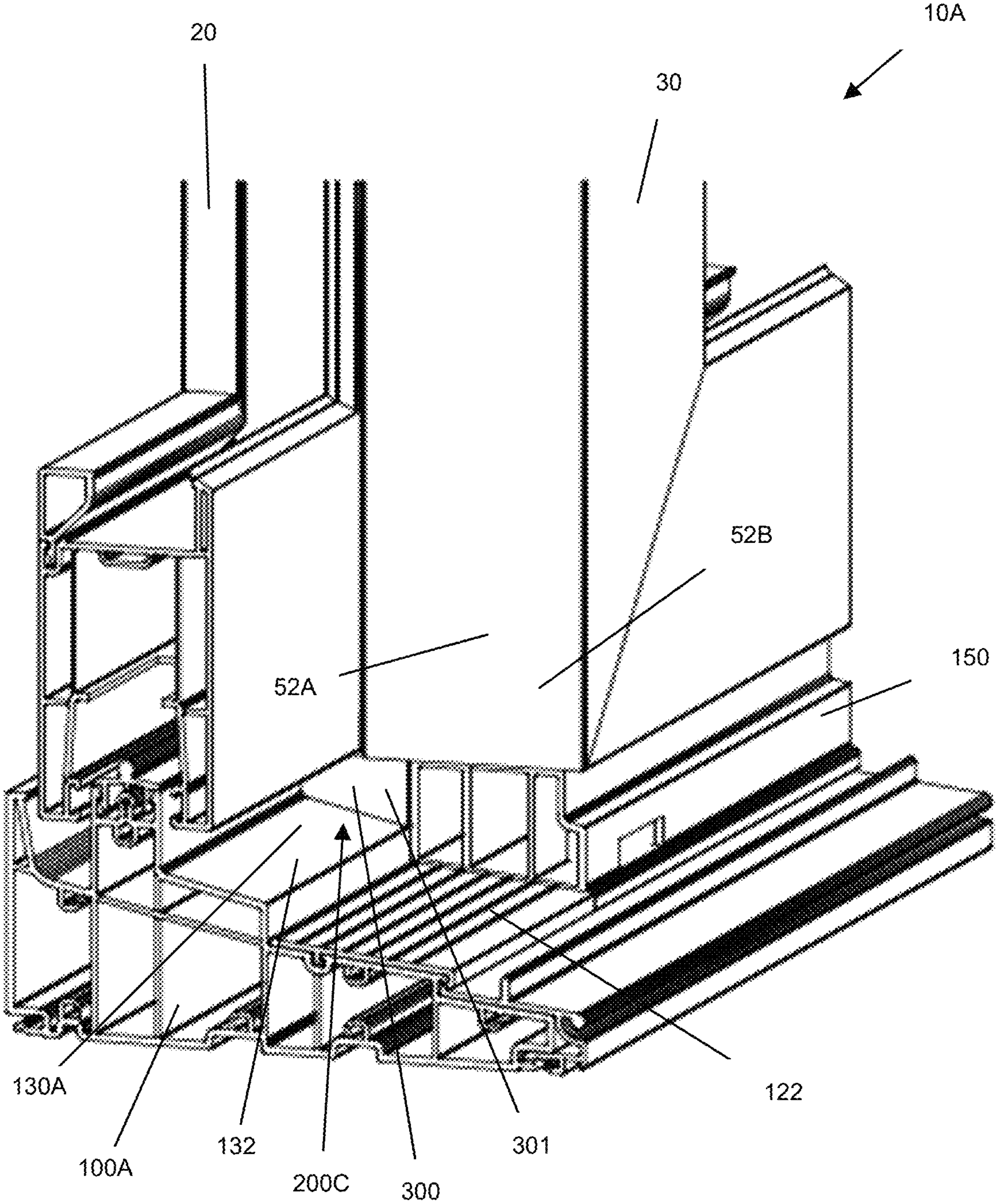
FIG. 26 is a perspective view of another embodiment of a framework assembly, with a plug configuration disposed in a space defined between the movable sash configuration, fixed sash configuration, and sill configuration.
Figure 27:
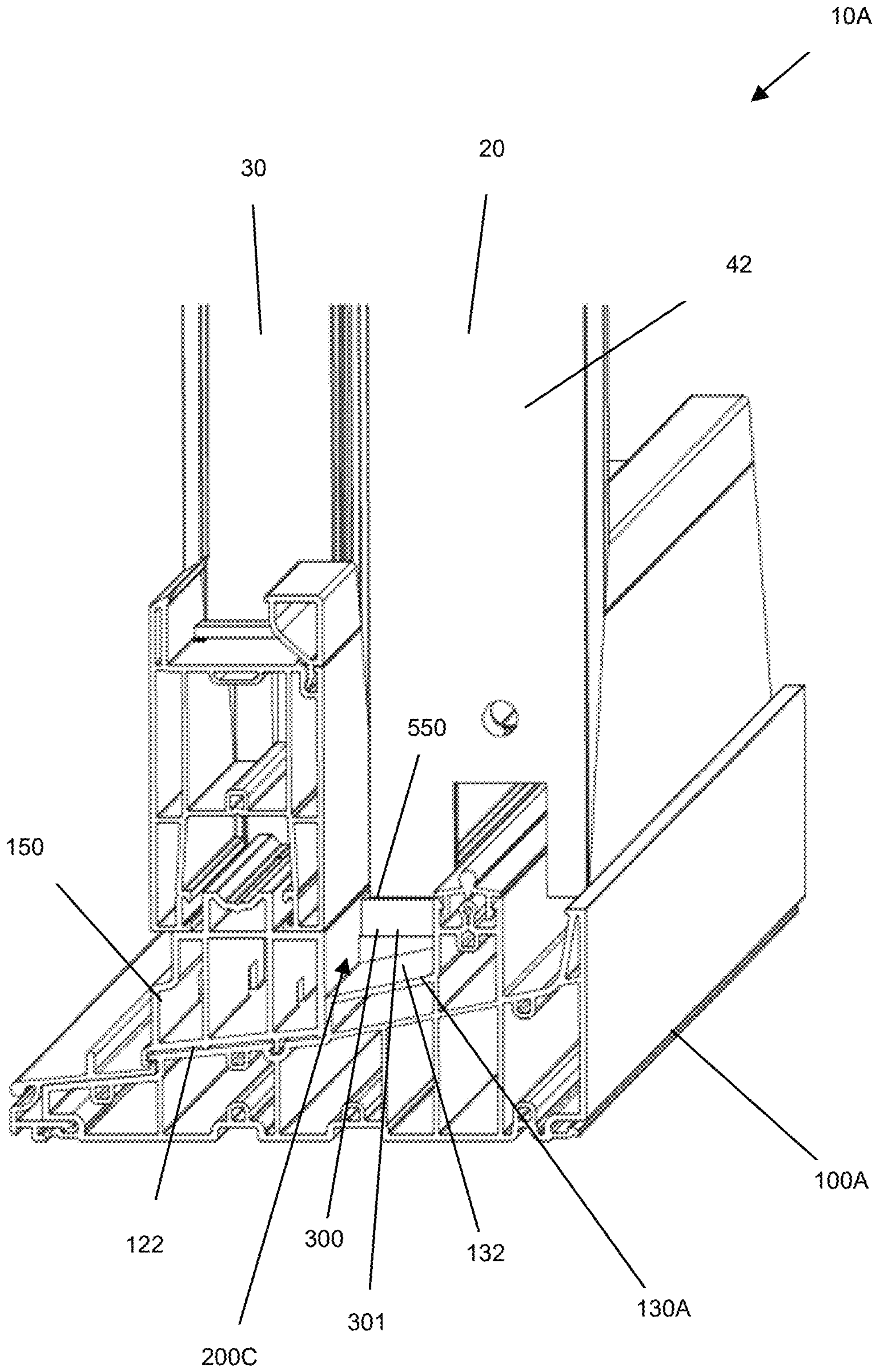
FIG. 27 is another perspective view of the framework assembly of FIG. 26.
Figure 28:
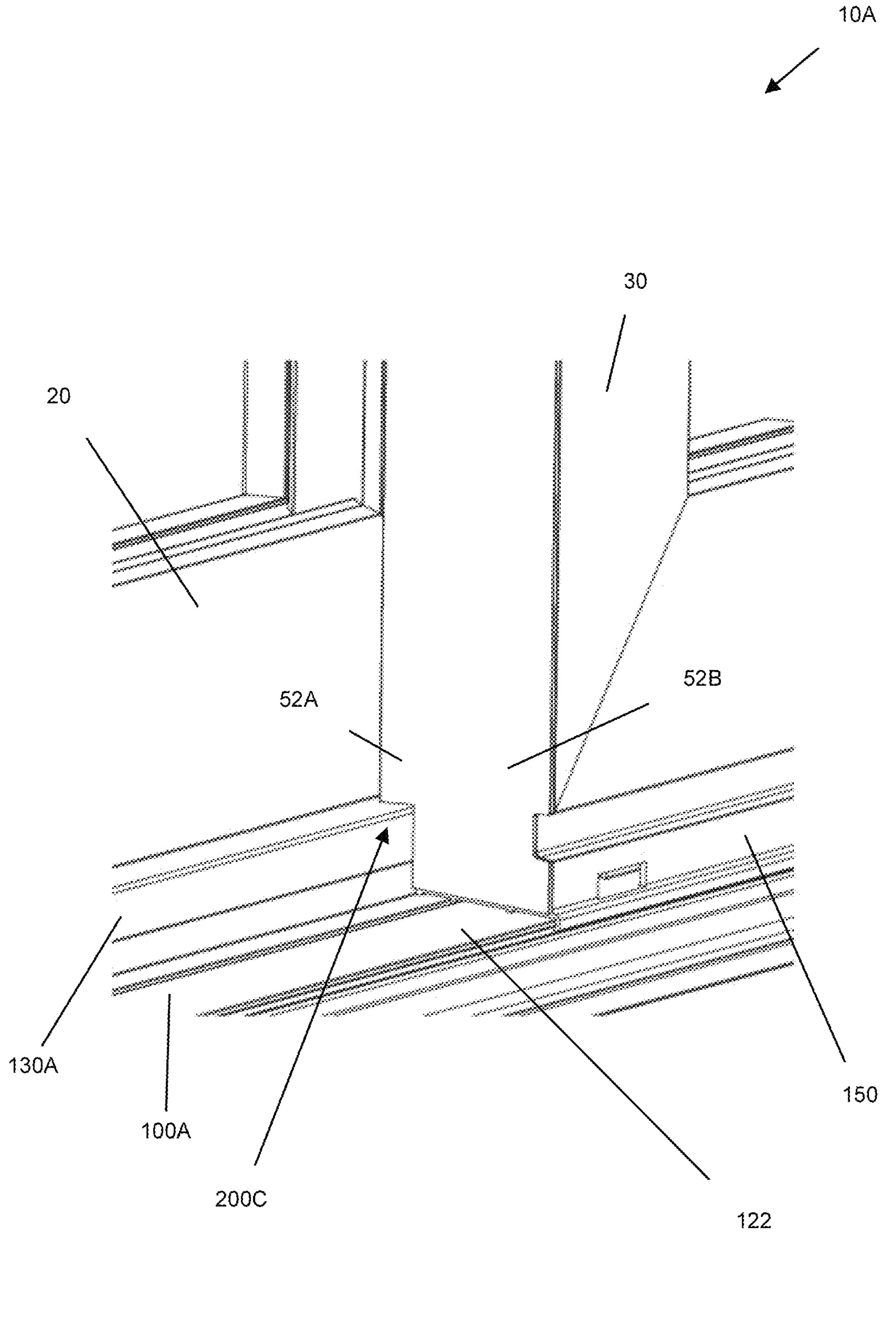
FIG. 28 is a perspective view of the framework assembly of FIG. 26, without the plug configuration disposed in the space.
Figure 29:
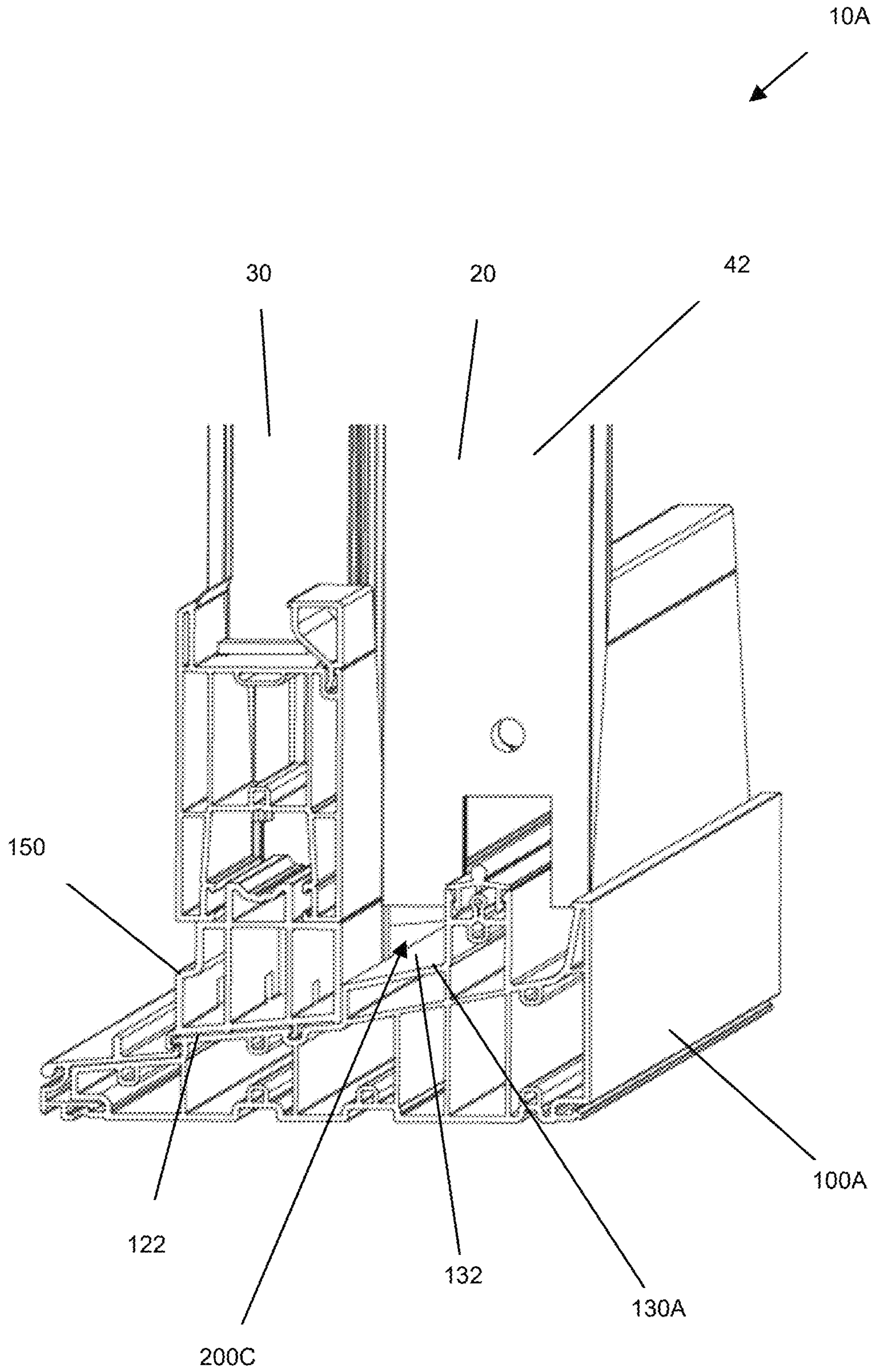
FIG. 29 another perspective view of the framework assembly of FIG. 28.

In some embodiments, for example, as depicted in FIG. 26 and FIG. 28, the exterior interlock cover 52 is defined by a first exterior interlock cover portion 52A and a second exterior interlock cover portion 52B. As depicted, in some embodiments, for example, while the assembly 10 is mounted to the opening of the building construction, the first exterior interlock cover portion 52A is disposed closer to the inside of the building, relative to the second exterior interlock cover portion 52A. In some embodiments, for example, while the assembly 10 is mounted to the opening of the building construction, the first exterior interlock cover portion 52A is disposed above the shoulder 130A, and the second exterior interlock cover portion 52B is disposed above the sill compensator 150. In some embodiments, for example, as depicted in FIG. 26 to FIG. 34, the first exterior interlock cover portion 52A and the sealing configuration 64 extend from the top of the fixed sash 31 to the bottom of the fixed sash 31, and the second exterior interlock cover portion 52B extends from the top of the fixed sash 31, past the bottom of the fixed sash 31, to the sill compensator mounting surface 122. In some embodiments, for example, the first exterior interlock cover portion 52A and the second exterior interlock cover portion 52B are of unitary one piece construction. As depicted, the second exterior interlock cover portion 52B occludes the interior of the sill compensator 150 from view. In some embodiments, for example, the occlusion of the interior of the sill compensator 150 from view by the second exterior interlock cover portion 52B includes concealing of the interior of the sill compensator 150 from view. In some embodiments, for example, the exterior interlock cover portion 52B is disposed in engagement with the sill compensator mounting surface 122.

As depicted in FIG. 26 to FIG. 34, the shoulder 130A of the sill configuration 100A extends from the movable sash supporter 110 to the fixed sash configuration 30. In some embodiments, for example, the shoulder 130A extends from the movable sash supporter 110 to the sill compensator 150. In some embodiments, for example, the transitional wall member 136 is abutting the sill compensator 150. In some embodiments, for example, the shoulder member 134 of the shoulder 130A is wider than the shoulder member 134 of the shoulder 130A.

In some embodiments, for example, as depicted in FIG. 26 to FIG. 34, to interfere with ingress of debris through the space 200C, the plug-supporting surface configuration includes the plug supporting surface 132 of the shoulder 130A for supporting the plug configuration 300, wherein the plug configuration 300 includes at least one plug 301. While the movable sash configuration 20 and the fixed sash configuration 30 are mounted to the sill configuration 100A, the movable sash configuration 20, the fixed sash configuration 30, and the sill configuration 100A are co-operatively disposed such that the space 200C is defined between the movable sash configuration 20, the fixed sash configuration 30, and the sill configuration 100A, and the supporting of the plug 301, by the plug-supporting surface 132, is a supporting of the plug 301 within the space 200C. In some embodiments, for example, while the plug 301 is supported by the plug-supporting surface 132 and disposed within the space 200C, the plug 301 is configured to interfere with ingress of debris through the space 200C. In some embodiments, for example, the interfering of debris through the space 200C by the plug 301 includes preventing passage of debris through the space 200C.

In some embodiments, for example, while the movable sash configuration 20 and the fixed sash configuration 30 are mounted to the sill configuration 100A, the space 200C and the plug are co-operatively configured such that the plug 301 is pressed within the space 200C, for example, between the movable sash 21 and the shoulder 130A, or between the movable sash 21, the fixed sash 31, and the shoulder 130A.

In some embodiments, for example, while the movable sash configuration 20 and the fixed sash configuration 30 are mounted to the sill configuration 100A, the space 200C and the plug configuration 300 are co-operatively configured such that the plug 301 occupies the entirely of the space 200C.

In some embodiments, for example, the space 200C is configured to receive the plug 301 to interfere with passage of debris between the movable sash configuration 20 and the fixed sash configuration 30, for example, through the space 200C. In some embodiments, for example, while the plug 301 is disposed in the space 200C, the plug 301 extends through at least a portion of the space 200C. In some embodiments, for example, while the plug 301 is disposed in the space 200C, the plug 301 extends through the entirety of the space 200C. In some embodiments, for example, while the plug 301 is disposed in the space 200C, at least a portion of the plug 301 is disposed below the movable sash 21, and at least a portion of the plug 301 is disposed below the fixed sash 31. In some embodiments, for example, while the framework assembly 10 is disposed in the closed configuration, and while the plug 301 is disposed in the space 200C, at least a portion of the plug 301 is disposed below the movable sash 21, and at least a portion of the plug 301 is disposed below the fixed sash 31. In some embodiments, for example, while the framework assembly 10 is disposed in the open configuration, and while the plug 301 is disposed in the space 200C, at least a portion of the plug 301 is disposed below the movable sash 21, and at least a portion of the plug is disposed below the fixed sash 31. In some embodiments, for example, the plug 301 and the space 200C have the same cross-sectional area, and the plug 301 is configured to fill at least a portion of the space 200C. In some embodiments, for example, the plug 301 and the space 200C have the same cross-sectional area, and the plug 301 is configured to fill the entirety of the space defined by the space 200C.

In some embodiments, for example, while the plug 301 is disposed in the space 200C, the plug 301 is elevated from the sill compensator mounting surface 122, for example, by a minimum distance of at least ⅜ inches. In some embodiments, for example, while the plug 301 is disposed in the space 200C, the plug is supported by the plug supporting surface 132. In some embodiments, for example, as depicted in FIG. 30, while the plug 301 is disposed in the space 200C, the entirety of the plug 301 is disposed above the sill compensator mounting surface 122.

In some embodiments, for example, while the assembly 10 is mounted within to the opening of the building construction, and the plug 301 is supported by the plug-supporting surface 132 and disposed in the space 200C, the plug 301 is disposed above the base by a minimum vertical distance of at least 1 inch. In some embodiments, for example, as depicted in FIG. 30, while the plug 301 is disposed in the space 200C, the entirety of the plug 301 is disposed above the base.

Figure 30:
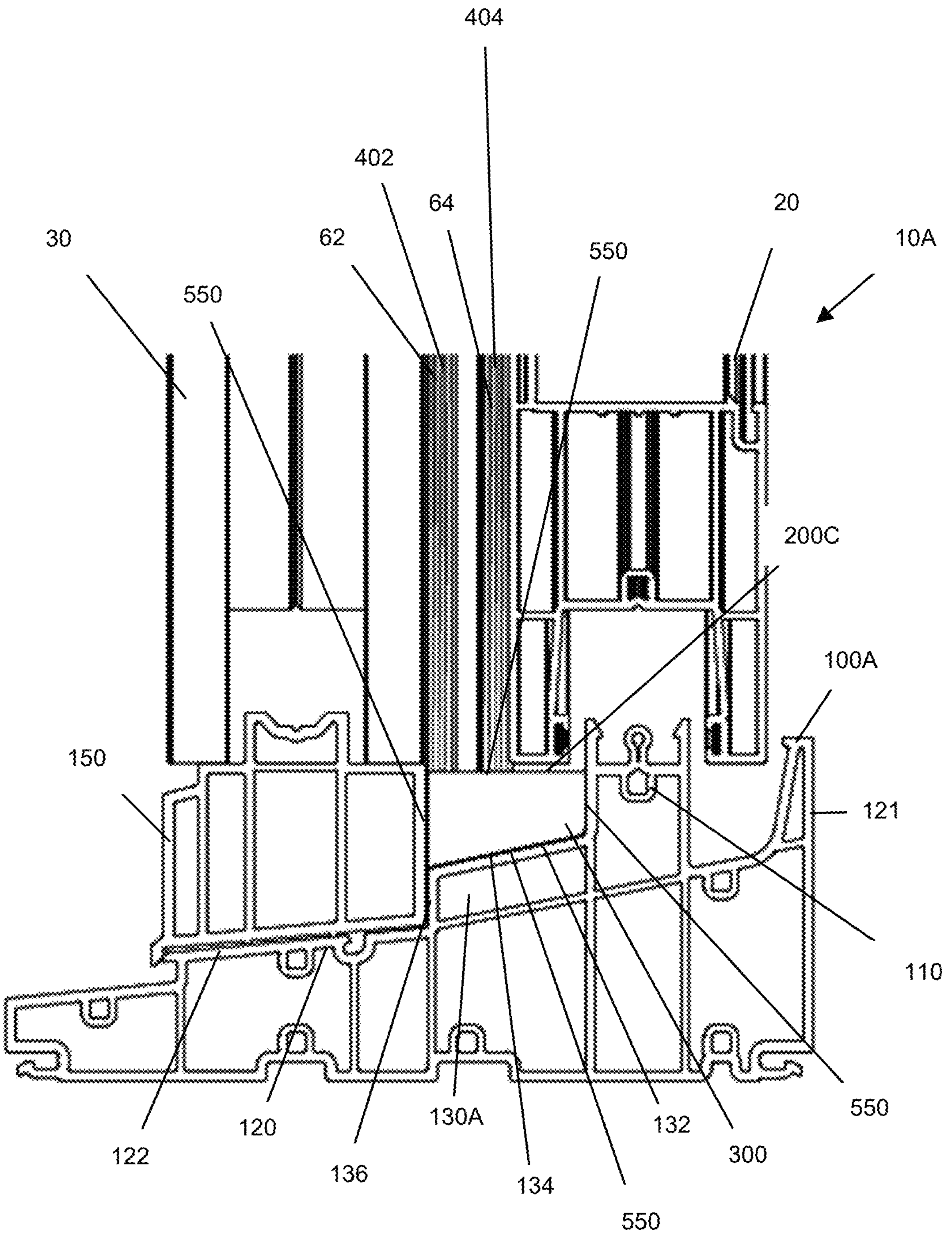
FIG. 30 is a cross-sectional view of the framework assembly of FIG. 26.
Figure 31:
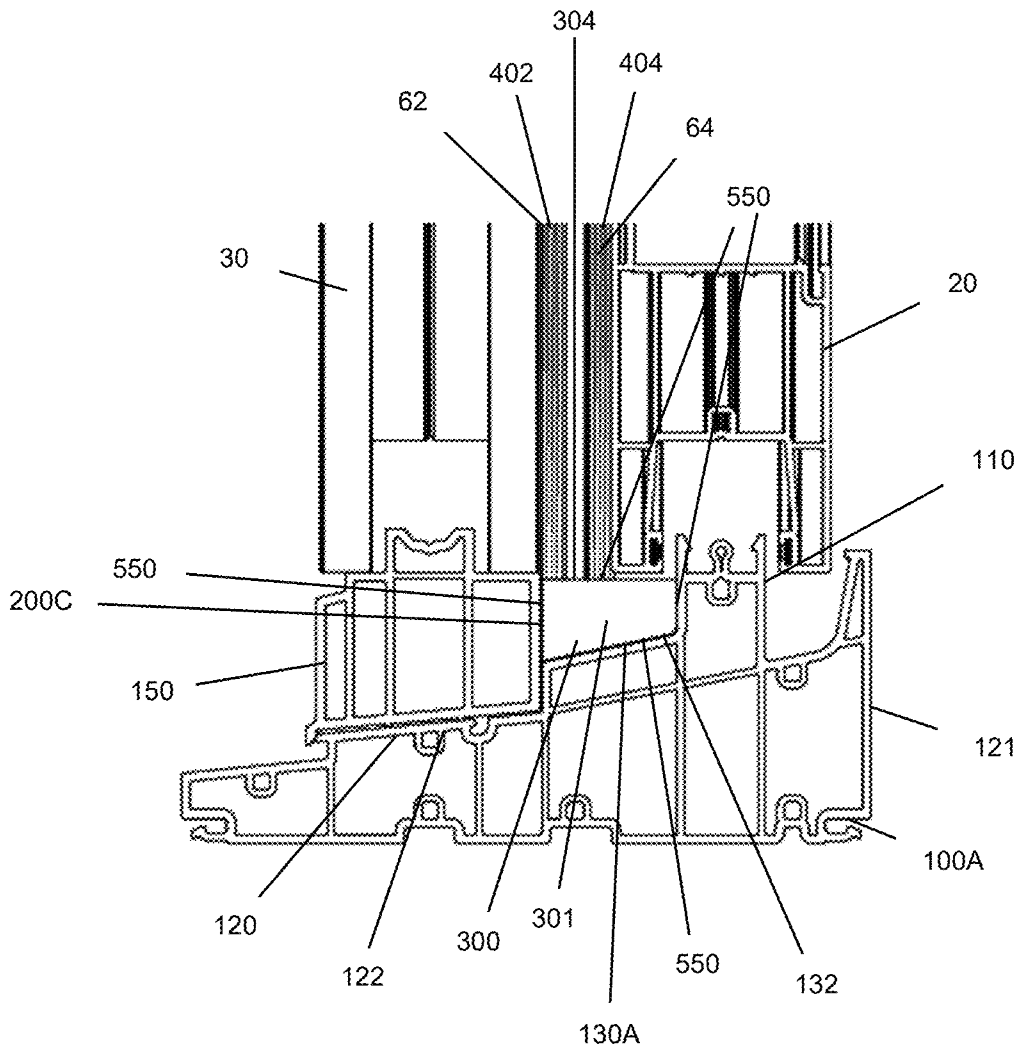
FIG. 31 is a cross-sectional view of the framework assembly of FIG. 26, depicting the sill configuration, the movable sash configuration, the fixed sash configuration, the plug configuration, the sealing configuration of the movable sash configuration, and the sealing configuration of the fixed sash configuration.
Figure 32:
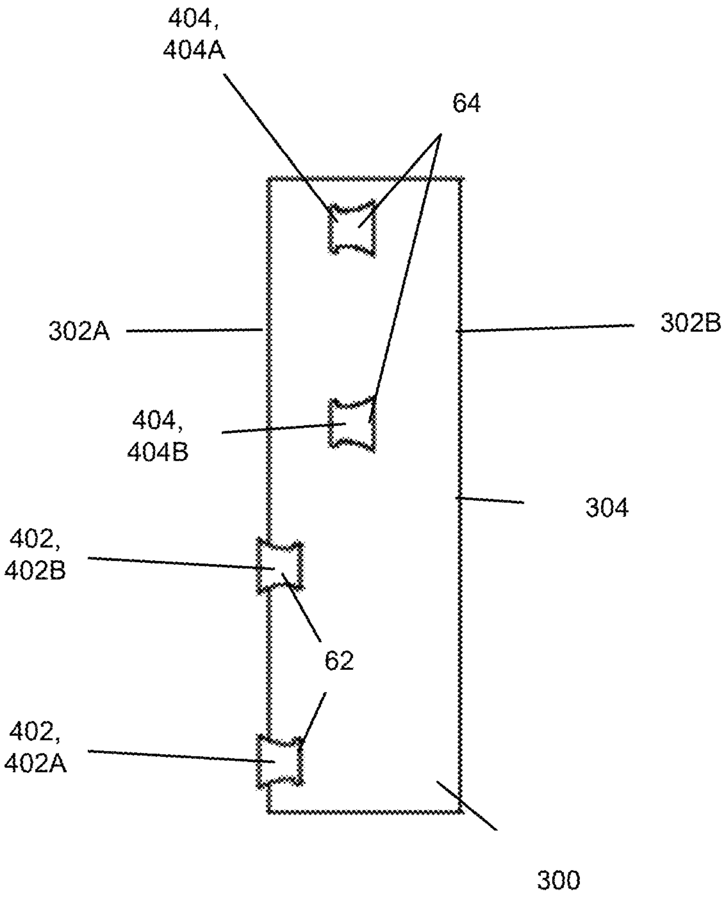
FIG. 32 is a top view of the framework assembly of FIG. 31, depicting the plug configuration, the sealing configuration of the movable sash configuration, and the sealing configuration of the fixed sash configuration.
Figure 33:
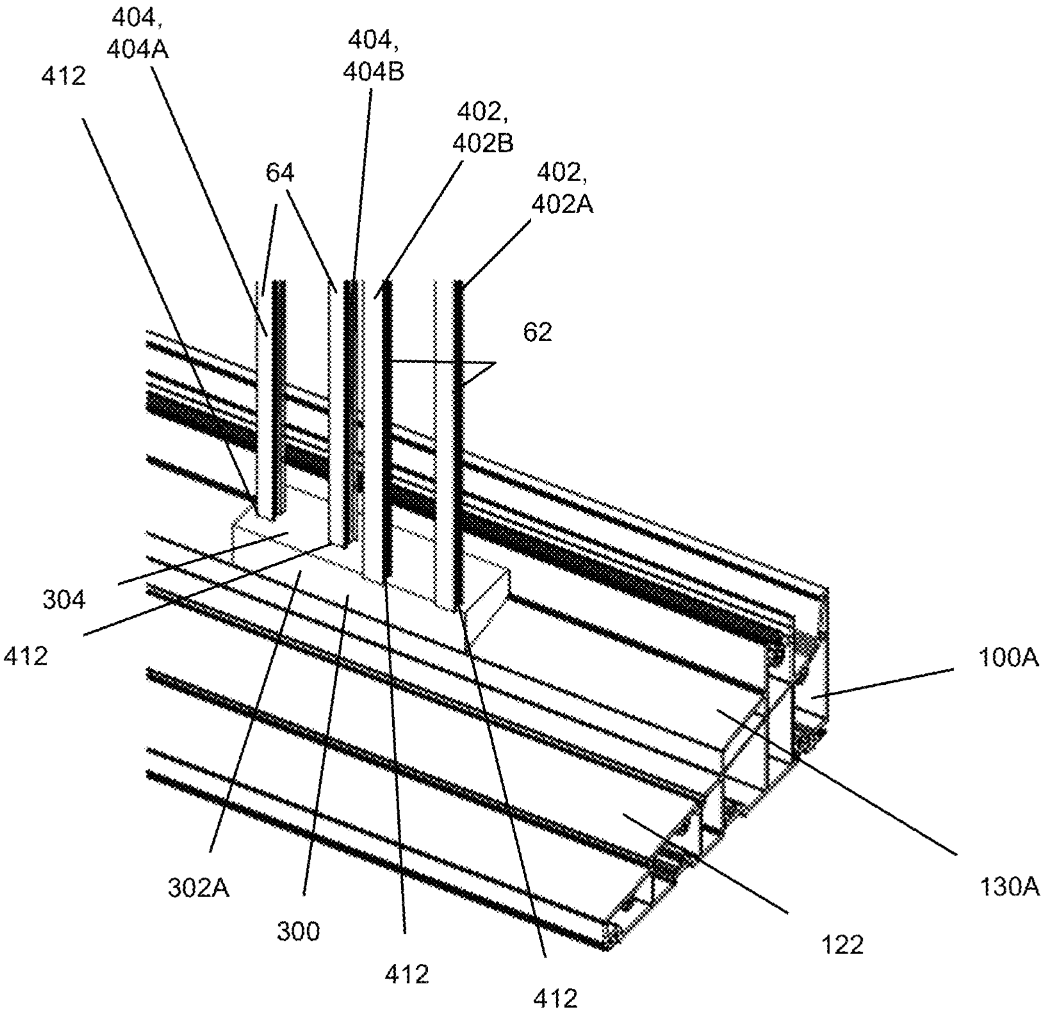
FIG. 33 is a perspective view of the framework assembly of FIG. 31, depicting the sill configuration, the plug configuration, the sealing configuration of the movable sash configuration, and the sealing configuration of the fixed sash configuration.
Figure 34:
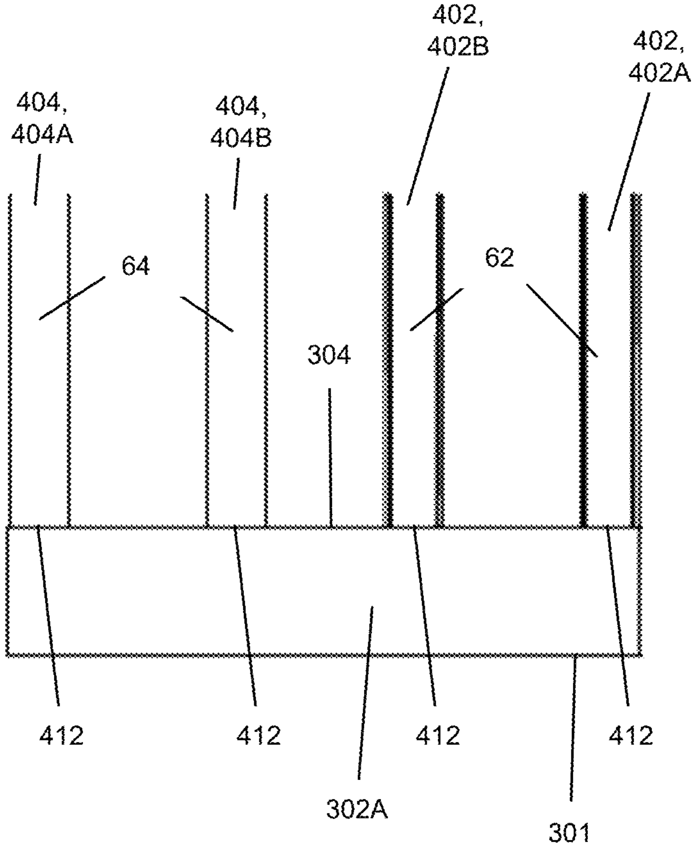
FIG. 34 is a front view of the framework assembly of FIG. 31, depicting the plug configuration, the sealing configuration of the movable sash configuration, and the sealing configuration of the fixed sash configuration.

In some embodiments, for example, as depicted in FIG. 30 and FIG. 31, while the movable sash configuration 20 and the fixed sash configuration 30 are mounted to the sill configuration 100A and the plug 301 is disposed in the space 200C, the outer surface of the plug 301 engages with the plug supporting surface 132, the movable sash supporter 110, the bottom of the movable sash 21, the sill compensator 150, the sealing configuration 62 of the movable sash configuration 20, and the sealing configuration 64 of the fixed sash configuration 30 to define a debris ingress interfering interface 550 for interfering with passage of debris between the movable sash configuration 20 and the fixed sash configuration 30, for example, through the space 200C. In some embodiments, for example, the plug 301 that is disposed in the space 200C further engages with the fixed sash 31 to define the debris ingress interfering interface 550 for interfering with passage of debris between the movable sash configuration 20 and the fixed sash configuration 30, for example, through the space 200C. In some embodiments, for example, the outer surface of the plug 301 includes fibres, and the fibres of the plug 301 engages with the plug supporting surface 132, the movable sash supporter 110, the bottom of the movable sash 21, the sill compensator 150, the sealing configuration 62 of the movable sash configuration 20, and the sealing configuration 64 of the fixed sash configuration 30 to define the debris ingress interfering interface 550 for interfering with passage of debris between the movable sash configuration 20 and the fixed sash configuration 30, for example, through the space 200C. In some embodiments, for example, the plug 301 that is disposed in the space 200C further engages with the fixed sash 31 to define the debris ingress interfering interface 550 for interfering with passage of debris between the movable sash configuration 20 and the fixed sash configuration 30, for example, through the second space portion 200C.

In some embodiments, for example, the plug 301 is configured to interfere with at least 50% of particles having a size of at least 2 millimeters from ingress through the space 200C. In some embodiments, for example, the plug 301 is configured to interfere with at least 75% of particles having a size of at least 2 millimeters from ingress through the space 200C. In some embodiments, for example, the plug 301 is configured to interfere with at least 95% of particles having a size of at least 2 millimeters from ingress through the space 200C. In some embodiments, for example, the plug 301 is configured to interfere with at least 50% of particles having a size of at least 1 millimeters from ingress through the space 200C. In some embodiments, for example, the plug 301 is configured to interfere with at least 75% of particles having a size of at least 1 millimeters from ingress through the space 200C. In some embodiments, for example, the plug 301 is configured to interfere with at least 95% of particles having a size of at least 1 millimeters from ingress through the space 200C. In some embodiments, for example, the plug 301 is configured to interfere with at least 50% of particles having a size of at least 0.5 millimeters from ingress through the space 200C. In some embodiments, for example, the plug 301 is configured to interfere with at least 75% of particles having a size of at least 0.5 millimeters from ingress through the space 200C. In some embodiments, for example, the plug 301 is configured to interfere with at least 95% of particles having a size of at least 0.5 millimeters from ingress through the space 200C.

In some embodiments, for example, as depicted in FIG. 31 to FIG. 34, an interlock assembly, including the exterior interlock 50 and the sealing configuration 64, and the interior interlock 40 and the sealing configuration 62, is disposed flush relative to the plug 301. As depicted in FIG. 31 to FIG. 34, the debris ingress interfering interface 550 defined by the top surface 304 of the plug 301, the shoulder 130A, the movable sash supporter 110, the movable sash configuration 20, the sill compensator 150, the sealing configuration 62 and the sealing configuration 64 includes a debris ingress interfering interface 412. The debris ingress interfering interface 412 is defined by the sealing configuration 62, the sealing configuration 64, and the top surface 304 of the plug 301. As depicted, the debris ingress interfering interface 412 is defined by a respective end portion of each of the one or more sealing members 402 of the sealing configuration 62, a respective end portion of each of the one or more sealing members 404 of the sealing configuration 64, and the top surface 304 of the plug 301. In some embodiments, for example, the plug 301 engages both of the sealing configuration 62 and the sealing configuration 64 for defining the debris ingress interfering interface 550, which, in some embodiments, for example, improves the interference of passage of debris between the movable sash configuration 20 and the fixed sash configuration 30, for example, the space 200C.

In some embodiments, for example, by elevating the entirety of the plug configuration 300, for example, the plug 301 of the plug configuration 300, above the sill compensator mounting interface 122, or above the base of the opening, while the assembly 10A is mounted to the opening of the building construction, exposure of the plug configuration 300 to debris that can accumulate on the sill compensator mounting surface 122 is reduced, which reduces the damage and wear and tear to the plug configuration 300 caused by exposure of the plug configuration 300 to debris. In some embodiments, for example, while the debris is flowing on the sill compensator mounting surface 122, in a direction wards the plug supporting surface 132, the debris flows into the transitional wall member 136, thereby interfering with flow of debris from the sill compensator mounting surface 122 to the plug supporting surface 132. Such interference provides additional time for gravitational forces to encourage the debris to flow away from the shoulder 130A.

In some embodiments, for example, the elevating the plug supporting surface 132 relative to the base 10, while the assembly 10A is mounted within the opening of the building construction, flow of debris from the environment, for example, from the ground or the floor, to the plug supporting surface 132, is interfered with.

FIG. 35 to FIG. 40 depict a framework 10B that is an alternate embodiment of the framework assembly 10A. The framework assembly 10B substantially corresponds to the framework assembly 10A, except as depicted in FIG. 35 to FIG. 40, while the movable sash configuration 20 and the fixed sash configuration 30 are mounted to the sill configuration 100A of the assembly 10A, the first exterior interlock cover portion 52A and the sealing configuration 64 extend past the bottom of the fixed sash 31 and to the shoulder 130A. In some embodiments, for example, the first exterior interlock cover portion 52A is disposed in engagement with the plug defining surface 132 of the shoulder 130A.

Figure 35:
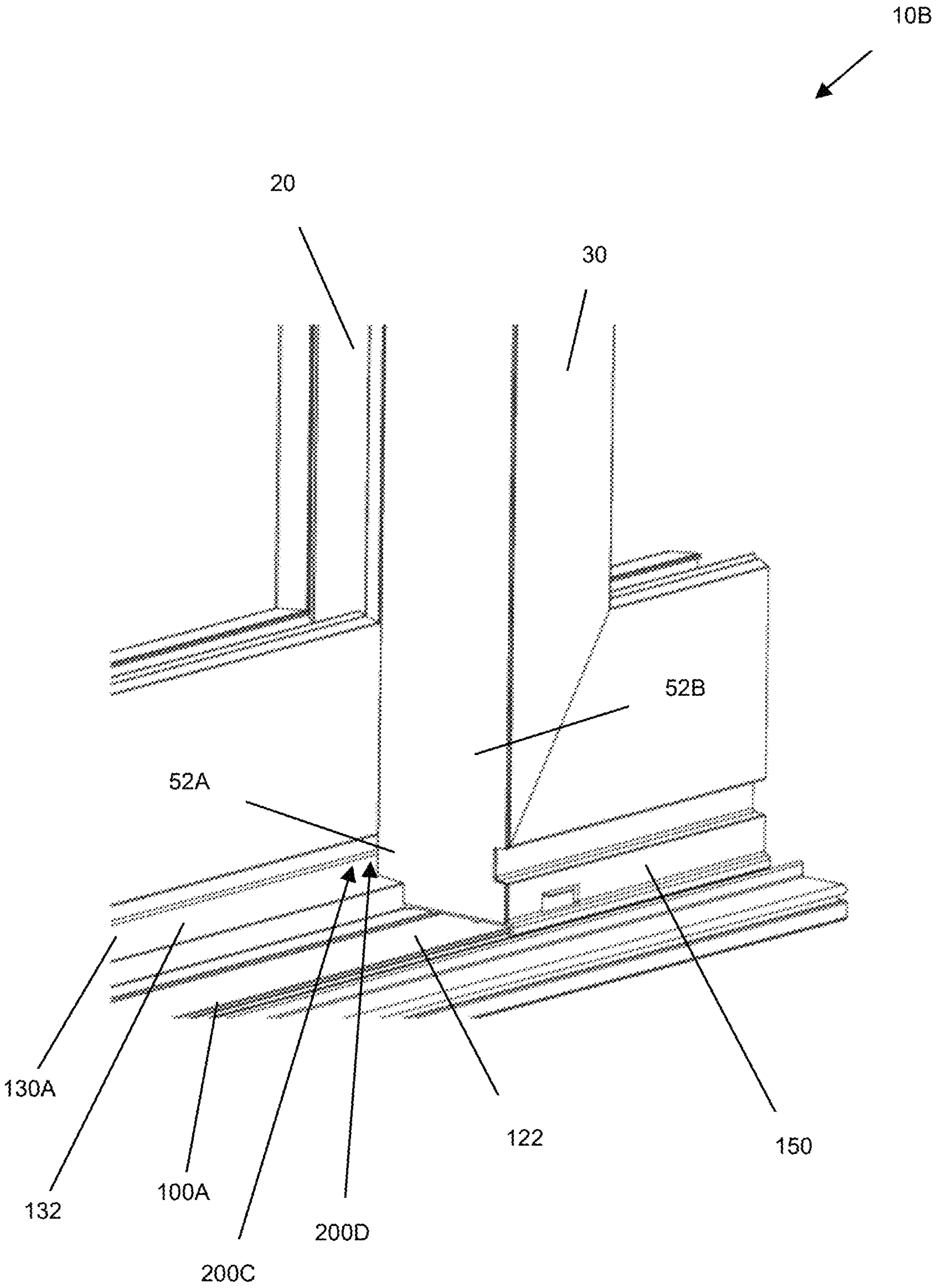
FIG. 35 is a perspective view of another embodiment of a framework assembly.
Figure 36:
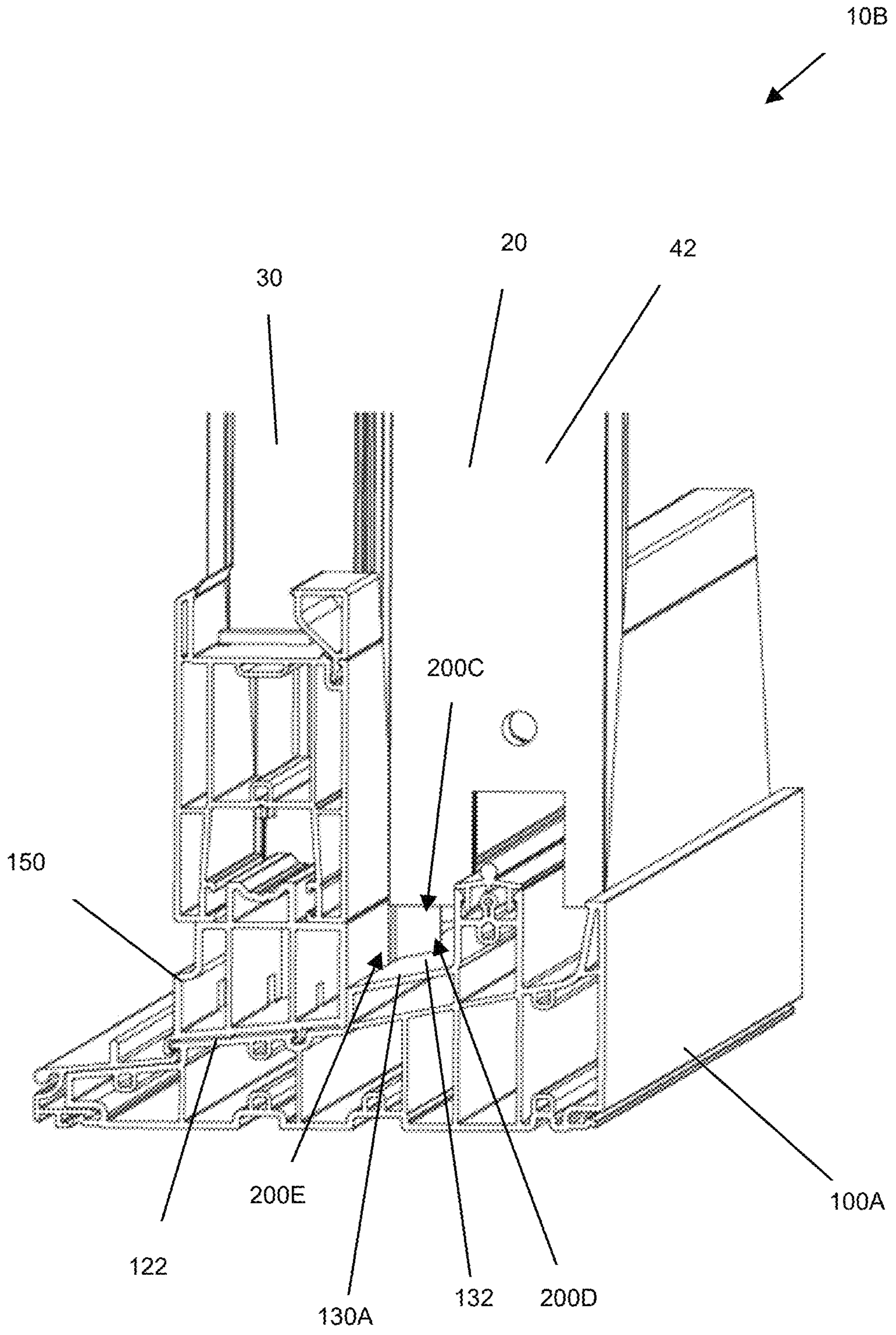
FIG. 36 is another perspective view of the framework of FIG. 35.
Figure 37:
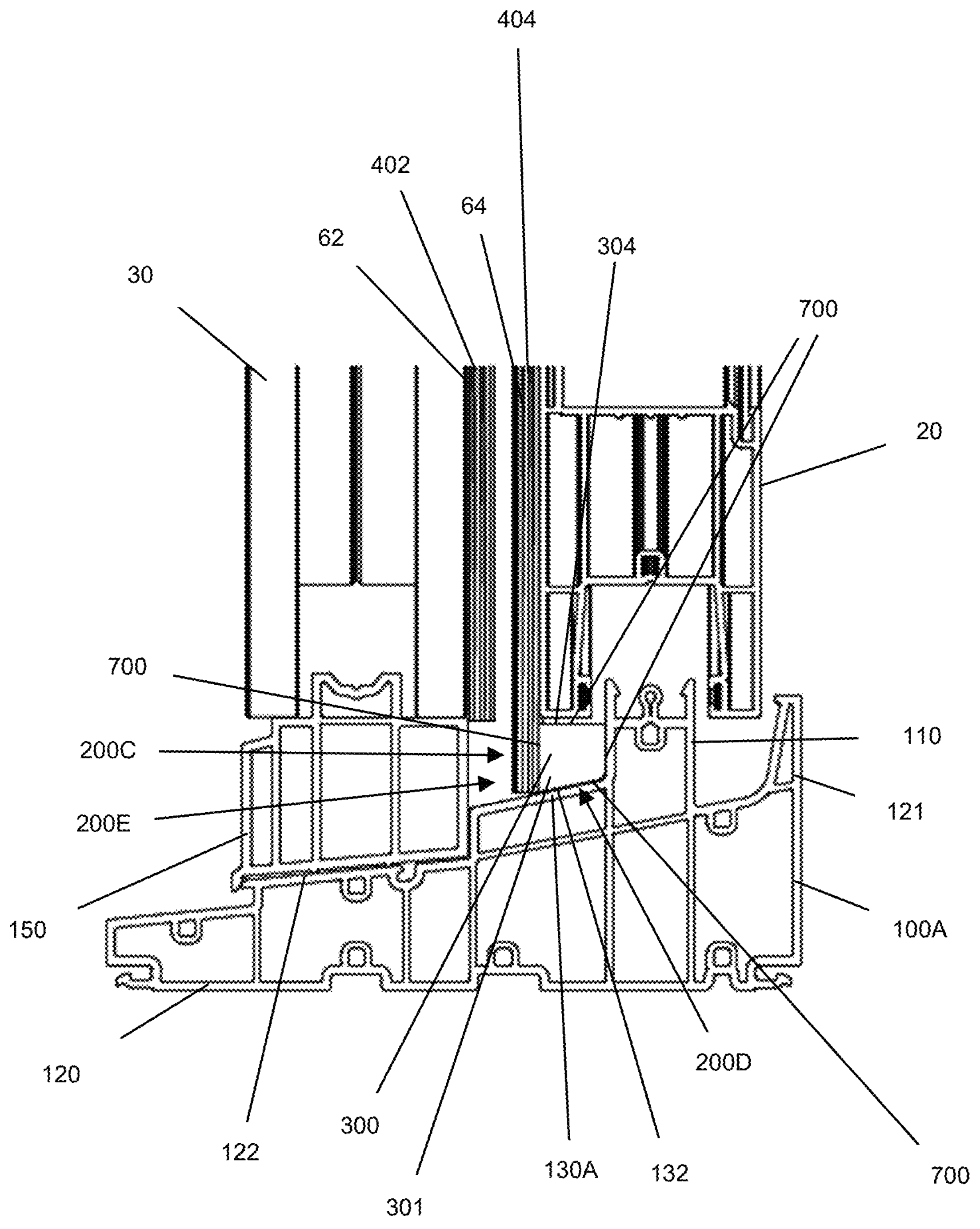
FIG. 37 is a cross-sectional view of the framework assembly of FIG. 35, depicting the sill configuration, the movable sash configuration, the fixed sash configuration, the plug configuration, the sealing configuration of the movable sash configuration, and the sealing configuration of the fixed sash configuration.
Figure 38:
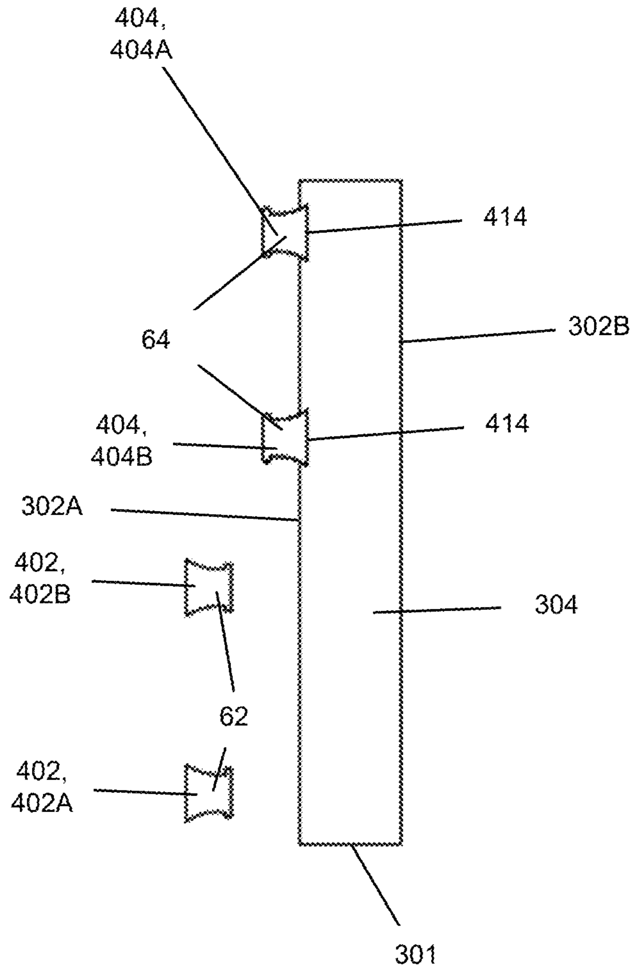
FIG. 38 is a top view of the framework assembly of FIG. 37, depicting the plug configuration, the sealing configuration of the movable sash configuration, and the sealing configuration of the fixed sash configuration.

In some embodiments, for example, as depicted in FIG. 35 to FIG. 37, the space 200C includes a first space portion 200D and a second space portion 200E. In some embodiments, for example, the space 200C is defined by the first space portion 200D and the second space portion 200E As depicted, the first space portion 200D is defined between the movable sash 21, the plug supporting surface 132 of the shoulder 130A, and the movable sash supporter 110. In some embodiments, for example, the first space portion 200D is defined between the movable sash 21, the plug supporting surface 132 of the shoulder 130A, and laterally outwardly relative to the movable sash supporter 110. In some embodiments, for example, the first space portion 200D is further defined between the movable sash support 110 and the sealing configuration 64. In some embodiments, for example, the second space portion 200E is defined between the fixed sash 31, the plug supporting surface 132 of the shoulder 130A, and the sill compensator 150. In some embodiments, for example, the second space portion 200E is defined between the fixed sash 31, the plug supporting surface 132 of the shoulder 130A, and laterally outwardly relative to the sill compensator 150. In some embodiments, for example, the second space portion 200E is further defined between the sill compensator 150 and the first space portion 200D.

In some embodiments, for example, as depicted in FIG. 35 to FIG. 40, to interfere with ingress of debris through the first space portion 200D, the plug-supporting surface configuration includes the plug supporting surface 132 of the shoulder 130A for supporting the plug configuration 300, wherein the plug configuration 300 includes at least one plug 301. While the movable sash configuration 20 and the fixed sash configuration 30 are mounted to the sill configuration 100A, the plug supporting surface 132 of the shoulder 130A is configured for supporting the plug 301 for disposition within the first space portion 200D. While the movable sash configuration 20 and the fixed sash configuration 30 are mounted to the sill configuration 100A, the supporting of the plug 301, by the plug-supporting surface 132, is a supporting of the plug 301 within the first space portion 200D. In some embodiments, for example, while the plug 301 is supported by the plug-supporting surface 132 and disposed within the first space portion 200D, the plug 301 is configured to interfere with ingress of debris through the first space portion 200D. In some embodiments, for example, the interfering of debris through the first space portion 200D by the plug 301 includes preventing passage of debris through the first space portion 200D.

In some embodiments, for example, while the movable sash configuration 20 and the fixed sash configuration 30 are mounted to the sill configuration 100A, the first space portion 200D and the plug 301 are co-operatively configured such that the plug 301 is pressed within the first space portion 200D, for example, between the movable sash 21 and the shoulder 130A.

In some embodiments, for example, while the movable sash configuration 20 and the fixed sash configuration 30 are mounted to the sill configuration 100A, the first space portion 200A and the plug 301 are co-operatively configured such that the plug 301 occupies the entirely of the first space portion 200D.

In some embodiments, for example, the first space portion 200D is configured to receive the plug 301 to interfere with passage of debris between the movable sash configuration 20 and the fixed sash configuration 30, for example, through the first space portion 200D. In some embodiments, for example, while the plug 301 is disposed in the first space portion 200D, the plug 301 extends through at least a portion of the first space portion 200D. In some embodiments, for example, while the plug 301 is disposed in the first space portion 200D, the plug 301 extends through the entirety of the first space portion 200D. In some embodiments, for example, while the plug 301 is disposed in the first space portion 200D, the plug 301 is disposed below the movable sash 21. In some embodiments, for example, while the framework 10 is disposed in the closed configuration, and while the plug 301 is disposed in the first space portion 200D, the plug 301 is disposed below the movable sash 21. In some embodiments, for example, while the framework 10 is disposed in the open configuration, and while the plug 301 is disposed in the first space portion 200D the plug 301 is disposed below the movable sash 21. In some embodiments, for example, the plug 301 and the first space portion 200D have the same cross-sectional area, and the plug 301 is configured to fill at least a portion of the first space portion 200D. In some embodiments, for example, the plug 301 and the first space portion 200D have the same cross-sectional area, and the plug 301 is configured to fill at least the entirety of the first space portion 200D.

In some embodiments, for example, while the movable sash configuration 20 and the fixed sash configuration 30 are supported by the sill configuration 100, and the plug 301 is disposed in the first space portion 200D, the side surface 302A of the plug 301 is facing the fixed sash configuration 30. In some embodiments, for example, while the movable sash configuration 20 and the fixed sash configuration 30 are supported by the sill configuration 100, and the plug 301 is disposed in the first space portion 200D, the side surface 302A of the plug 301 is facing the sill compensator 150.

Figure 39:
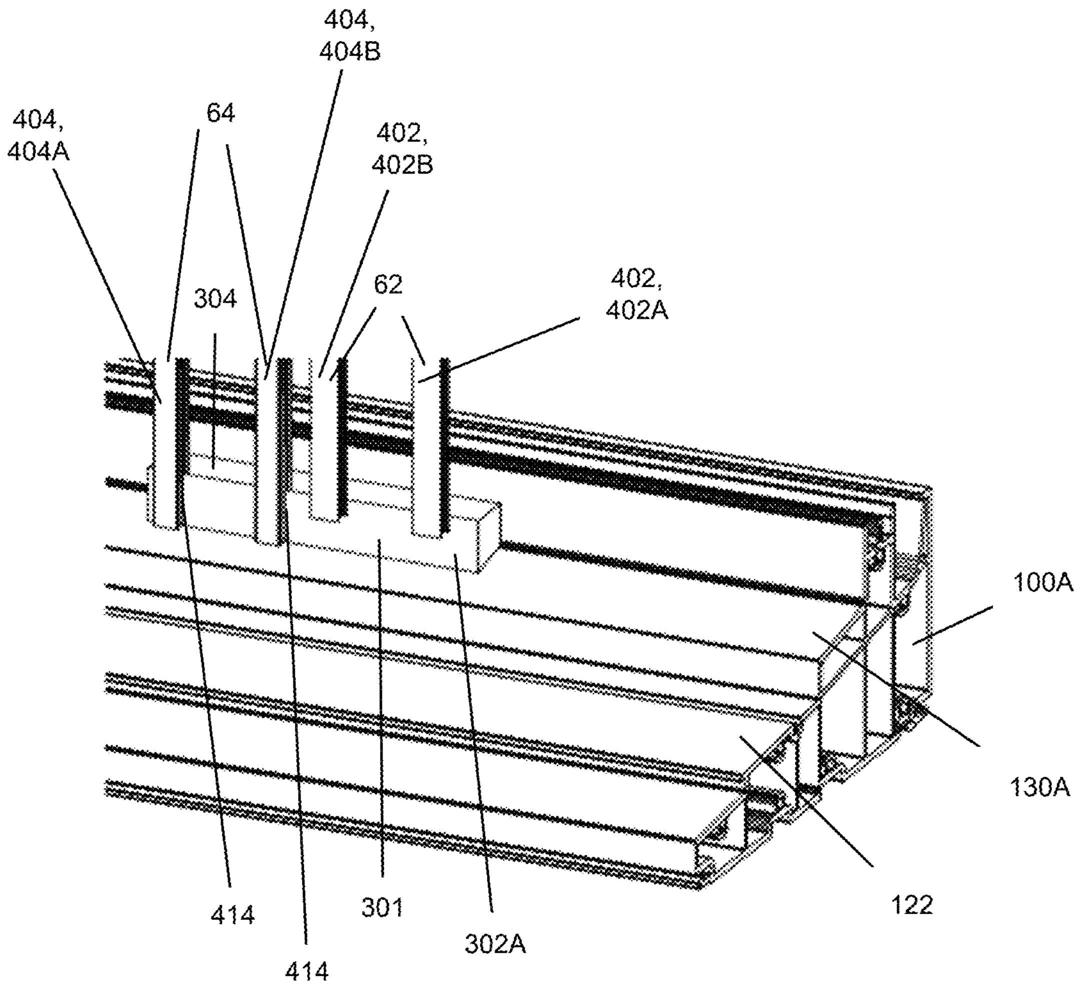
FIG. 39 is a perspective view of the framework assembly of FIG. 37, depicting the sill configuration, the plug configuration, the sealing configuration of the movable sash configuration, and the sealing configuration of the fixed sash configuration.
Figure 40:
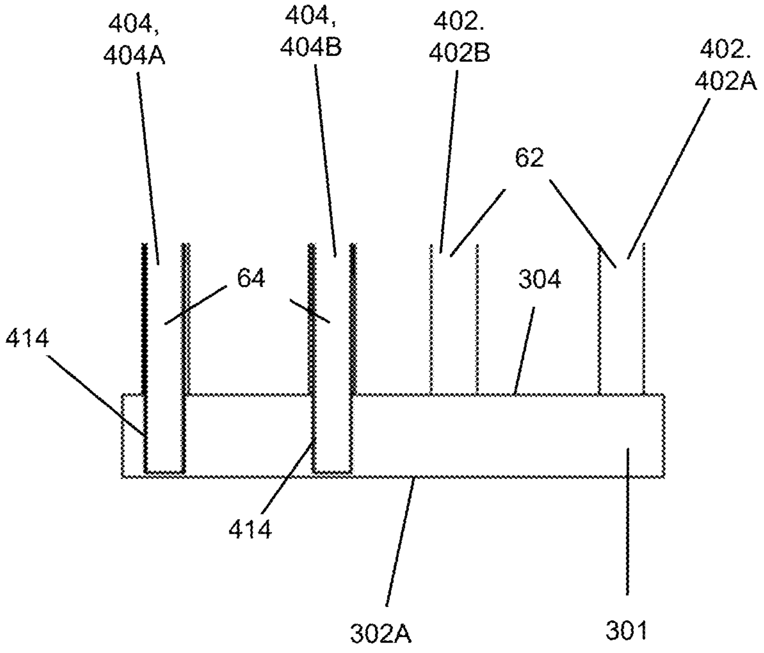
FIG. 40 is a front view of the framework assembly of FIG. 37, depicting the plug configuration, the sealing configuration of the movable sash configuration, and the sealing configuration of the fixed sash configuration.

In some embodiments, for example, while the plug 301 is disposed in the first space portion 200D, the plug 301 is elevated from the sill compensator mounting surface 122, for example, by a minimum distance of at least ⅜ inches. In some embodiments, for example, while the plug 301 is disposed in the first space portion 200D, the plug is supported by the plug supporting surface 132. In some embodiments, for example, as depicted in FIG. 37 and FIG. 39, while the plug 301 is disposed in the first space portion 200D, the entirety of the plug 301 is disposed above the sill compensator mounting surface 122.

In some embodiments, for example, while the assembly 10B is mounted within to the opening of the building construction, and the plug 301 is supported by the plug-supporting surface 132 and disposed in the first space portion 200D, the plug 301 is disposed above the base by a minimum vertical distance of at least 1 inch. In some embodiments, for example, as depicted in FIG. 37 and FIG. 39, while the plug 301 is disposed in the first space portion 200D, the entirety of the plug 301 is disposed above the base.

In some embodiments, for example, as depicted in FIG. 37, while the movable sash configuration 20 and the fixed sash configuration 30 are mounted to the sill configuration 100 and the plug 301 is disposed in the first space portion 200D, the outer surface of the plug 301 engages with the plug supporting surface 132, the movable sash supporter 110, the bottom of the movable sash 21, and the sealing configuration 64 of the fixed sash configuration 30 to define a debris ingress interfering interface 700 for interfering with passage of debris between the movable sash configuration 20 and the fixed sash configuration 30, for example, through the first space portion 200D. In some embodiments, for example, the outer surface of the plug 301 includes fibres, and the fibres of the plug 301 engages with the plug supporting surface 132, the movable sash supporter 110, the bottom of the movable sash 21, and the sealing configuration 64 of the fixed sash configuration 30 to define the debris ingress interfering interface 700 for interfering with passage of debris between the movable sash configuration 20 and the fixed sash configuration 30, for example, through the first space portion 200D.

In some embodiments, for example, the plug 301 is configured to interfere with at least 50% of particles having a size of at least 2 millimeters from ingress through the first space portion 200D. In some embodiments, for example, the plug 301 is configured to interfere with at least 75% of particles having a size of at least 2 millimeters from ingress through the first space portion 200D. In some embodiments, for example, the plug 301 is configured to interfere with at least 95% of particles having a size of at least 2 millimeters from ingress through the first space portion 200D. In some embodiments, for example, the plug 301 is configured to interfere with at least 50% of particles having a size of at least 1 millimeters from ingress through the first space portion 200D. In some embodiments, for example, the plug 301 is configured to interfere with at least 75% of particles having a size of at least 1 millimeters from ingress through the first space portion 200D. In some embodiments, for example, the plug 301 is configured to interfere with at least 95% of particles having a size of at least 1 millimeters from ingress through the first space portion 200D. In some embodiments, for example, the plug 301 is configured to interfere with at least 50% of particles having a size of at least 0.5 millimeters from ingress through the first space portion 200D. In some embodiments, for example, the plug 301 is configured to interfere with at least 75% of particles having a size of at least 0.5 millimeters from ingress through the first space portion 200D. In some embodiments, for example, the plug 301 is configured to interfere with at least 95% of particles having a size of at least 0.5 millimeters from ingress through the first space portion 200D.

In some embodiments, for example, as depicted in FIG. 35 to FIG. 40, the exterior interlock assembly, including the exterior interlock 50 and the sealing configuration 64, is disposed flush relative to the plug 301. As depicted in FIG. 35 to FIG. 40, the debris ingress interfering interface 700 defined by the outer surface of the plug 301, the shoulder 130, the movable sash supporter 110, the movable sash 21, and the sealing configuration 64 includes a debris ingress interfering interface 414. The debris ingress interfering interface 414 is defined by the sealing configuration 64 and the side surface 302A of the plug 301. As depicted, the debris ingress interfering interface 414 is defined by a respective lengthwise portion of each of the one or more sealing members 404 of the sealing configuration 64 and the side surface 302A of the plug 301. In some embodiments, for example, the debris ingress interfering interface 414 is larger than a debris ingress interfering interface defined by a respective end portion of each of the sealing members 404 of the sealing configuration 64 and the top surface 304 of the plug 301, which, in some embodiments, for example, improves the interference of passage of debris between the movable sash configuration 20 and the fixed sash configuration 30, for example, the first space portion 200D. In some embodiments, for example, the debris ingress interfering interface 414 has a minimum length based on the minimum height of the plug 301. In some embodiments, for example, the debris ingress interfering interface 414 has a minimum length of at least 0.5 inches.

As depicted in FIG. 37 to FIG. 40, the portion of the plug 301 that is disposed in the first space portion 200D is offset from the sealing configuration 62 of the movable sash configuration 20, such that said portion of the plug 301 and the sealing configuration 62 do not engage to define a debris ingress interfering interface.

In some embodiments, for example, as depicted in FIG. 35 to FIG. 40, while the movable sash configuration 20 and the fixed sash configuration 30 are supported by the sill configuration 100A, the exterior interlock cover 52, for example, the first exterior interlock cover portion 52A, occludes the second space portion 200E, and the exterior interlock cover portion 52A and the sealing configuration 64 of the fixed sash configuration 30 extends to the plug supporting surface 132 of the shoulder 130A, such that, in some embodiments, for example, the first exterior interlock cover portion 52A and the sealing members 404A and 404B of the sealing configuration 64 are engaged with the plug supporting surface 132. In some embodiments, for example, the occluding of the second space portion 200E by the first exterior interlock cover portion 52A includes concealing the second space portion 200E. In some embodiments, for example, the exterior interlock cover 52, for example, the first exterior interlock cover portion 52A, and the debris ingress interfering interface 414, defined by the sealing configuration 64 and the side surface 302A of the plug, are co-operatively configured to interfere with passage of debris between the movable sash configuration 20 and the fixed sash configuration 30, for example, through the second space portion 200E. In some embodiments, for example, said portion of the plug 301 that is disposed in the second space portion 200E is disposed in abutting engagement with the first exterior interlock cover portion 52A that extends to the shoulder 130A.

In some embodiments, for example, the plug 301 is configured such that, while the plug 301 is disposed in the first space portion 200D, at least a portion of the plug 301 is disposed in the second space portion 200E for interfering with passage of debris between the movable sash configuration 20 and the fixed sash configuration 30, for example, through the second space portion 200E. In some embodiments, for example, said portion of the plug 301 that is disposed in the second space portion 200E extends from, for example, laterally from, the portion of the plug 301 that is disposed in the first space portion 200D. In some embodiments, for example, said portion of the plug 301 that is disposed in the second space portion 200E engages with the end portion of the sealing configuration 62 of the movable sash configuration 20, the fixed sash 31, and the sill compensator 150 to define a debris ingress interfering interface for interfering with passage of debris between the movable sash configuration 20 and the fixed sash configuration 30, for example, through the second space portion 200E. In some embodiments, for example, said portion of the plug 301 that is disposed in the second space portion 200E further engages with the fixed sash 31 to define the debris ingress interfering interface for interfering with passage of debris between the movable sash configuration 20 and the fixed sash configuration 30, for example, through the second space portion 200E.

In some embodiments, for example, said portion of the plug 301 that is disposed in the second space portion 200E further engages with the plug supporting surface 132 of the shoulder 130A, such that the plug supporting surface 132 of the shoulder 130A is supporting said portion of the plug 301 that is disposed in the second space portion 200E, to define the debris ingress interfering interface for interfering with passage of debris between the movable sash configuration 20 and the fixed sash configuration 30, for example, through the second space portion 200E.

While the movable sash configuration 20 and the fixed sash configuration 30 are mounted to the sill configuration 100A, the plug supporting surface 132 defined by the plug supporting surface 132 is configured for supporting the portion of the plug 301 extending into the second space portion 200E for disposition within the second space portion 200E. While the movable sash configuration 20 and the fixed sash configuration 30 are mounted to the sill configuration 100A, the supporting of said portion the plug 301, by the plug-supporting surface 132 is a supporting of said portion of the plug 301 within the second space portion 200E. In some embodiments, for example, while said portion of the plug 301 is supported by the plug-supporting surface 132 and disposed within the second space portion 200E, said portion of the plug 301 is configured to interfere with ingress of debris through the second space portion 200E. In some embodiments, for example, the interfering of debris through the second space portion 200E by said portion of the plug 301 includes preventing passage of debris through the second space portion 200E.

In some embodiments, for example, while the movable sash configuration 20 and the fixed sash configuration 30 are mounted to the sill configuration 100A, the second space portion 200E and said portion of the plug 301 are co-operatively configured such that said portion of the plug 301 is pressed within the second space portion 200E, for example, between the fixed sash 31 and the plug supporting shoulder 132.

In some embodiments, for example, while the movable sash configuration 20 and the fixed sash configuration 30 are mounted to the sill configuration 100A, the second space portion 200E and said portion of the plug 301 are co-operatively configured such that said portion of the plug 301 occupies the entirely of the second space portion 200E.

In some embodiments, the plug configuration 300 includes a first plug 301 and a second plug 301, and the plug supporting surface configuration includes the plug supporting surface 132, wherein the plug supporting surface 132 is configured to support the first plug 301 for disposition within the first space portion 200D and to support the second plug 301 for disposition with the second space portion 200E.

While the movable sash configuration 20 and the fixed sash configuration 30 are mounted to the sill configuration 100, the plug supporting surface 132 of the shoulder 130A is configured for supporting the second plug 301 for disposition within the second space portion 200E. While the movable sash configuration 20 and the fixed sash configuration 30 are mounted to the sill configuration 100A, the supporting of the second plug 301, by the plug-supporting surface 132 is a supporting of the second plug 301 within the second space portion 200E. In some embodiments, for example, while the second plug 301 is supported by the plug-supporting surface 132 and disposed within the second space portion 200E, the second plug 301 is configured to interfere with ingress of debris through the second space portion 200E. In some embodiments, for example, the interfering of debris through the second space portion 200B by the second plug 301 includes preventing passage of debris through the second space portion 200E.

In some embodiments, for example, while the movable sash configuration 20 and the fixed sash configuration 30 are mounted to the sill configuration 100A, the second space portion 200E and the second plug 301 are co-operatively configured such that the second plug 301 is pressed within the second space portion 200E, for example, between the fixed sash 31 and the plug supporting shoulder 132.

In some embodiments, for example, while the movable sash configuration 20 and the fixed sash configuration 30 are mounted to the sill configuration 100A, the second space portion 200E and the second plug 301 are co-operatively configured such that the second plug 301 occupies the entirely of the second space portion 200E.

In some embodiments, for example, the second plug 301 that is disposed in the second space portion 200E engages with the end portion of the sealing configuration 62 of the movable sash configuration 20, the fixed sash 31, the first plug 301, and the sill compensator 150 to define a debris ingress interfering interface for interfering with passage of debris between the movable sash configuration 20 and the fixed sash configuration 30, for example, through the second space portion 200B. In some embodiments, for example, the second plug 301 that is disposed in the second space portion 200E further engages with the fixed sash 31 to define the debris ingress interfering interface for interfering with passage of debris between the movable sash configuration 20 and the fixed sash configuration 30, for example, through the second space portion 200E. In some embodiments, for example, the second plug 301 that is disposed in the second space portion 200E is disposed in abutting engagement with the first exterior interlock cover portion 52A that extends to the shoulder 130A. In some embodiments, for example, the second plug 301 that is disposed in the second space portion 200B further engages with the plug supporting surface 132 to define the debris ingress interfering interface for interfering with passage of debris between the movable sash configuration 20 and the fixed sash configuration 30, for example, through the second space portion 200E.

In some embodiments, for example, the second plug 301 is configured to interfere with at least 50% of particles having a size of at least 2 millimeters from ingress through the second space portion 200E. In some embodiments, for example, the second plug 301 is configured to interfere with at least 75% of particles having a size of at least 2 millimeters from ingress through the second space portion 200E. In some embodiments, for example, the second plug 301 is configured to interfere with at least 95% of particles having a size of at least 2 millimeters from ingress through the second space portion 200E. In some embodiments, for example, the second plug 301 is configured to interfere with at least 50% of particles having a size of at least 1 millimeters from ingress through the second space portion 200E. In some embodiments, for example, the second plug 301 is configured to interfere with at least 75% of particles having a size of at least 1 millimeters from ingress through the second space portion 200E. In some embodiments, for example, the second plug 301 is configured to interfere with at least 95% of particles having a size of at least 1 millimeters from ingress through the second space portion 200E. In some embodiments, for example, the second plug 301 is configured to interfere with at least 50% of particles having a size of at least 0.5 millimeters from ingress through the second space portion 200E. In some embodiments, for example, the second plug 301 is configured to interfere with at least 75% of particles having a size of at least 0.5 millimeters from ingress through the second space portion 200E. In some embodiments, for example, the second plug 301 is configured to interfere with at least 95% of particles having a size of at least 0.5 millimeters from ingress through the second space portion 200E.

In some embodiments, for example, while the first plug 301 is disposed in the first space portion 200D and the second plug 301 is disposed in the second space portion 200E, the first plug 301 and the second plug 301 are co-operatively configured for interfering with passage of debris between the movable sash configuration 20 and the fixed sash configuration 30, for example, through the space 200, the space 200 including the first space portion 200D and the second space portion 200E.

As depicted, in some embodiments, for example, the first exterior interlock cover portion 52A, which extends to the plug supporting surface 132, occludes a portion of the space 200C, for example, the second space portion 200E, to interfere with flow of debris through the space 200C. In some embodiments, for example, the cross-sectional area of the space 200C of the assembly 10B that is unoccluded, through which debris can flow through for flowing across the assembly 10B, is smaller than the cross-sectional area of the space 200C of the assembly 10A, wherein the entirety of the space 200C is unoccluded, which, in some embodiments, reduces the amount of debris that is flowable through the space 200C of the assembly 10B.

In some embodiments, for example, by elevating the plug configuration 300, for example, the one or more plugs 301 of the plug configuration 300, above the sill compensator mounting interface 122, or above the base of the opening, while the assembly 10B is mounted to the opening of the building construction, exposure of the plug configuration 300 to debris that can accumulate on the sill compensator mounting surface 122 is reduced, which reduces the damage and wear and tear to the plug configuration 300 caused by exposure of the plug configuration 300 to debris. In some embodiments, for example, while the debris is flowing on the sill compensator mounting surface 122, in a direction wards the plug supporting surface 132, the debris flows into the transitional wall member 136, thereby interfering with flow of debris from the sill compensator mounting surface 122 to the plug supporting surface 132. Such interference provides additional time for gravitational forces to encourage the debris to flow away from the shoulder 130A.

In some embodiments, for example, the elevating the plug supporting surface 132 relative to the base 10, while the assembly 10B is mounted within the opening of the building construction, flow of debris from the environment, for example, from the ground or the floor, to the plug supporting surface 132, is interfered with.

In some embodiments, for example, a kit for a framework assembly 10 includes the movable sash configuration 20, the fixed sash configuration 30, a sill, for example, the sill configuration 100 or the sill configuration 100A, wherein a plug configuration 300 is supportable by the plug-supporting surface configuration of the sill configuration or the sill configuration 100A, such that at least a portion of the plug configuration 300 is disposed above the sill compensator mounting surface 122, or above the base of the opening, while the assembly 10 is mounted to the opening of the building construction. The sill configuration 100 or 100A, the plug configuration 300, the movable sash configuration 20 and the fixed sash configuration 30 are co-operatively configured such that: (i) while the movable sash configuration 20 and the fixed sash configuration 30 are mounted to the sill configuration 100 or 100A such that a space 200 is defined between the movable sash configuration 20, the fixed sash configuration 30, and the sill configuration 100, and (ii) while the plug configuration 300 is supported by the plug-supporting surface configuration for disposition within the space 200, the plug configuration interferes with passage of debris between the movable sash configuration 20 and the fixed sash configuration 30, for example, through the space 200.

The preceding discussion provides many example embodiments. Although each embodiment represents a single combination of inventive elements, other examples may include all suitable combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be examples only. The invention is defined by the appended claims.

What is claimed is:

1. A sill configuration of a framework assembly, the framework assembly including a movable sash configuration and a fixed sash configuration and configured for mounting in an opening of a building construction, the bottom of the opening being defined by a base of the building construction, the sill configuration comprising:

a sill base;

a sill compensator mounting surface that is configured to support a sill compensator;

a shoulder defining a plug-supporting surface; and a transitional wall that extends between the plug supporting surface and the sill compensator mounting surface;

wherein:

the sill configuration is configured for co-operation with the movable sash configuration and the fixed sash configuration such that:

the movable sash configuration and the fixed sash configuration are mountable to the sill configuration; and while the movable sash configuration and the fixed sash configuration are mounted to the sill configuration: (i) the movable sash configuration is slidable, relative to the sill configuration, (ii) the movable sash configuration, the fixed sash configuration, and the sill configuration are co-operatively disposed such that a space is defined between the movable sash configuration, the fixed sash configuration, and the sill configuration, and (iii) the plug supporting surface of the shoulder is configured for supporting a plug for disposition in the space; and while the framework assembly is mounted in the opening of the building construction:

the plug-supporting surface is elevated relative to the sill compensator mounting surface;

the sill base is disposed in opposing relationship with the base of the building construction; and the transitional wall and the sill compensator mounting surface co-operate to interfere with flow of fluid that is disposed on the sill compensator mounting surface to the plug supporting surface, such that the fluid is encouraged by gravitational forces to flow away from an inside of the building construction.

2. The sill configuration of claim 1, wherein the transitional wall defines a transitional wall surface that is disposed at an angle having a minimum value of at least 95 degrees relative to the sill compensator mounting surface.

3. The sill configuration of claim 1, wherein the transitional wall defines a transitional wall surface, and while the framework assembly is mounted in the opening of the building construction, the transitional wall surface extends vertically.

4. The sill configuration of claim 1, wherein the transitional wall defines a transitional wall surface, and while the assembly is mounted in the opening of the building construction, an acute angle defined between the transitional wall surface and a vertical plane has a maximum value of 45 degrees.

5. The sill configuration of claim 1, wherein the sill base, the sill compensator mounting surface, and the shoulder are of unitary one piece construction.

6. The sill configuration of claim 1, wherein, while the framework assembly is mounted in the opening of the building construction, the sill compensator mounting surface is inclined such that the fluid disposed on the sill compensator mounting surface is encouraged by gravitational forces to flow away from the inside of the building construction.

7. The sill configuration of claim 1, wherein, while the framework assembly is mounted in the opening of the building construction, the plug supporting surface defines a horizontal planar surface.

8. The sill configuration of claim 1, wherein, while the framework assembly is mounted in the opening of the building construction, the plug supporting surface defines an inclined planar surface, such that fluid that is disposed on the plug supporting surface is encouraged by gravitational forces to flow away from the inside of the building construction.

9. A framework assembly configured for mounting in an opening of a building construction, the bottom of the opening being defined by a base of the building construction, comprising:

a movable sash configuration;

a fixed sash configuration;

a plug configuration, the plug configuration comprising at least one plug; and a sill configuration comprising:

a sill base;

a sill compensator mounting surface that is configured to support a sill compensator;

a shoulder defining a plug-supporting surface; and a transitional wall that extends between the plug supporting surface and the sill compensator mounting surface;

wherein:

the sill configuration, the movable sash configuration, the fixed sash configuration, and the plug configuration are co-operatively configured such that:

the movable sash configuration and the fixed sash configuration are mounted to the sill configuration; and while the movable sash configuration and the fixed sash configuration are mounted to the sill configuration: (i) the movable sash configuration is slidable, relative to the sill configuration, (ii) the movable sash configuration, the fixed sash configuration, and the sill configuration are co-operatively disposed such that a space is defined between the movable sash configuration, the fixed sash configuration, and the sill configuration, and (iii) the plug configuration is supported by the plug supporting surface of the shoulder such that the plug configuration is disposed in the space, such that the plug configuration interferes with ingress of debris through the space; and while the framework assembly is mounted in the opening of the building construction;

the plug-supporting surface is elevated relative to the sill compensator mounting surface;

the sill base is disposed in opposing relationship with the base of the building construction; and the transitional wall and the sill compensator mounting surface co-operate to interfere with flow of fluid that is disposed on the sill compensator mounting surface to the plug supporting surface, such that the fluid is encouraged by gravitational forces to flow away from an inside of the building construction.

10. The framework assembly of claim 9, wherein the transitional wall defines a transitional wall surface that is disposed at an angle having a minimum value of at least 95 degrees relative to the sill compensator mounting surface.

11. The framework assembly of claim 9, wherein the transitional wall defines a transitional wall surface, and while the framework assembly is mounted in the opening of the building construction, the transitional wall surface extends vertically.

12. The framework assembly of claim 9, wherein the transitional wall defines a transitional wall surface, and while the framework assembly is mounted in the opening of the building construction, an acute angle defined between the transitional wall surface and a vertical plane has a maximum value of 45 degrees.

13. The framework assembly of claim 9, wherein the shoulder, the sill base, and the sill compensator mounting surface are of unitary one piece construction.

14. The framework assembly of claim 9, wherein, while the framework assembly is mounted in the opening of the building construction, the sill compensator mounting surface is inclined such that the fluid that is disposed on the sill compensator mounting surface is encouraged by gravitational forces to flow away from anthe inside of the building construction.

15. The framework assembly of claim 9, wherein, while the framework assembly is mounted in the opening of the building construction, the plug supporting surface defines a horizontal planar surface.

16. The framework assembly of claim 9, wherein, while the framework assembly is mounted in the opening of the building construciton, the plug supporting surface defines an inclined planar surface, such that fluid that is disposed on the plug supporting surface is encouraged by gravitational forces to flow away from the inside of the building construction.

17. The framework assembly of claim 9, further comprising a sealing configuration connected to the fixed sash configuration, wherein:

while the plug configuration is disposed in the space:

the plug of the plug configuration is disposed, relative to the fixed sash configuration, such that a side surface of the plug is offset from the fixed sash configuration; and the sealing configuration and the plug are co-operatively configured to define a debris ingress interfering interface between the sealing configuration and the side surface of the plug to interfere with ingress of debris through the space.

18. A kit for a framework assembly configured for mounting in an opening of a building construction, a bottom portion of the opening being defined by a base of the building construction, comprising:

a movable sash configuration;

a fixed sash configuration; and a sill configuration comprising:

a sill base;

a sill compensator mounting surface that is configured to support a sill compensator;

a shoulder defining a plug-supporting surface; and a transitional wall that extends between the plug supporting surface and the sill compensator mounting surface;

wherein:

the sill configuration is configured for co-operation with the movable sash configuration and the fixed sash configuration such that:

the movable sash configuration and the fixed sash configuration are mountable to the sill configuration; and while the movable sash configuration and the fixed sash configuration are mounted to the sill configuration: (i) the movable sash configuration is slidable, relative to the sill configuration, (ii) the movable sash configuration, the fixed sash configuration, and the sill configuration are co-operatively disposed such that a space is defined between the movable sash configuration, the fixed sash configuration, and the sill configuration, and (iii) the plug supporting surface of the shoulder is configured for supporting a plug for disposition in the space; and while the framework assembly is mounted in the opening of the building construction:

the plug-supporting surface is elevated relative to the sill compensator mounting surface;

the sill base is disposed in opposing relationship with the base of the building construction; and the transitional wall and the sill compensator mounting surface co-operate to interfere with flow of fluid that is disposed on the sill compensator mounting surface to the plug supporting surface, such that the fluid is encouraged by gravitational forces to flow away from an inside of the building construction.

* * * * *